United States Patent [19]
Yamauchi et al.

[11] Patent Number: 5,675,815
[45] Date of Patent: Oct. 7, 1997

[54] LANGUAGE CONVERSION SYSTEM AND TEXT CREATING SYSTEM USING SUCH

[75] Inventors: Satoshi Yamauchi; Phyllis Anwyl; Masayuki Kameda; Takashi Katooka; Masumi Narita, all of Yokohama; Hideo Ito, Tokyo; Yoshihisa Ohguro, Yokohama; Taisen Hayashi, Tokyo; Hiroko Yamagata, Sagamihara; Sakiko Honma, Kawasaki; Ayako Oono, Yokohama, all of Japan

[73] Assignee: Ricoh Company, Ltd., Tokyo, Japan

[21] Appl. No.: 149,661

[22] Filed: Nov. 9, 1993

[30] Foreign Application Priority Data

| | | | |
|---|---|---|---|
| Nov. 9, 1992 | [JP] | Japan | 4-323634 |
| Nov. 13, 1992 | [JP] | Japan | 4-328848 |
| Nov. 25, 1992 | [JP] | Japan | 4-339844 |
| Dec. 4, 1992 | [JP] | Japan | 4-350763 |
| Dec. 22, 1992 | [JP] | Japan | 4-356646 |
| Feb. 10, 1993 | [JP] | Japan | 5-045919 |
| Apr. 14, 1993 | [JP] | Japan | 5-112124 |
| May 21, 1993 | [JP] | Japan | 5-142729 |
| May 28, 1993 | [JP] | Japan | 5-151527 |

[51] Int. Cl.$^6$ .................................. G06F 17/28
[52] U.S. Cl. ........................... 395/792; 395/751
[58] Field of Search ................ 364/419.02, 419.04, 364/419.08, 200 MS; 395/792, 798, 801, 751, 752, 758, 759

[56] References Cited

U.S. PATENT DOCUMENTS

| | | | |
|---|---|---|---|
| 4,661,924 | 4/1987 | Okamoto | 364/419.08 |
| 5,029,085 | 7/1991 | Ito . | |
| 5,062,074 | 10/1991 | Kleinberger | 395/600 |
| 5,132,901 | 7/1992 | Yokogawa | 364/419.02 |
| 5,181,163 | 1/1993 | Nakajima | 364/419.08 |
| 5,303,150 | 4/1994 | Kameda | 364/419.08 |
| 5,338,976 | 8/1994 | Anwyl | 364/419.01 |

FOREIGN PATENT DOCUMENTS 44276  1/1988  Japan .

OTHER PUBLICATIONS

Kumano et al., "User–Cooperative Japanese Sentence Generation System", National Conference of the 42nd Information Processing Society.

Saito and Tomita, Nov. 1984, "Automatically Writing a Letter in a Foreign Language", Symposium of the Natural Language Processing Technology.

Nomiyama, "Lexical Selection Mechanism in Machine Translation Using Target language Knowledge", National Conference of the 42nd Information Processing Society.

(List continued on next page.)

Primary Examiner—Gail O. Hayes
Assistant Examiner—Frantzy Poinvil
Attorney, Agent, or Firm—Woodcock Washburn Kurtz Mackiewicz & Norris LLP

[57] ABSTRACT

A language conversion system converts an original sentence in a source-language into a translated sentence in a target-language. The language conversion system includes a original analysis unit for analyzing the original sentence so as to obtain an intermediate structure of the original, an idea center extraction unit for extracting an idea center from the intermediate structure obtained by the original analysis unit, the idea center being a central expression of an idea to be described by a sentence, an identification unit for identifying a sentence pattern including the idea center extracted by the idea center extraction unit, an information extraction unit for extracting information required by the sentence pattern identified by the identification unit from the intermediate structure of the original sentence, a decision unit for deciding an intermediate structure of a translated sentence based on the sentence pattern and request information extracted by the information extraction unit, and a creation unit for creating a translated sentence in a surface level from the intermediate structure decided by the decision unit.

19 Claims, 102 Drawing Sheets

OTHER PUBLICATIONS

Satoshi Sato and Makoto Nagao, "Toward Memory-based Translation".

Phyllis Anwyl, Toru Matsuda, Katsuhiko Fujita and Masayuki Kameda, "Target–Language Driven Transfer and Generation", The Second Japan–Australia Joint Symposium On Natural Language Processin (Oct. 1991), discloses translation using an idea center.

"Ready Pen Vo2" by Fujitsu, discloses an application software for forming English texts.

"Ambassador", by Katena, discloses an application software for making English letter.

FIG. 5

| ENTRY | READING | POS | FEATURES | 1st FIELD GENERAL | USING FREQUENCY 2st FIELD ELECTRONICS | 3st FIELD HEAVY ELECTRICAL EQUIPMENT |
|---|---|---|---|---|---|---|
| 受け口 | うけぐち | N | HEL | 003 | 000 | 000 |
| 機械 | きかい | N | IEL | 021 | 014 | 052 |
| 希望 | きぼう | N | ART | 054 | 124 | 213 |
| 計画 | けいかく | SN | REC | 096 | 004 | 003 |
| 計算器 | けいさんき | SN | REC | 153 | 078 | 126 |
| 計算機 | けいさんき | N | ART | 026 | 086 | 078 |
| 計算機 | けいさんぞく | N | ART | 009 | 256 | 150 |
| 計測器 | けいそくき | N | ART | 011 | 123 | 245 |
| 結果 | けっか | N | RSU | 083 | 157 | 137 |
| 言語 | げんご | N | ABS | 045 | 224 | 006 |
| コンピュータ | こんぴゅーた | N | ART | 033 | 321 | 174 |
| システム | しすてむ | N | ABS | 008 | 395 | 222 |
| 処理 | しょり | N | ACT | 050 | 487 | 045 |
| 政府 | せいふ | N | ORG | 145 | 005 | 088 |
| 電算機 | でんさんき | N | ART | 029 | 289 | 204 |
| 電気 | でんき | N | PPM | 115 | 097 | 258 |
| 電子 | でんし | N | PPM | 078 | 052 | 021 |
| 電子計算機 | でんしけいさんき | N | ART | 024 | 278 | 064 |
| 電子式 | でんししき | N | PPX | 106 | 142 | 165 |
| 挑語 | とうごにしょり | N | ABS | 000 | 043 | 000 |
| 挑語処理 | とりょく | SN | ACT | 183 | 169 | 000 |
| 努力 | どりょく | SN | ACT | 273 | 028 | 034 |
| 場合 | ばあい | N | APP | 156 | 210 | 084 |
| ベース | ベース | N | SPA | 003 | 045 | 092 |
| 変圧器 | へんあつき | N | INS | 076 | 028 | 354 |
| 変電所 | へんでんしょ | N | INS | 096 | 014 | 232 |
| 夢 | ゆめ | N | REC | 065 | 046 | 007 |
| 論理型 | ろんり | N | ABS | 021 | 197 | 024 |
| 論理型 | ろんりがた | N | ABX | 004 | 088 | 014 |
| 論理型言語 | ろんりがたげんご | N | ABS | 004 | 141 | 000 |

FIG. 6

| ENTRY | READING | POS CONJUGATION | POSSIBILITY | POINTER |
|---|---|---|---|---|
| 愛する | あいする | WS | 5 | 0001 |
| アクティブだ | あくてぃぶだ | EAV | 4 | 0023 |
| 美しい | うつくしい | WA | 4 | 0096 |
| 行う | おこなう | W5 | 3 | 0154 |
| 行なう | おこなう | W5 | 3 | 0154 |
| 感じる | かんじる | W1 | 3 | 0210 |
| 見学する | けんがくする | CS | 5 | 0285 |
| 試験する | しけんする | CS | 8 | 0378 |
| 静かだ | しずかだ | WAV | 9 | 0456 |
| 実現する | じつげんする | CS | 3 | 0521 |
| 処理する | しょりする | CS | 9 | 0533 |
| だ | だ | AUX | 9 | 0701 |
| テストする | てすとする | ES | 2 | 0378 |
| です | です | AUX | 9 | 0765 |
| 学ぶ | まなぶ | WS | 2 | 1032 |
| | | | 5 | |

FIG. 7

```
① (CONTENTS OF POINTER 0378)
(( "試験する" "テストする" : "test" : 「機械や装置等のテストを行う場合」)
    (<Required>
        (<Subj-AGT>
            (<Alternates>       ( "I/you/he/she/we/they/person" "テストする人" )
                                ( "agency" "テストを行う機関" )
                                ( "test conductor" "テストを行う人" )
                                ETC
                                <SOMEONE>)
            (<Features>         <人間性>
                                ETC
            (<Japanese>         @が))
        (<DirObj-PATIENT>
            (<Alternates>       ( "test subject" "対象" )
                                ( "tested" "テストされたもの" )
                                ETC
                                <SOMETHING>)
            (<Japanese>         (する [@と 対象]           @を)
                                (する [@に 対象]           @を)
                                @を                      ))
    )
    (<Preferred>
        (<Xobj-CONDITION>
            (<Alternates>       ( "condition" "状態" )
                                ( "state" "状態" )
                                ( "circumstance" "状況" )
                                ETC
                                <SOMETHING>)
            (<Features>         <状態>
                                ETC
            (<Japanese>         @purpose @ために))
        (<X-BINARY-CONTRAST>
            (<Alternates>       ( "condition A or B" "状態" )
                                ( "state A or B" "状態" )
                                ( "circumstance A or B" "状況" )
                                ETC
                                <SOMETHING>)
            (<Features>         <状態>
                                ETC)
            (<Japanese>         @OR))
        (<Xnnn-BOOLEAN>
            (<Alternates>       ( "condition A or not A" "状態" )
                                ( "state A or not A" "状態" )
                                ( "circumstance A or not A" "状況" )
                                ETC
                                <SOMETHING>)
            (<Features>         <状態>
                                ETC
            (<Japanese>         @疑問))
    )
    (<English-Patterns-Pointer>
        (<v-|test|-000> (<Restrictions> <DirObj-PATIENT>))
        (<v-|test|-001> (<Restrictions>
                        AND(@NOUN sem(する)-UPPER STRUCTURE-FUNCTION NAME(をobj))
                            OR(<Xobj-CONDITION>
                               <Xnnn-BINARY_CONTRAST>
                               <Xnnn-BOOLEAN>))
        (<v-|test|-002> (<Restrictions> <Xobj-CONDITION>)
        (<v-|test|-003> (<Restrictions>
                        AND(@NOUN sem(行う)-UPPER STRUCTURE-FUNCTION NAME(をobj))
                            OR(<Xobj-CONDITION>
                               <Xnnn-BINARY_CONTRAST>
                               <Xnnn-BOOLEAN>))
        (<v-|test|-000> (<Restrictions> @NOUN<DirObj-PATIENT>))
        (<v-|test|-001> (<Restrictions> @NOUN<Xobj-CONDITION>))
        (<v-|test|-002> (<Restrictions> @NOUN<Xnnn-BINARY_CONDITION>))
        (<v-|test|-003> (<Restrictions> @NOUN<Xnnn-BOOLEAN>))
    )
)
```

FIG. 8

```
  ①'
(( "試験する" "テストする" : "examine" : 「学科や知識などをテストする場合」)
    (<Required>
      (<Subj-AGT>
        (<Alternates>      ( "I/you/he/she/we/they/person"  "試験する人" )
                           ( "agency"   "試験を行う機関" )
                           ( "proctor"  "試験を監督する人" )
                           ETC
                           <SOMEONE>)
        (<Features>        <人間性>
                           ETC)
        (<Japanese>        @が))
      (<DirObj-PATIENT>
        (<Alternates>      ( "I/you/he/she/we/they/person"  "試験を受ける人" )
                           ( "subject"   "対象" )
                           ( "examined"  "テストされたもの" )
                           ETC
                           <SOMEONE>)
        (<Japanese>        <する [@に  対象]        @を)
                           @を
                           @に                  ))
    )
    (<Preferred>
      (<Xobj-CONDITION>
        (<Alternates>      ( "condition/state"  "状態" )
                           ( "circumstance"     "状況" )
                           ETC
                           <SOMETHING>)
        (<Features>        <状態>
                           ETC)
        (<Japanese>        @purpose @ために))
      (<Xnnn-SUBJECT>
        (<Alternates>      ( "grammer/math/philosophy/"  "学科" )
                           ( "state"         "状態" )
                           ( "circumstance"  "状況" )
                           ETC
                           <SOMETHING>)
        (<Features>        <状態>
                           ETC)
        (<Japanese>        @subject       @について)
                           @を
    )
    (<English-Patterns-Pointer>
      (<v-|examine|-001>   (<Restrictions> <DirObj-PATIENT>))
      (<v-|examine|-002>   (<Restrictions>
                            (@NOUN   sem(行う)-UPPER STRUCTURE-FUNCTION NAME(をobj))
                            (<Restrictions> <Xnnn-SUBJECT>))
                            (<Restrictions> <Xnnn-BOOLEAN>))
      (<v-|examine|-001>   (<Restrictions> @NOUN<DirObj-PATIENT>))
      (<v-|examine|-002>   (<Restrictions> @NOUN<Xnnn-BINARY_CONDITION>))
      (<v-|examine|-003>   (<Restrictions> @NOUN<Xnnn-BOOLEAN>))
```

FIG. 9

```
         ② (COMENTS OF POINTER 0521)
(( "実現する" : "implement" : 「思考した内容を具体的に示す。約束や計画を実行する。」)
    (<Required>
        (<Subj-AGT>
            (<Alternates>        ( "I/you/he/she/we/they/person"  "実現する人" )
                                 ( "agency"  "実現を行う組織" )
                                 ( "implementor"  "実現を行う人" )
                                 ETC
                                 <SOMEONE>)
            (<Features)          <人間性>
                                 ETC)
            (<Japanese>          @が(obj))
        (<DirObj-RESULT>
            (<Alternates>        ( "system"  "システム" )
                                 ( "implemented"  "実現されたもの" )
                                 ETC
                                 <SOMETHING>)
            (<Japanese>          @を(obj))
        )
    (<Preferred>
        (<Xobj-TOOL>
            (<Alternates>        ( "language"  "プログラム言語" )
                                 ( "logic-based language"  "論理型言語" )
                                 ( "C-language"  "C 言語" )
                                 ETC
                                 <SOMETHING>)
            (<Japanese>          @で(obj))
        (<Xnnn-SPACE>
            (<Alternates>        ( "machine"  "機械" )
                                 ( "system"  "システム" )
                                 ( "computer"  "コンピュータ" )
                                 ( "work station"  "ワークステーション" )
                                 ( "personal computer"  "パソコン" )
                                 ETC
                                 <SOMETHING>)
            (<Japanese>          @へ(obj))
        )
    (<English-Patterns-Pointer>
        (<v-|implement|-001>
        (<v-|implement|-002>
            (<Restrictions>
                (@NOUN   SURFACE LEVEL(する)-UPPER STRUCTURE-FUNCTION NAME(はtopic))
            (<Restrictions>
            (<Restrictions>
        (<v-|implement|-003>
```

FIG. 10

```
   ②'
(( "実現する" : "realize" "come truu" : 「希望や目的等が<実現する。」)
    (<Required>
        (<Subj-AGT>
            (<Alternates>        ( "I/you/he/she/we/they/person" "実現する人" )
                                 ETC
                                 <SOMEONE>)
            (<Features>          <人間性>
                                 ETC)
            (<Japanese>          @が<obj>))
        (<DirObj-PATIENT>
            (<Alternates>        ( "plan"    "計画" )
                                 ( "hope"    "希望" )
                                 ( "dream"   "夢" )
                                 ETC
                                 <SOMETHING>)

(<Features>          <行動>
                                 <思考>
                                 ETC)
            (<Japanese>          @を<obj>))
        )
    (<Preferred>
        (<Xobj-MEANS>
            (<Alternates>        ( "effort"  "努力" )
                                 ( "     "   "    " )
                                 ETC
                                 <SOME ACTION>)
            (<Japanese>          @で<obj>))
        (<Xnnn->
            (<Alternates>        ( "     "   "    " )
                                 ( "     "   "    " )
                                 ETC
                                 <SOMETHING>)
            (<Japanese>          @  ))
        )                          )
(<English-Patterns-Pointer>
    (<v-|realize|-001>
    (<v-|realize|-002>
                (<Restrictions> (@UPPER STRUCTURE-FUNCTION NAME(が<obj>))
                (<Restrictions>
                (<Restrictions>
    (<v-|come_true|-000>
    (<v-|come_true|-001>
                (<Restrictions> <Xobj-SUBJECT>))
                (<Restrictions>
                (<Restrictions>
```

FIG. 11

```
     ②"
(( "実現する" : "actualize" : 「稀にしか使われない。」)
    (<Required>
        (<Subj-AGT>
            (<Alternates>      ( "I/you/he/she/we/they/person" "実現する人" )
                               ETC
                               <SOMEONE>)
            (<Features>        <人間性>
                               ETC
            (<Japanese>        @が obj))
        (<DirObj-SUBJECT>
            (<Alternates>      ( "plan"  "計画" )
                               ( "hope"  "希望" )
                               ( "dream" "夢" )
                               ETC
                               <SOMETHING>)
            (<Features>        <行動>
                               <思考>
                               ETC)
            (<Japanese>        @を obj))
    )
    (<Preferred>
        (<Xobj-MEANS>
            (<Alternates>      ( "effort" "努力" )
                               ( "  "    "  " )
                               ETC
                               <SOMEACT>)
            (<Japanese>        @で obj))
    )

(<English-Patterns-Pointer>
        (<v-|actualize|-000>
        (<v-|actualize|-001>
                (<Restrictions> (@UPPER STRUCTURE-FUNCTION NAME( が obj))
                (<Restrictions> ()
                (<Restrictions> ()
    )
)
```

FIG. 12

```
(<English-Patterns>) : ①
  (<v-|test|-000>
      (<Pattern>      (|test| <SOMETHING>))
      (<Example>      "TEST (test-subj)" [subj = を格]
                      "TEST FOR (condition)" [cond = を格]
      (<Component>    (X1              <DirObj-PATIENT>))
  )
  (<v-|test|-001>
      (<Pattern>      (|test| <SOMETHING> (<p-|for|-001>))
      (<Example>      "TEST (test-subj) FOR (state/condition)" )
      (<Component>    (X1              <DirObj-PATIENT>))
                      ((X2 X1)              <Xobj-CONDITION>))
  )
  (<v-|test|-002>
      (<Pattern>      (make <n-|test|-001>)
      (<Example>      "MAKE A TEST OF (test-subj) FOR (state/condititon)" )
  )
  (<v-|test|-003>
      (<Pattern>      (conduct <n-|test|-002>)
                      (conduct <n-|test|-003>))
      (<Example>      "CONDUCT A TEST OF (test-subj) TO DETERMINE (A or B)" )
  )
  (<n-|test|-000>
      (<Pattern>      (|test| (<p-|in|-001>) (<p-|for|-001>)))
      (<Example>      "A TEST IN (test-subj) FOR (state/condition)" )
      (<Component>    ((X1 X1)          <DirObj-PATIENT>)
                      ((X2 X1)          <Xobj-CONDITION>))
  )
  (<n-|test|-001>
      (<Pattern>      (|test| (<p-|of|-001>) (<p-|for|-001>)))
      (<Example>      "A TEST OF (test-subj) FOR (state/condition)" )
      (<Component>    ((X1 X1)          <DirObj-PATIENT>)
                      ((X2 X1)          <Xobj-CONDITION>))
  )
  (<n-|test|-002>
      (<Pattern>      (|test| (<p-|of|-001>) (<vinf-|to determine|-002>))
      (<Example>      "A TEST OF (test-subj) TO DETERMINE (A or B)" )
      (<Component>    ((X1 X1)          <DirObj-PATIENT>)
                      ((X2 X1)          <Xnnn-BINARY_CONTRAST>))
  )
  (<n-|test|-003>
      (<Pattern>      (|test| (<p-|of|-001>) (<vinf-|to determine|-001>))
      (<Example>      "A TEST OF (test-subj) TO DETERMINE (WHETHER A or not A)" )
      (<Component>    ((X1 X1)          <DirObj-PATIENT>)
                      ((X2 X1)          <Xnnn-BOOLEAN>))
  )
  (<p-|in|-001>
      (<Pattern>      (|in| <SOMETHING>)
  )
  (<p-|of|-001>
      (<Pattern>      (|of| <SOMETHING>)
  )
  (<p-|for|-001>
      (<Pattern>      (|for| <SOME PURPOSE>)
  )                                                          )

(<English-Patterns>) : ②
  (<v-|implement|-000>
      (<Pattern>      (|implement| <SOMETHING>))
      (<Example>      "IMPLEMENT (implement-result)" [subj = を格]
      (<Component>    (X1              <DirObj-RESULT>))
  )
  (<v-|implement|-001>         )
      (<Pattern>      (|implement| <SOMETHING>) (<p-|on|-001> <ving-|using|-001>))
      (<Example>      "IMPLEMENT (implement-result) ON (state) USING (tool)" )
      (<Component>    (X1              <DirObj-RESULT>)
                      (X2 X1)          <Xobj-STATE>)
                      (X3 X1)          <Xobj-SOFTWARE>))
  )                                                          )
```

FIG. 13

| ENTRY | READING | POS | FEATURES | ENGLISH DESCRIPTION |
|---|---|---|---|---|
| 機械 | きかい | N | ART | machine |
| 計算器 | けいさんき | N | ART | calculator |
| 計算機 | けいさんき | N | ART | calculating machine |
| 結果 | けっか | N | RSU | result |
| 言語 | げんご | N | ABS | language |
| コンピュータ | こんぴゅーた | N | ART | computer |
| システム | しすてむ | N | ABS | system |
| 処理 | しょり | N | ACT | processing |
| 政府 | せいふ | N | ORG | government |
| 対象 | たいしょう | N | APP | subject |
| 電算機 | でんさんき | N | ART | computer |
| 電子 | でんし | N | PPM | electron |
| 電子計算機 | でんしけいさんき | N | ART | computer |
| 電子式 | でんししき | N | PPX | electronic |
| 抗語 | とうごし | NS | ABS | syntactic |
| 抗語処理 | とうごしょり | N | ACT | syntactic processing |
| 場合 | ばあい | N | APP | case |
| ベース | べーす | N | SPA | base |
| 変電所 | へんでんしょ | N | INS | transformer station |
| 論理 | ろんり | N | ABS | logic |
| 論理型 | ろんりがた | N | ABX | logic-based |
| 論理型言語 | ろんりがたげんご | N | ABS | logic-based language |

FIG. 14

```
EXCHANGE
     <obj-tool> : " " IS USED WHEN TOOL IS OBJECT
     <obj-space> : " " IS USED WHEN SPACE IS OBJECT
           :
REQUIRED
     RequMess : *PLEASE FILL FOLLOWING ESSENTIAL ITEM
     PrefMess : *PLEASE FILL FOLLOWING ESSENTIAL ITEM
     OptiMess : *PLEASE FILL FOLLOWING ESSENTIAL ITEM
RELATIONAL : MEANING IS REPRESENTED IN THIS SENTENCE PATTERN
```

FIG. 15

| ITEM | TRANSLATION UNIT | | | INTERACTION | | | | FIELD | | | |
|---|---|---|---|---|---|---|---|---|---|---|---|
| | BATCH 1 | BATCH 2 | SINGLE SENTENCE UNIT | EXISTENCE OF INTERACTION | EXISTENCE OF GUIDE DISPLAY | EXISTENCE OF WORD LEARNING | EXISTENCE OF SENTENCE PATTERN LEARNING | 0 | 1 | 2 | 3 |
| (AUTOMATIC FLAG) | 0 | 0 | 1 | 1 | 1 | 0 | 0 | (−) | (0) | (0) | (0) |
| MANUAL FLAG | | | | | | | | 1 | 0 | 0 | 0 |

FIG. 16

[SourceTex (J)]

①
| IC | SCORE | POINTER |
|---|---|---|
| 行う | 5 | 0154 |
| テストする | 18 | 0378 |

②
| IC | SCORE | POINTER |
|---|---|---|
| 実現する | 15 | 0521 |
| 処理する | 9 | 0533 |

FIG. 18
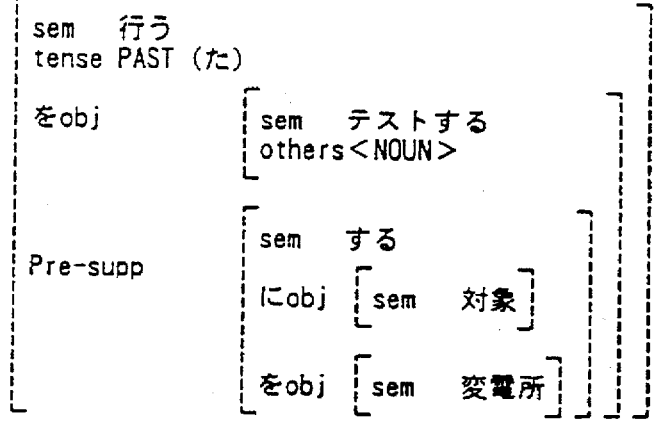
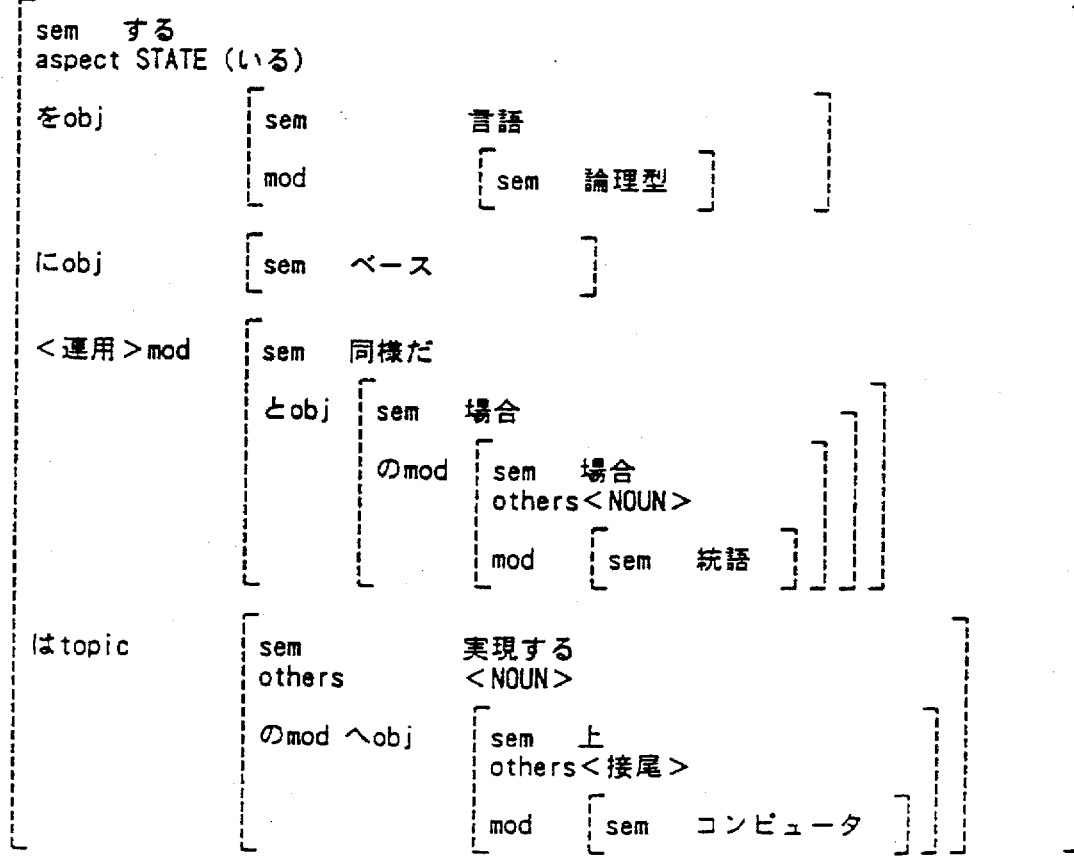

FIG. 19

① 
```
[ テストを行う    conduct a test                                    ]
[ Tense          PAST                                              ]
[ PoS            TransVB                                           ]
[                                                                  ]
[                [ 必須   誰（が）         ]                        ]
[ Subj           [ DEF    someone         ]                        ]
[                                                                  ]
[                [ Prep   of                            ]          ]
[                [                                      ]          ]
[ PrepDO         [        [ 候補   変電所              ]]          ]
[                [ obj    [ Sem    transformer station ]]          ]
[                [        [ DEF    something           ]]          ]
[                                                                  ]
[                [ Prep   for                           ]          ]
[ Xobj           [                                      ]          ]
[                [        [ 任意   何のために          ]]          ]
[                [ obj    [ Sem    some purpose        ]]          ]
```

①′
```
[ テストを行う    conduct a test                                    ]
[ Tense          PAST                                              ]
[ PoS            TransVB                                           ]
[                                                                  ]
[                [ user   政府（が）         ]                      ]
[ Subj           [ User   government        ]                      ]
[                                                                  ]
[                [ Prep   of                            ]          ]
[ PrepDO         [        [ 候補   変電所              ]]          ]
[                [ obj    [ Sem    transformer station ]]          ]
[                [        [ DEF    something           ]]          ]
[                                                                  ]
[                [ Prep   for                           ]          ]
[ Xobj           [        [ 任意   何のために          ]]          ]
[                [ obj    [ Sem    some purpose        ]]          ]
```

FIG. 20

①″
```
┌ テストを行う   conduct a test                                      ┐
│ Tense         PAST                                                │
│ PoS           TransVB                                             │
│              ┌ user  政府 (が)                       ┐             │
│ Subj         │ User  government agency              │             │
│              └                                      ┘             │
│              ┌ Prep  of                             ┐             │
│              │      ┌ 候補  変電所            ┐      │             │
│ PrepDO       │ obj  │ Sem   transformer station │   │             │
│              │      │ DEF   something          │    │             │
│              │      └                          ┘    │             │
│              └                                      ┘             │
│              ┌ Prep  for                            ┐             │
│ Xobj         │      ┌ 任意  何のために          ┐    │             │
│              │ obj  │ Sem   some purpose        │   │             │
│              └      └                          ┘    ┘             │
└                                                                    ┘
```

②
```
┌ 実現する      implement                                            ┐
│ Tense        PAST                                                  │
│ PoS          TransVB                                               │
│              ┌ 必須  誰 (が)                          ┐             │
│ SubJ         │ DEF   someone                         │             │
│              └                                       ┘             │
│              ┌ 必須  何 (を)                          ┐             │
│              │ DEF   something                       │             │
│              │      ┌ SF    上                 ┐     │             │
│ DirObj       │      │ Pref  on                 │     │             │
│              │ PrefDO     ┌ 候補  コンピュータ ┐ │    │             │
│              │      │ Obj │ Sem   computer    │ │    │             │
│              │      │     │ DEF   something   │ │    │             │
│              │      └     └                   ┘ ┘    │             │
│              └                                       ┘             │
│              ┌ Ing   use                             ┐             │
│ AdvC         │      ┌ 候補  論理型言語          ┐    │             │
│              │ Obj  │ Sem   logic-based language │   │             │
│              │      │ DEF   something           │    │             │
│              └      └                           ┘    ┘             │
│              ┌ AX    と同時に                         ┐            │
│              │ Conj  as                              │             │
│ AdvC         │      ┌ Pref  in                 ┐     │             │
│              │      │      ┌ 候補  統語処理      ┐  │             │
│              │      │ Obj  │ Sem   syntactic processing │ │        │
│              │      │      │ DEF   something     │   │             │
│              └      └      └                     ┘   ┘             │
└                                                                    ┘
```

FIG. 21

① 
TexPat: 「テストする」 "test" ; WE TEST MACHINE OR EQUIPMENT
DbRlat: 「対象にして」 ; MEANING IS REPRESENTED IN THIS SENTENCE PATTERN
SubjEx: "I/you/he/she/we/they/person" "テストをする機関"
        "agency" "テストをする人"
        "test conductor" "テストを行う人"
RequMess: *PLEASE FILL FOLLOWING ESSENTIAL ITEM ② 
TexPat: 「実現する」 "implement" ; CONSIDERED CONTENTS ARE INDICATED IN THE CONCRETE
                                    PROMISED PLAN IS EXECUTED
DbRlat: 「の場合」 ; MEANING IS REPRESENTED IN THIS SENTENCE PATTERN
DbExch: 「ベースにする」 ; "USE" IS USED WHEN TOOL IS OBJECT
SubjEx: "I/you/he/she/we/they/person" "実現を行う組織"
        "agency" "実現を行う人"
        "implementer" "実現を行う人"
ObjEx:  "system" "システム"
        "implemented" "実現されたもの"
RequMess: *PLEASE FILL FOLLOWING ESSENTIAL ITEM
PrefMess: *PLEASE FILL FOLLOWING ESSENTIAL ITEM

FIG. 22

① 
ITEM NAME: ITEM VALUE
Source: [SourceTex (J)]
Target: [TranTex (E)]
---
IntMed(e): [GenResult (E)]
IntMed(j'): [GenResult (J')]
Comment: 「テストする」 "test" ; WE TEST MACHINE OR EQUIPMENT
 「対象にして」 ; MEANING IS REPRESENTED IN THIS SENTENCE PATTERN
*PLEASE FILL FOLLOWING ESSENTIAL ITEM
ReguMess: <<someone: >><<誰かが': >>
Repuired: "I/you/he/she/we/they/person" "テストをする人"
Example: "agency" "テストをする機関"
 "test conductor" "テストを行う人"

② 
Source: [SourceTex (J)]
Target: [TranTex (E)]
---
IntMed(e): [GenResult (E)]
IntMed(j'): [GenResult (J')]
Comment: 「実現する」 "implement" ; CONSIDERED CONTENTS ARE INDICATED IN THE CONCRETE
 PROMISED PLAN IS EXECUTED
 「の場合」 ; MEANING IS REPRESENTED IN THIS SENTENCE PATTERN
 「ベースにする」 ; "USE" IS USED WHEN TOOL IS OBJECT
*PLEASE FILL FOLLOWING ESSENTIAL ITEM
ReguMess: <<someone: >><<誰かが': >>
Repuired: "I/you/he/she/we/they/person" "実現を行う人"
Example: "agency" "実現を行う組織"
 "implementer" "実現を行う人"
Repuired: <<something: >><<何を: >>
Example: "system" "システム"
 "implemented" "実現されたもの"

FIG. 23
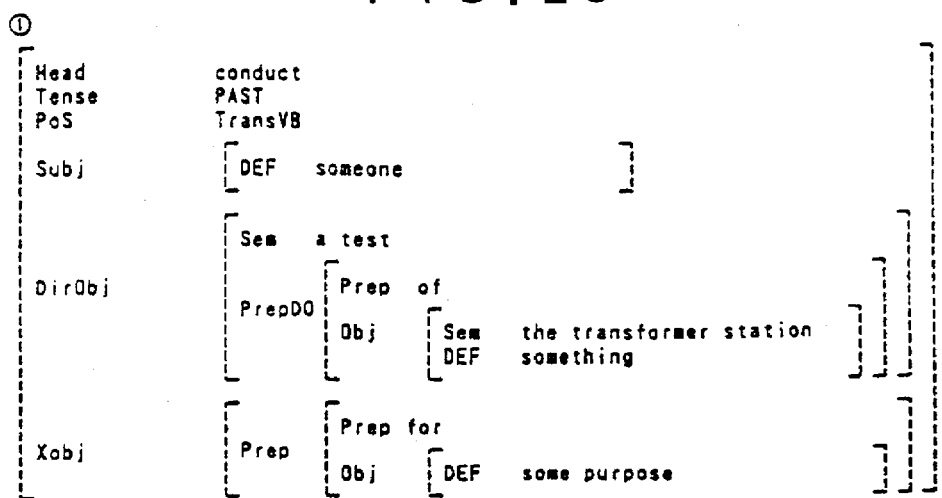
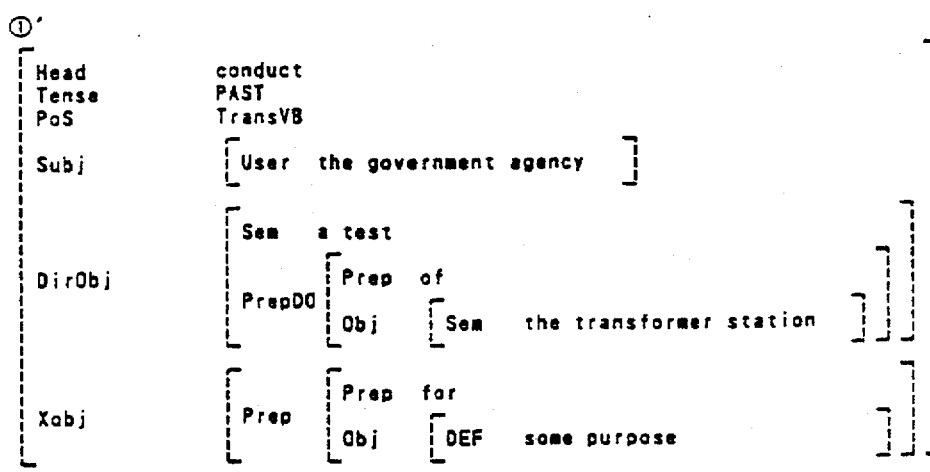
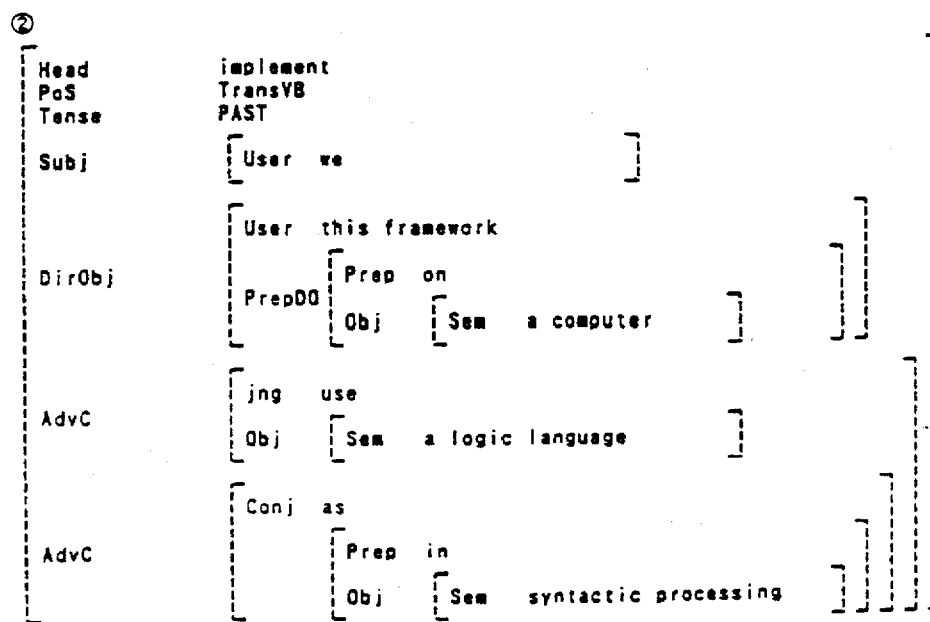

FIG. 24

① 
```
[ sem    行う
  tense  PAST (た)
  がobj        [ 必須  誰 ]
                [ sem         テストする   ]
                [ others      <NOUN>      ]
  をobj        [ のmod   [ sem  変電所 ] ]
  mod          [ 任意  何のために ]
]
```

①′
```
[ sem    行う
  tense  PAST (た)
  がobj        [ user  政府 ]
                [ sem         テストする   ]
                [ others      <NOUN>      ]
  をobj        [ のmod   [ sem  変電所 ] ]
  mod          [ 任意  何のために ]
]
```

②
```
[ sem    実現する
  tense  PAST (た)
  がobj        [ user  we ]
  をobj        [ user  this framework ]
  にobj        [ SF     上
                 othe   <接尾>
                 mod    [ sem  コンピュータ ] ]
  てconj       [ sem   用いる
                 をobj  [ sem  論理型言語 ] ]
  と同様に     [ sem   統語処理 ]
]
```

FIG. 25

```
[TranTex (E)]

① <<someone>> conducted a test of the transformar station.

①' The government conducted a test of the tranformer station.

①" The government agency conducted a test of the transformer station.

② <<someone>> implemented <<something>> on a computer using a logic-based
language as in syntactic processing.

②' We implemented this framework on a computer using a logic-based language
as in syntactic processing.

②? We implemented this framework on a computer using a logic-based language
as in syntactic processing.

[GenResult (E')]

① <<someone:the government agency>> conducted a test of <<something (the
transformer station)>> for <some purpose>.

①' <<someone:the government agency>> conducted a test of <<something (the
transformer station)>> for <some purpose>.

①" <<someone:the government agency>> conducted a test of <<something (the
transformer station)>> for <some purpose>.

② <<someone>> implemented <<something>> on a computer using a logic-based
language as in syntactic processing.

②' <<someone:we>> implemented <<something:this framework>> on a computer
using a logic-based language as in syntactic processing.

②? <<someone:we>> implemented <<something:this framework>> on a computer
using a logic-based language as in syntactic processing.
```

FIG. 26

```
[GenResult (J')]

① <<誰が>><何のために><<変電所>>のテストを行った。

①' <<政府>>が<何のために><<変電所>>のテスト行った。

①" <<政府>>が<何のために><<変電所>>のテストを行った。

② <<誰が(は)>>統語処理と同様に論理型言語を用いてコンピュータ上に
   <<何を>>実現した。

②' <<We>>が(は)統語処理と同様に論理型言語を用いてコンピュータ上に
   <<this framework>>を実現した。

②" <<We>>が(は)統語処理と同様に論理型言語を用いてコンピュータ上に
   <<this framework>>を実現した。
```

FIG. 28

① | MODE | ORIGINAL · INTERACTION | FIELD | (NOT IDENTIFIED) HEAVY ELECTRICAL EQUIPMENT |

[JAPANESE] ORIGINAL

FILE | EDITING

変電所を対象にしてテストを行った。

[ENGLISH] TRANSLATION

FILE | EDITING

<<someone>> conducted a test of transformer station.

[EDITING] REFERENCE · COMMENT · REQUEST INFORMATION

TRANSLATION (E) : <<someone>> conducted a test of <<something (transformer station)>> <for some purpose>.
EQUIVALENT (J) : <<誰かが>> <何のために> <<変電所>>のテストを行った。
COMMENT : 「テストする」"test" <<機械や装置等のテストを行う場合、
「対象にして」: この文型内に意味として表現されている。

*PLEASE FILL FOLLOWING ESSENTIAL ITEMS
ESSENTIAL (E) : <<someone>> : >>
ESSENTIAL (J) : <<誰か>> : >>
EXAMPLE : "I/you/he/she/we/they/person" "テストをする人"
"agency" "テストをする機関"
"test conductor" "テストを行う人"

FIG. 29

| MODE | ORIGINAL · INTERACTION | FIELD | (NOT IDENTIFIED) HEAVY ELECTRICAL EQUIPMENT |

[JAPANESE] ORIGINAL

| FILE | EDITING |

変電所を対象にしてテストを行った。

[ENGLISH] TRANSLATION

| FILE | EDITING |

The government conducted a test of the transformer station.

[EDITING] REFERENCE · COMMENT · REQUEST INFORMATION

```
TRANSLATION  (E)  : ≪someone:the government≫ conducted a test of ≪something
                   (transformer station)≫ <for some purpose>.
EQUIVALENT   (J)  : ≪政府≫が<何のために><<変電所>>のテストを行った
                   「テストする」"test":機械や装置等のテストを行う場合。
     COMMENT :     「対象にして」:この文型内に意味として表現されている。
* PLEASE FILL FOLLOWING ESSENTIAL ITEMS
   ESSENTIAL (E)  :      ≪someone≫                       ≫
   ESSENTIAL (J)  :      ≪≪誰が≫:政府                  ≫≫
         EXAMPLE  :      "I/you/he/she/we/they/person"  "テストをする人"
                        "agency"                        "テストする機関"
                        "test conductor"                "テストを行う人"
```

FIG. 30

| MODE | ORIGINAL · INTERACTION | | FIELD | (NOT IDENTIFIED) HEAVY ELECTRICAL EQUIPMENT |
|---|---|---|---|---|

[JAPANESE] ORIGINAL

| FILE | EDITING |
|---|---|
| | 変電所を対象にしてテストを行った。 |

[ENGLISH] TRANSLATION

| FILE | EDITING |
|---|---|
| | The government agency conducted a test of the transformer station. |

[EDITING] REFERENCE · COMMENT · REQUEST INFORMATION

```
TRANSLATION (E)  : <<someone:the government agency>> conducted a test of
                   <<something (transformer station)>> <(for some purpose)>
EQUIVALENT  (J)  : <<<政府>> が <<変電所>>のテストを行った場合>。
            COMMENT      「テストする」 "test" : 機械や装置等のテストを行う場合。
                         「対象にして」 : この文型内に意味として表現されている。
COMMENT     (E)  : <<someone: government agency        >>
            (J)  : <<誰か>: 政府               >>
EXAMPLE          : "I/you/he/she/we/they/person" "テストをする人"
                   "agency" : 政府 "テストをする機関"
                   "test conductor" "テストを行う人"
```

* PLEASE FILL FOLLOWING ESSENTIAL ITEMS
  ESSENTIAL (E) :
  ESSENTIAL (J) :

FIG.37

| PHRASE PATTERN | NUMBER OF STRACTURAL ELEMENTS |
|---|---|
| <v-\|test\|-003> | 0 |
| <n-\|test\|-002> | 0 |
| <n-\|test\|-003> | 0 |
| <p-\|of\|-001> | 1 |
| <vinf-\|to determine\|-001> | 1 |
| <vinf-\|to determine\|-002> | 0 |

(POINTER 0378)
(1) 50 (("試験する""テストする":"test":「機械や装置等のテストを行う場合」
 ..... 略....
(2) 30 (("試験する""テストする":"examine":「学科や知識などをテストする場合」)
 .....略....

FIG. 39

```
(<Required>
      (<SuBJ-ACT>              : he, she, man, company...
      (<DirObj-PATIENT>        : machine, device, gin,...
(<Preferred>
      (<Xobj-CONDITION>        : condition, state, ...
      (<X-BINARY-CONTRAST>     : good, bad, ...
      (<Xnnn-BOOLEAN>          : good, bad, ...
```

FIG. 40

| circumstance | 状態 | 事情 | 環境 | 事実 | ... |
|---|---|---|---|---|---|
| condition | 状態 | 条件 | 事情 | ... | |
| fact | 事実 | 現実 | | | |
| state | 状態 | 形態 | ... | | |
| ..... | | | | | |
| powder | 粉 | 粉末 | | | |
| dust | ちり | ほこり | 粉 | 粉末 | ... |
| ..... | | | | | |

FIG. 41

| machine | device | gin | ... |
|---|---|---|---|
| ...... | | | |
| powder | dust | ... | |
| ...... | | | |

FIG. 42

```
((<English-Patterns> : ①
    (<v-|test|-000>
        (<Pattern>      (|test| <SOMETHING>))
        (<Example>      "TEST (test-subj)"      [subj = を格]
                        "TEST FOR (condition)"  [cond = を格]
        (<Component>    (X1              <DirObj-PATIENT>))
        (<AltPat>       (<SOMETHING> |be tested|))
    )
    (<v-|test|-001>
        (<Pattern>      (|test| <SOMETHING> (<p-|for|-001>))
        (<Example>      "TEST (test-subj) FOR (state/condition)" )
        (<Component>    (X1              <DirObj-PATIENT>))
                        ((X2 X1)                <Xobj-CONDITION>))
        (<AltPat>       (<SOMETHING> |be tested|  (<p-|for|-001>)))
    )
    (<v-|test|-002>
        (<Pattern>      (|give| <n-|test|-000>)
        (<Example>      "GIVE A TEST IN (test-subj) FOR (state/condititon)" )
        (<AltPat>       (<n-|test|-000>) |be given|))
    )
    (<v-|test|-003>
        (<Pattern>      (conduct <n-|test|-002>)
                        (conduct <n-|test|-003>)
        (<Example>      "CONDUCT A TEST OF (test-subj) TO DETERMINE (A or B)" )
        (<AltPat>       (<n-|test|-002>  |be conducted|)
                        (<n-|test|-003>  |be conducted|))
    )
```

FIG. 43

```
(<n-|test|-000>
    (<Pattern>      (|test| (<p-|in|-001>) (<p-|for|-001>)))
    (<Example>      "A TEST IN (test-subj) FOR (state/condition)" )
    (<Component>    ((X1 X1)        <DirObj-PATIENT>)
                    ((X2 X1)        <Xobj-STATE>))
)
(<n-|test|-001>
    (<Pattern>      (|test| (<p-|of|-001>) (<p-|for|-001>)))
    (<Example>      "A TEST OF (test-subj) FOR (state/condition)" )
    (<Component>    ((X1 X1)        <DirObj-PATIENT>)
                    ((X2 X1)        <Xobj-CONDITION>))
)
(<n-|test|-002>
    (<Pattern>      (|test| (<p-|of|-001>) (<vinf-|to determine|-003>)))
    (<Example>      "A TEST OF (test-subj) TO DETERMINE (state)" )
    (<Component>    ((X1 X1)        <DirObj-PATIENT>)
                    ((X2 X1)        <Xnnn-BINARY_CONTRAST>))
)
(<n-|test|-003>
    (<Pattern>      (|test| (<p-|of|-001>) (<p-|with|-001>) (<p-|for|-001>)))
    (<Example>      "A TEST OF (test-subj) WITH (tool) FOR (purpose)" )
    (<Component>    ((X1 X1)        <DirObj-PATIENT>)
                    ((X2 X1)        <Xnnn-BOOLEAN>))
)
(<p-|in|-001>
    (<Pattern>      (|in| <SOMETHING>))
)
(<p-|of|-001>
    (<Pattern>      (|of| <SOMETHING>))
)
(<p-|with|-001>
    (<Pattern>      (|for| <SOME TOOL>))
)
(<p-|for|-001>
    (<Pattern>      (|for| <SOME PURPOSE>))
)
```

FIG. 44

```
[SourceTex (J)]

```
[TranTex (E)]

E01: The purpose of this study is to determine the oxygen transfer rate of
     the mechanical aerator.
E02: We conducted a series of tests to determine the oxygen transfer rate.
E03: Some of the tests were conducted with a polyethylene cover for
     simnlating an ice cover.
```

FIG. 46

```
[TranTex (E)]

E01: The purpose of this study is to determine the oxygen transfer rate of
     the mechanical aerator.
E02: We conducted a series of tests to determine the oxygen transfer rate.
E03: We conducted some of the tests with a polyethylene cover for simnlating
     an ice cover.
```

FIG. 47

STRUCTURE CONVERSION RULE IN TARGET-LANGUAGE INTERMEDIATE STRUCTURE :

1. ACTIVE-PASSIVE CONVERSION (1) IF ESSENTIAL INFORMATION <Subj-AGT> IS MISSING, STRUCTURE IS CONVERTED INTO PASSIVE ONE HAVING SUBJECT <DirObj-PATIENT>.

(2) IF ESSENTIAL INFORMATION <Indirobj-RECIPIENT> OUT OF <DirObj-PATIENT> AND <Indirobj-RECIPIENT>, STRUCTURE IS CONVERTED INTO PASSIVE ONE HAVING SUBJECT <DirObj-PATIENT>.

| MODE | ORIGINAL · INTERACTION | FIELD | HEAVY ELECTRICAL EQUIPMENT |

[JAPANESE] ORIGINAL
FILE | EDITING
変電所を対象としてテストを行った。

[ENGLISH] TRANSLATION
FILE | EDITING
<<someone>> conducted a test of transformer station. <for some purpose>

[EDITING] REFERENCE · COMMENT · REQUEST INFORMATION

TRANSLATION (E) : <<someone>> conducted a test of <<something (transformer station)>> <for some purpose>.
EQUIVALENT (J) : <<誰かが>> <何のために> 「テストする」 "test" : 「対象にして」 : この文型内に意味として表現されている。
COMMENT : 「テストする」 "test" : 機械や装置等のテストを行う場合。

* PLEASE FILL FOLLOWING ESSENTIAL ITEMS
ESSENTIAL (E) : <<someone>>
ESSENTIAL (J) : <<誰かが>>
EXAMPLE : "I/you/he/she/we/they/person" "テストをする機関" "テストする人"
          "agency" "テストをする機関"
          "test conductor" "テストを行う人"

* FOLLOWING ITEMS ARE PREFERABLE IN TARGET-LANGUAGE.
PLEASE FILL FOLLOWING PREFERABLE ITEMS.
IF UNNECESSARY, PLEASE INPUT "N".
OPTION (E) : <for some purpose>
OPTION (J) : <何のために>
EXAMPLE : "condition" "状態"
          "state" "状態"
          "circumstance" "状況"

FIG. 49

| MODE | ORIGINAL・INTERACTION | FIELD | HEAVY ELECTRICAL EQUIPMENT |

[JAPANESE] ORIGINAL

| FILE | EDITING |

変電所を対象にしてテストを行った。

[ENGLISH] TRANSLATION

| FILE | EDITING |

The government conducted a test of the transformer station.

[EDITING] REFERENCE・COMMENT・REQUEST INFORMATION

TRANSLATION (E) : ;<<someone:the government>> conducted a test of <<something (transformer station)>>
                (J) : <<政府>>が <<変電所>>の テストを行った。
EQUIVALENT  : 「テストする」"test" ；機械や装置等のテストを行う場合。
COMMENT     : 「対象にして」：この文型内に意味として表現されている。

* PLEASE FILL FOLLOWING ESSENTIAL ITEMS
ESSENTIAL (E) : <<someone: government           >>   "テストする人"
ESSENTIAL (J) : <<誰が：政府                     >>   "テストする人"
EXAMPLE   :  "I/you/he/she/we/they/person"  "テストする人"
             "agency"                       "テストを行う機関"
             "test conductor"              "テストを行う人"

FIG. 50

| MODE | ORIGINAL · INTERACTION | | FIELD | HEAVY ELECTRICAL EQUIPMENT |
|---|---|---|---|---|

[JAPANESE] ORIGINAL

| FILE | EDITING |
|---|---|

変電所を対象にしてテストを行った。

[ENGLISH] TRANSLATION

| FILE | EDITING |
|---|---|

The government agency conducted a test of the transformer station.

[EDITING] REFERENCE · COMMENT · REQUEST INFORMATION

```
TRANSLATION (E)  : <<someone:the government agency>> conducted a test of
                   <<something (transformer station)>>
EQUIVALENT  (J)  : <<<政府>> が <<変電所>> のテストを行う場合。
                   「テストする」 "test" ;機械や装置等のテストを行う場合。
    COMMENT      : 「対象にして」 :この文型内に意味として表現されている。
      EXAMPLE    : <<someone: government agency         >>
                   <<誰かが: 政府                         >>
                   "I/you/he/she/we/they/person"  "テストをする人"
                   "agency" :政府  "テストをする機関"
                   "test conductor"  "テストを行う人"
* PLEASE FILL FOLLOWING ESSENTIAL ITEMS
  ESSENTIAL (E)  :
  ESSENTIAL (J)  :
  EXAMPLE        :
```

FIG. 51

| MODE | ORIGINAL・INTERACTION | | FIELD | HEAVY ELECTRICAL EQUIPMENT |
|---|---|---|---|---|

[JAPANESE] ORIGINAL

| FILE | EDITING |
|---|---|

変電所を対象にしてテストを行った。

[ENGLISH] TRANSLATION

| FILE | EDITING |
|---|---|

<<someone>> conducted a test of transformer station, for safety

[EDITING] REFERENCE・COMMENT・REQUEST INFORMATION

```
TRANSLATION (E) : <<someone>> conducted a test of <<something (transformer
                   station)>> <for some purpose for safety>.
EQUIVALENT  (J) : <<<誰かが>><<変電所>>のテストを行った。
     COMMENT    : 「テストする」"test" : 機械や装置等のテストを行う場合。  >>
                  「対象にして」: この文型内に意味として表現されている。       >>

* PLEASE FILL FOLLOWING ESSENTIAL ITEMS
  ESSENTIAL  (E) : <<someone>> : government                                >>
  ESSENTIAL  (J) : <<誰かが>> : 政府                                         >>
  EXAMPLE        : "I/you/he/she/we/they/person" "テストをする人"
                   "agency" "テストをする機関"
                   "test conductor" "テストを行う人"

* FOLLOWING ITEMS ARE PREFERABLE IN TARGET-LANGUAGE.
  PLEASE FILL FOLLOWING PREFERABLE ITEMS.
  IF UNNECESSARY, PLEASE INPUT "N".
  OPTION  (E) : <for some purpose: for safety                               >
  OPTION  (J) : <何のために: 安全                                             >
  EXAMPLE     : "condition" "状態"
                "state"     "状態"
                "circumstance" "状況"
```

FIG. 52

| MODE | ORIGINAL · INTERACTION | | FIELD | HEAVY ELECTRICAL EQUIPMENT | |
|---|---|---|---|---|---|
| [JAPANESE] ORIGINAL | | | [ENGLISH] TRANSLATION | | |
| FILE | EDITING | | FILE | EDITING | |
| 変電所を対象にしてテストを行った。 | | | A test of the transformer station was conducted. | | |

[EDITING] REFERENCE · COMMENT · REQUEST INFORMATION

TRANSLATION (E) : A test of <<something (transformer station)>> was conducted.
EQUIVALENT (J) : <<変電所>>のテストが行われた。
COMMENT : 「テストする」"test" : 機械や装置等のテストを行う場合。
「対象にして」: この文型内に意味として表現されている。
SINCE THERE IS NO SUBJECT IN ORIGINAL, TRANSLATION IS PASSIVE

FIG. 53

1. INFORMATION IN NEED:日本文では表記されていないが、英文では必要とされる情報の入力を促すメッセージ

RequMess:‡次の必須項目を埋めて下さい。
   PrefMess:‡次の項目は目的言語では表記されるのが好ましいので、埋めて下さい。但し、不必要だと判断した場合にはNと入力して下さい。
   OptiMess:‡次の項目は目的言語では特に必要ではありませんが、埋めて下さい。但し、不必要だと判断した場合にはNと入力して下さい。

2. INFORMATION ON SENTENCE GRAMMAR:文レベルにおいて、日本文の中の語句に対応する直接的な訳語が英文中に存在しない場合や、日本語と英語の間で構文上の相違が見られる場合に提示するメッセージ。

InfoCovered1:この文型内に意味として表現されている。
   InfoCovered2:状態の意味は動詞の意味として含まれている。
   InfoCovered3:この意味は法助動詞に表現されている。
   ‡StrChanged1:原文に主語がないので、訳語を受動文にしている。
   ‡StrChanged2:原文に間接目的語がないので、訳文を直接目的語を主語とする受動文にしている。
   StrChanged3:日本語の存在文は英語では"there構文"で表現される。
         .
         .
         .

‡必須項目の情報がない場合に、利用可能な情報のみを使用して訳文を生成するときにのみ提示されるガイダンスメッセージ。

3. INFORMATION ON DISCOURSE GRAMMAR:談話レベルにおいて、前文の中にある事物や人を指示する語句が存在する場合の照応処理や旧情報の同定による構文変換が行なわれたことを提示するメッセージ。

InfoCoreferred:前文に同一指示物があるので照応処理を行っている。
   InfoGiven:前文との関係により「○○」は旧情報である。旧情報である「○○」は談話上の規則により文頭近くに訳出している。
         .
         .
         .

```
⌈  泊まる      stay                                                      ⌉
|  Tense       PAST                                                     |
|  PoS         TransVB                                                  |
|                                                                       |
|  Subj              ⌈ 必須    私 (が)          ⌉                         |
|                    ⌊ DEF    someone         ⌋                         |
|                                                                       |
|  PrepDO            ⌈ Prep   with                        ⌉             |
|                    |                                     |             |
|                    |                ⌈ 候補  彼の家 (に) ⌉ |             |
|                    | Obj            | sem   him         | |             |
|                    |                ⌊ DEF   someone    ⌋ |             |
|                    ⌊                                     ⌋             |
|                                                                       |
|  REL-STAY_WITH     ⌈ 任意   新しい  ⌉                                   |
|                    ⌊ sem    new    ⌋                                   |
⌊                                                                       ⌋
```

FIG. 57

```
┌──────────────────────────────────────────────────────────────────────┐
│ REL-STAY_WITH :  stay with X MEANS THAT "Xの家に泊まる"..              │
│                  TRANSLATION DOES NOT REFLECT MODIFIER " " OF X      │
│                  YES OR NO ? (Y/N)                                    │
└──────────────────────────────────────────────────────────────────────┘
```

FIG. 59

```
[ 泊まる    stay                                                        ]
[ Tense    PAST                                                        ]
[ PoS      TransVB                                                     ]
[                                                                      ]
[ Subj     [ 必須   私   (が)     ]                                      ]
[          [ DEF   someone       ]                                     ]
[                                                                      ]
[ PrepDO   [ Prep   at                                          ]      ]
[          [                                                    ]      ]
[          [ Obj   [ 候補   彼の新らしい家   (に) ]                ]      ]
[          [       [ sem    his new house         ]             ]      ]
[          [       [ DEF    place                 ]             ]      ]
```

FIG. 61

| MODE | ORIGINAL · INTERACTION | | FIELD | LETTER |

[JAPANESE] ORIGINAL

FILE | EDITING

私は、<u>あなたがするか否かを決断するために</u>

装置をテストする

[ENGLISH] TRANSLATION

FILE | EDITING

I conduct a test of the device <u>to decide</u>

<u>whether you will do it or not.</u>

[EDITING] REFERENCE · COMMENT · REQUEST INFORMATION

PART OF ==== IS OPTIONAL PART MADE USING FOLLOWING PHRASE PATTERN.

<vinf-|to decide|-000>

```
<vinf-|to decide|-000>
    (<Pattern>      (|to decide| (<sub_con-|whether|-000>)
    (<Example>      "TO DECIDE WHETHER (A or not A)' )
    (<Component>    ((X1 X1)      <Xnnn-BOOLEAN>))

<vinf-|to decide|-001>
    (<Pattern>      (|to decide| (<sub_con-|whether|-001>)
    (<Example>      "TO DECIDE WHETHER (A or B)' )
    (<Component>    ((X1 X1)      <Xnnn-BINARY_CONDITION>))
```

FIG. 63

```
(<n-|test|-004>
    (<Pattern>      (|test| (<p-|of|-001>)  (vinf-|to decide|-000)
    (<Example>      "A TEST OF (test-subj) TO DECIDE (WHETHER A or not A
)' )
    (<Component>    ((X1 X1)      <DirObj-PATIENT>)
                    ((X2 X1)      <Xnnn-BOOLEAN>))
)
```

```
USER1:
    <vinf-|to decide|-000>
        (<Pattern>       (|to decide| (<sub_con-|whether|-000>)
        (<Example>       "TO DECIDE WHETHER (A or not A)' )
        (<Component>     ((X1 X1)       <Xnnn-BOOLEAN>))

USER2:
    <vinf-|to decide|-001>
        (<Pattern>       (|to decide| (<sub_con-|whether|-001>)
        (<Example>       "TO DECIDE WHETHER (A or B)' )
        (<Component>     ((X1 X1)       <Xnnn-BINARY_CONDITION>))
```

FIG. 66

| TRANSLATION UNIT | |
|---|---|
| CONVENTIONAL TRANSLATION UNIT | TRANSLATION UNIT ACCORDING TO THE INVENTION |
| ANALYSIS | INTERMEDIATE STRUCTURE ACQUISITION |
| | IC EXTRACTION |
| (CONVERSION) | SENTENCE PATTERN IDENTIFICATION |
| | SENTENCE PATTERN REQUEST INFORMATION ACQUISITION |
| CREATION | INTERMEDIATE STRUCTURE DESIDING |
| | SENTENCE CREATING |

```
-- JAPANESE ---

ENTRY(J)      READING(J)       MEANING(J)            IC
   ---------------------------------------------------------
   愛            あい             名詞性      "好"        0

驚かす         おどろかす        動作性      "驚"        5
   驚き          おどろき         名詞性      "驚"        4
   驚く          おどろく         動作性      "驚"        5

報告          ほうこく         名詞性      "報告"              5
   報告書         ほうこくしょ      名詞性      "報告" + "記載物"   3
   報告する       ほうこくする      動作性      "報告"              5

-- ENGLISH ---

ENTRY(E)                      MEANING(E)           IC
   --------------------------------------------------------- amaze           動作性         "SURPRISE"          5
   amazement       名詞性         "SURPRISE"          4
   shock           動作性         "SURPRISE"          6
   surprise        動作性         "SURPRISE"          6
   surprise        名詞性         "SURPRISE"          5 report          名詞性         "REPORT"            4
   report          動作性         "REPORT"            6
   information     名詞性         "REPORT"            5
   inform          動作性         "REPORT"            4 document        名詞性         "DOCUM"             3
   report          名詞性         "DOCUM"             4
   paper           名詞性         "DOCUM"             5
```

FIG. 72

| MEANING(J) | POINTER(J) | MEANING(E) | POINTER(E) |
|---|---|---|---|
| "驚" | 0202 | "SURPRISE" | 0982 |
| "報告" | 0245 | "REPORT" | 0744 |
| "記載物" | 0263 | "DOCUM" | 0991 |

FIG. 73

```
(0202: "驚"
    pattern1:    <誰か> が <何か> に 驚く
    pattern2:    <何か> が <誰か> を 驚かす
    ...............

(0892: "SURPRISE"
    pattern1:    <SOMETHING, SOMETHING> surprise <SOMEONE>
    pattern2:    <SOMEONR> be surprised (by, at) <SOMETHING, SOMETHING>
    pattern3:    <SOMETHING, SOMEONE> have a surprise for <SOMEONE>
    pattern4:    <SOMEONE, SOMETHING> amaze <SOMEONE>
    ...............
```

FIG. 74

```
SOMETHING:= "その月間セールス報告書"
SOMEONE:= "私"
====>
p1=>    <その月間セールス報告書> surprise <私>
p2=>    <私> be surprised (by, at) <その月間セールス報告書>
p3=>    <その月間セールス報告書> have a surprise for <私>
p4=>    <その月間セールス報告書> amaze <私>
...............
```

FIG. 75

```
step1 →    = a * INPUT ORIGINAL        : 私はその月間セールス報告書を読んで驚いている。
step2 →    b = a   TRANSLATION RESULT 1 : This monthly sales report surprised me.
step3 →    * * DO YOU CONCIRM RESULT ?   Y/N : = Y
```

FIG.76

```
          *>>>>CONFIRMATION MODE <<<<START ..............
step 4 →  *WHAT CONFIRMATION PROCESS ?   1 : RETRANSLATION    2 : WORD-TO-WORD   3 :.......:=1
          ****RETRANSLATION MODE ****START
step 5 →  *WHAT TRANSLATION PROCESS ?    1 : SD TRANSLATION   2 : TD TRANSLATION 3 :.......:=1
step 6 →  *LANGAGE                       1 : 日本語           2 : フランス語      3 :.......:=1
step 7 →  *SYSTEM DICTIONARY ?   Y/N:=Y
step 8 →  *INPUT 1 *      =b
step 9 →  c=b  TRANSLATION RESULT 2 : その月間セールス報告書は私を驚かせた。
step 10 → *CONTINUE ?   Y/N:=Y
step 11 → *INPUT 2 *      =a
step 12 → d=c  TRANSLATION RESULT 3 : I'm surprised by this monthly sales report.
```

FIG. 77

```
step 13 →   *CONTINUE ? Y/N : =N step 14 →   *WHAT TRANSLATION PROCESS ?    1 : SD TRANSLATION   2 : TD TRANSLATION   3 :......: = 2 step 15 →   *INPUT 3 *   = c step 16 →   e = c   TRANSLATION RESULT 4 : This monthly sales report surprised me.
```

FIG. 78

```
step17 →    *CONTINUE ? Y/N : = N
step18 →    *RETRANSLATION IS CONTINYUED ? Y/N : = N
step19 →    *CONFIRMATION MODE IS CONTINUED ? Y/N : = Y
step20 →    *WHAT CONFIRMATION PROCESS ? 1 : RETRANSLATION   2 : WORD-TO-WORD   3 :...... := 2
step21 →    ****WORD-TO-WORD MODE ****
            INPUT WORD AFTER " := ". TERMINATION  [↵]
step22 →    : this monthly sales report
                ===>   : その月間セールス報告書
step23 →    : report
                ===>   : 報告書, リポート, ...
step24 →    ..........
            : =   [↵]
```

FIG. 79

```
step25 →    *RETRANSLATION IS CONTINUED ? Y/N:=N step26 →    *CONFIRMATION MODE IS CONTINUED ? Y/N:=N

*>>>>CONFIRMATION MODE <<<<END ........

step27 →    *WHICH DO YOU SELECT AS TRANSLATION RESULT OF =a ?  :=b
```

FIG. 81

```
ORIGINAL            : 変電所をテストした
MORPHEMES           : <変電所> <を> <テストする> <た>
ANALYZED STRUCTURE: [テストする
                     (tense <PAST>)
                     (の を [変電所])]

ORIGINAL            : 変電所のテストを行った
MORPHEMES           : <変電所> <の> <テスト> <を> <行う> <た>
ANALYZED STRUCTURE: [行う
                     (tense <PAST>)
                     (の を [テストする
                              (others <名詞性>)
                              (の の [変電所])])]

ORIGINAL            : 変電所を対象にして、テストを行った
MORPHEMES           : <変電所> <を> <対象> <に> <する> <て>, <テスト> <を> <行う> <た>
ANALYZED STRUCTURE: [行う
                     (tense <PAST>)
                     (の を [テストする
                              (others <名詞性>)])
                     [する
                      (pre-supp
                       (の に   [対象]
                       (の を   [変電所])])]

ORIGINAL            : テストした
MORPHEMES           : <テストする> <た>
ANALYZED STRUCTURE: [テストする
                     (tense <PAST>)]
```

FIG. 82

```
test
  TO_SEARCH1            ((テストする) (試験する))
  TO_SEARCH2            ((テスト) (を) '(行う) (試験) (を) '(行う))
                        (テストする 試験する)
Required
  AGENT:主語
    DEFAULT_VALUE       (((SOMEONE) (行為者))
                        ((PERSON) (テストする人))
                        ((AGENCY) (テストを行う人))   ((TEST CONDUCTOR) (テストを行う人))
                        ((動) が [*1]))
  TO_FILL
  OBJECT:直接目的語
    DEFAULT_VALUE       (((SOMETHING) (対象))
                        ((TEST SUBJECT) (テスト対象)))
  TO_FILL               ((動) を [*1]) (動の [*1])
                        [する (*1) と [対象]] [*1] ((する (動に [対象]) (動を [*1])))
Preferred
  CONDITION:状態
    DEFAULT_VALUE       (((CONDITION/STATE) (状態))
                        ((CIRCUMSTANCES) (状況)))
  TO_FILL               (動のために [*1]) (動のため [*1])
  OR_COND:OR 状態
    DEFAULT_VALUE       (((A or B) (A か B))
                        ((CONDITION/STATE A or B) (状態 A か B))
                        ((CIRCUMSTANCES A or B) (状況 A か B)))
  TO_FILL               (動のために (#OR [*1] [*2])) (動のために (#OR [*1] [*2]))
PATTERNS
  (v-|test|-000)        (#OBJECT#)
  (v-|test|-001)        (#OBJECT#  #CONDITION#)
  (v-|test|-002)        (#OBJECT#  #CONDITION#)
  (v-|test|-003)        (#OBJECT#  #OR_COND#)
  (n-|test|-001)        ((others) (名詞性))  #OBJECT#  #CONDITION#)
  (n-|test|-002)        ((others) (名詞性))  #OBJECT#  #OR_COND#)
```

FIG. 83

```
<v-|test|-000>
    PATTERN     ((X0 |test| X1))
    COMPONENT   ((X0      #AGENT#)
                 (X1      #OBJECT#))
    EXAMPLE     (((<SOMEONE> tests <SOMETHING>))

<v-|test|-001>
    PATTERN     ((X0 |test| X1 <p- for -001>))
    COMPONENT   ((X0      #AGENT#)
                 (X1      #OBJECT#))
                 ((X2 X1) #CONDITION#))
    EXAMPLE     (((<SOMEONE> tests <SOMETHING> for <CONDITION/STATE>))

<v-|test|-002>
    PATTERN     ((X0 |make| <v-|test|-001>)
    COMPONENT   ((X0      #AGENT#)
    EXAMPLE     (((<SOMEONE> makes a test of <SOMETHING> for <CONDITION/STATE>))

<v-|test|-003>
    PATTERN     ((X0 |conduct| <n-|test|-002>)
    COMPONENT   ((X0      #AGENT#)
    EXAMPLE     (((<SOMEONE> conducts a test of <SOMETHING> to determine <A or B>))

<n-|test|-001>
    PATTERN     ((|test| <p-|of|-001> <p-|for|-001>))
    COMPONENT   (((X1 X1) #OBJECT)
                 ((X2 X1) #CONDEITION))
    EXAMPLE     ((a test of <SOMETHING> for <CONDITION/STATE>))

<n-|test|-002>
    PATTERN     ((|test| <p-|of|-001> <vinf-|to determine|-001>))
    COMPONENT   (((X1 X1) #OBJECT)
                 ((X2 X1) #OR_COND))
    EXAMPLE     ((a test of <SOMETHING> to determine <A or B>))

<p-|of|-001>
    PATTERN     ((|of| X1))
    EXAMPLE     ((OF <SOMETHING>))

<p-|for|-001>
    PATTERN     ((|for| X1))
    EXAMPLE     ((OF <SOMETHING>))

<vinf-|to determine|-001>
    PATTERN     ((|to determine| X1))
    EXAMPLE     ((to determine <A or B>))
```

FIG. 84

```
<v-|test|-000>
    PATTERN     ((X0 |test| X1))
    COMPONENT   ((X0     #AGENT#)
                 (X1     #OBJECT#))
    EXAMPLE     (((<SOMEONE> tests <SOMETHING>))
    J-PATTERN   ((X0 が X1 を テストする))

<v-|test|-001>
    PATTERN     ((X0 |test| X1 <p-|for|-001>))
    COMPONENT   ((X0     #AGENT#)
                 (X1     #OBJECT#))
                ((X2 X1) #CONDITION#))
    EXAMPLE     (((<SOMEONE> tests <SOMETHING> for <CONDITION/STATE>))
    J-PATTERN   ((X0 が X1 を <p-|for|-001> テストする))

<v-|test|-002>
    PATTERN     ((X0 |make| <v-|test|-001>)
    COMPONENT   ((X0     #AGENT#)
    EXAMPLE     (((<SOMEONE> makes a test of <SOMETHING> for <CONDITION/STATE>))
    J-PATTERN   ((X0 が <n-|for|-001> を 行う))

<v-|test|-003>
    PATTERN     ((X0 |conduct| <n-|test|-002>)
    COMPONENT   ((X0     #AGENT#)
    EXAMPLE     (((<SOMEONE> conducts a test of <SOMETHING> to determine <A or B>)
    J-PATTERN   ((X0 が <n-|for|-002> を 実施する))

<n-|test|-001>
    PATTERN     ((|test| <p-|of|-001> <p-|for|-001>))
    COMPONENT   (((X1 X1) #OBJECT)
                 ((X2 X1) #CONDEITION))
    EXAMPLE     ((a test of <SOMETHING> for <CONDITION/STATE>))
    J-PATTERN   ((<p-|for|-001> の <p-|of|-001> テスト))

<n-|test|-002>
    PATTERN     ((|test| <p-|of|-001> <vinf-|to determine|-001>))
    COMPONENT   (((X1 X1) #OBJECT)
                 ((X2 X1) #OR_COND))
    EXAMPLE     ((a test of <SOMETHING> to determine <A or B>))
    J-PATTERN   (((<vinf-|to determine|-001> の <p-|of|-001> テスト))

<p-|of|-001>
    PATTERN     ((|of| X1))
    EXAMPLE     ((OF <SOMETHING>))
    J-PATTERN   ((X1 の))

<p-|for|-001>
    PATTERN     ((|for| X1))
    EXAMPLE     ((OF <SOMETHING>))
    J-PATTERN   ((X1 の ため))

<vinf-|to determine|-001>
    PATTERN     ((|to determine| X1))
    EXAMPLE     ((to determine <A or B>))
    J-PATTERN   ((X1 を 決める ため))
```

ORIGINAL: 変電所を対象にして、テストを行なった。

[CONVENTIONAL TECHNIQUE]
TRANSLATION : A test was conducted. with the transformer
              station as the subject.
              Taking a transformer station as the subject.
              a test was conducted.

(b)

[INVENTION]
TARGET PATTERN : [(Someone) conducts a test of (something) {for
                 (some purpose)}.]

(c)

AFTER INTRODUCING INFORMATION OF ORIGINAL
            : [(Someone) conducted a test of (a) transformer
              station {for (some purpose)}.]

AFTER INTERACTION WITH USER
            : [The government agency conducted a test of
              the transformer station {for (some purpose)}.]

(d)

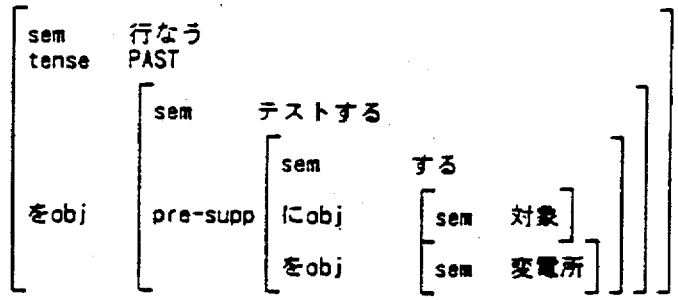

(e)

$$\begin{bmatrix} \text{テストを行なう} & \text{conduct a test} \\ \text{PoS} & \text{TransVB} \\ \text{Subj} & \begin{bmatrix} \text{FUNCTION NAME}(\text{が}) \\ \text{DEF} \quad \text{someone} \end{bmatrix} \\ \text{PrepDO} & \begin{bmatrix} \text{Prep of} \\ \text{Obj} & \begin{bmatrix} \text{SURFACE LEVEL WORD (対象) -UPPER STRUCTURE} \\ \qquad\qquad\qquad\qquad\qquad \text{-FUNCTION NAME (をobj)} \\ \text{DEF} \quad \text{something} \end{bmatrix} \end{bmatrix} \end{bmatrix}$$

FIG. 88

| MODE | | |
|---|---|---|
| JAPANESE | | ENGLISH |
| FILE \| EDITING | | FILE \| EDITING |
| 変電所を対象にしてテストを行なった。 | | \<Someone\> conducted a test of 変電所 \<for some purpose\>. |

INPUT (WHO) (WHAT PURPOSE)「変電所を対象にしてテストを行なった」のですか？
WHO：
WHAT PURPOSE

| 我々 (we) |
|---|
| わたし（I） |
| その他 |
| 不明 |

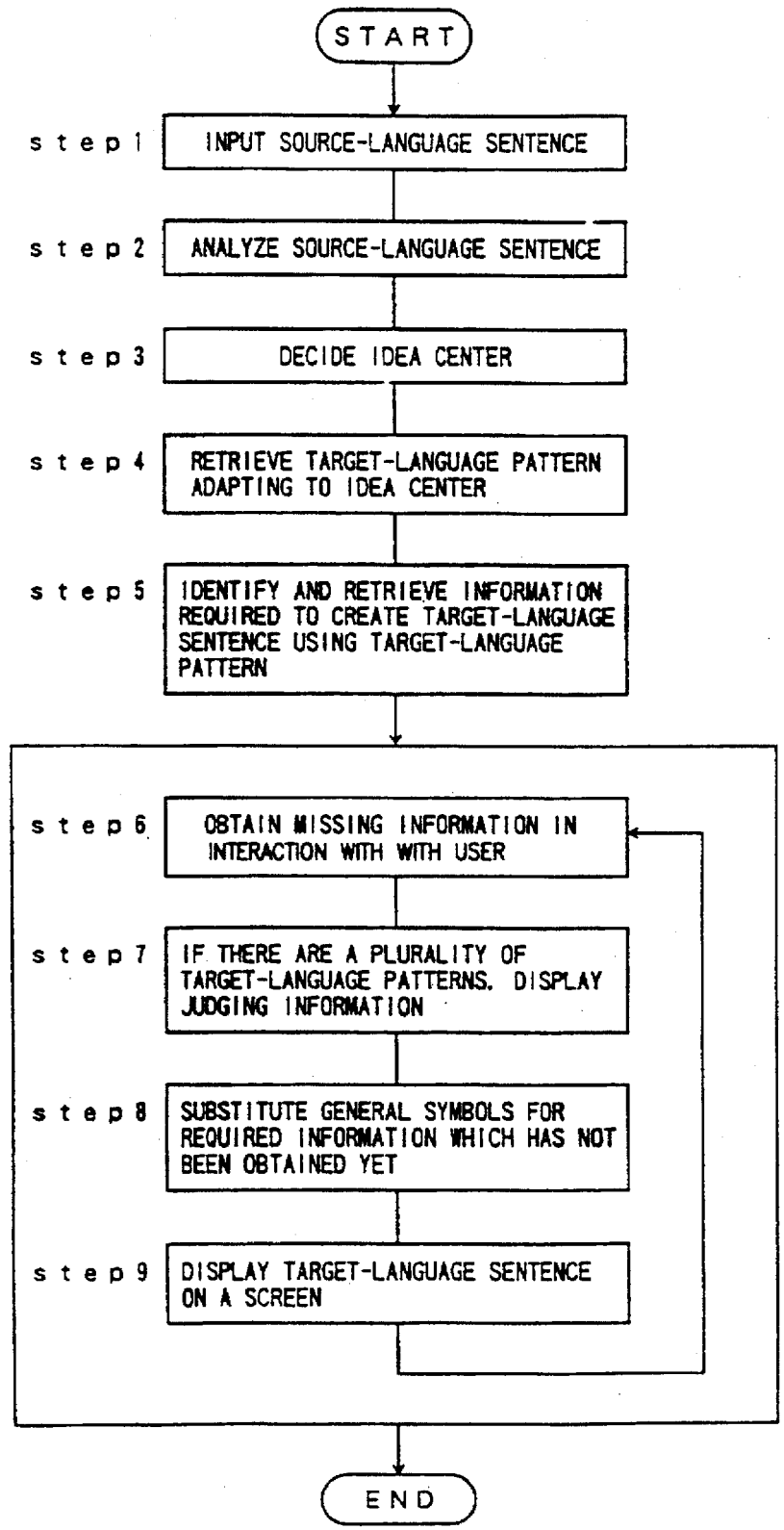

FIG. 90

| 果（た）す | | | |
|---|---|---|---|

{TYPE1}

〔目的語；| |内：言い換え〕

| | ( ORIGINAL REPRESENTATION ) | ( REPRESENTATION TYPE ) | ( EXPLAINING SENTENCE NO. ) |
|---|---|---|---|
| ①義務を | 〈尽（く）す〉 | | |
| | db \| 〈one's〉 duty | 『一般』 | 291501 |
| | perform \| 〈one's〉 duty | 『形式』 | 291502 |
| | carry out \| 〈one's〉 duty | 『一般』 | 291503 |
| | ................................... | | |
| | fulfill \| 〈one's〉 obligations | 『形式』 | 291506 |
| | discharge \| 〈one's〉 duties | 『形式』 | 291507 |
| | ................................... | | |
| ②使命を | | | |
| | perform \| 〈one's〉 mission | 『一般』 | 291601 |
| | fulfill \| 〈one's〉 mission | 『一般』 | 291602 |
| | ................................... | | |
| ③約束を | 〈守る，履行する〉 | | |
| | keep \| 〈one's〉 word | 『一般』 | 291701 |
| | live up to \| 〈one's〉 word | 『一般』 | 291702 |
| | ................................... | | |
| | keep \| 〈one's〉 promise | 『一般』 | 291705 |
| | ................................... | | |
| | abide by \| 〈one's〉 promise | 『一般』 | 291709 |
| | ................................... | | |
| | fulfill \| 〈one's〉 engagement | 『一般』 | 291711 |

..................................

{TYPE2}

[TYPE1]

(目的語:( )内:言い換え)

| ORIGINAL REPRESENTATION | REPRESENTATION TYPE | SELECTING ORDER | EXPLAINING SENTENCE NO. |
|---|---|---|---|
| ①義務を | | | |
| 尽(く)す | 「一般」 | 11125 | 291501 |
| do 丨 〈one's〉 duty | 「形式」 | 24530 | 291502 |
| perform 丨 〈one's〉 duty | 「形式」 | 36750 | 291503 |
| carry out 丨 〈one's〉 duty | | | |
| fulfill 丨 〈one's〉 obligations | 「形式」 | 54831 | 291506 |
| discharge 丨 〈one's〉 duties | 「形式」 | 67343 | 291507 |
| ②使命を | | | |
| ( ) | 「一般」 | 12110 | 291601 |
| perform 丨 〈one's〉 mission | 「一般」 | 21220 | 291602 |
| fulfill 丨 〈one's〉 mission | | | |
| ③約束を | | | |
| (守る、履行する) | 「一般」 | 11133 | 291701 |
| keep 丨 〈one's〉 word | 「一般」 | 20000 | 291702 |
| live up to 丨 〈one's〉 word | | | |
| keep 丨 〈one's〉 promise | 「一般」 | 42222 | 291705 |
| abide by 丨 〈one's〉 promise | 「一般」 | 60000 | 291709 |
| fulfill 丨 〈one's〉 engagement | 「一般」 | 83333 | 291711 |

[TYPE2]

(TYPE1)

(目的語:()内:書い換え)

| ORIGINAL REPRESENTATION | REPRESENTATION TYPE | SELECTING ORDER | EXPLAINING SENTENCE NO. | COOPERATIVE REPRESENTATION 1 | COOPERATIVE REPRESENTATION 2 |
|---|---|---|---|---|---|
| ①義務を (尽(く)す) db │ ⟨one's⟩ duty perform │ ⟨one's⟩ duty carry out │ ⟨one's⟩ duty | 「一般」 「形式」 「一般」 | 11125 24530 36750 | 291501 291502 291503 | 305101 | 524503 854707 421303 |
| fulfill │ ⟨one's⟩ obligations discharge │ ⟨one's⟩ duties | 「形式」 「形式」 | 54831 87343 | 291506 291507 | | 637207 513305 |
| ②使命を ( ) perform │ ⟨one's⟩ mission fulfill │ ⟨one's⟩ mission | 「一般」 「一般」 | 12110 21220 | 291601 291602 | 305102 | 854709 637209 |
| ③約束を (守る、履行する) keep │ ⟨one's⟩ word live up to │ ⟨one's⟩ word | 「一般」 「一般」 | 11133 20000 | 291701 291702 | 305103 | 773204 815221 |
| keep │ ⟨one's⟩ promise | 「一般」 | 42222 | 291705 | | 773206 |
| abide by │ ⟨one's⟩ promise | 「一般」 | 60000 | 291709 | | 135215 |
| fulfill │ ⟨one's⟩ engagement | 「一般」 | 83333 | 291711 | | 637205 |

(TYPE2)

FIG. 96

| MODE | |
|---|---|
| JAPANESE | ENGLISH　　　FIELD: LAW |
| FILE │ EDITING | FILE │ EDITING |
| 義務を果たした。 | < Someone >　fulfill ⟨one's⟩ obligato<br>　　　　　　　　discharge ⟨one's⟩ duties<br>　　　　　　　　do ⟨one's⟩ duty.<br>　　　　　　　　．．．．．．．．．．．．．．．．．．<br>　　　　　　　　．．．．．．．．．．．．．．．．．． |

INPUT (WHO)「義務を果たした」のですか？

WHO :
　　　┌─────────────┐
　　　│ 彼 (He)      │
　　　│             │
　　　│ 彼女 (She)   │
　　　│ 私 (I)       │
　　　│             │
　　　│ ．．．．．．．．．．│
　　　└─────────────┘

FIG. 97

```
| MODE |
| JAPANESE                    | ENGLISH                       |
| FILE | EDITING |            | FILE | EDITING |             |
|                             |      ① He did his duty.       |
| （彼が）義務を果たした。    |         ◇ GENERAL EXPRESSION  |
|                             |      ② He performed his duty. |
|                             |         ◇ FORMAL EXPRESSION   |
```

INPUT

《SELECT REPRESENTATION PATTERN》(☆ CURSOR or No.)
SELECTING No. : 1

FIG. 98

| MODE | |
|---|---|
| JAPANESE | ENGLISH |
| FILE \| EDITING | FILE \| EDITING |
| (彼が) 義務を果たした。 | 果 ① He did his duty.<br>◇ GENERAL EXPRESSION<br>② He performed his duty.<br>◇ FORMAL EXPRESSION<br>................................<br>................................ |

SYSTEM SETTING [3] (TERMINATION : CANCEL KEY OR RIGHT BUTTON)

《SELECT EVALUATION FACTOR》 (☆ CURSOR or No.)
SELECTING No. : 3

《PLURALITY OF PATTERNS
       EVALUATION FACTOR》
❶ REPRESENTATION TYPE
❷ FIELD ( AUTO | MANUAL )
❸ SOURCE − LANGUAGE REPRESENTATION
④ TARGET − LANGUAGE REPRESENTATION
.................

FIG. 99

| MODE | |
|---|---|

| JAPANESE | | |
|---|---|---|
| FILE | EDITING | |

（彼が）義務を果たした。

| ENGLISH | | |
|---|---|---|
| FILE | EDITING | |

He ① He did his duty.
◇ GENERAL EXPRESSION
② He performed his duty.
◇ FORMAL EXPRESSION
. . . . . . . . . . . . . . . . . . . . . . . . . . .
. . . . . . . . . . . . . . . . . . . . . . . . . . .

SYSTEM SETTING [4] (TERMINATION : CANCEL KEY OR RIGHT BUTTON)

《SELECT DISPLAY METHOD》 (☆ CURSOR or No.)
SELECTING No. : <u>3</u>

《PLURALITY OF PATTERNS DISPLAYING》
(ORDER : FROM HIGHEST EVALUATION VALUE)
① ONLY 1st CANDIDATE
■ 1st ~ ③ - th CANDIDATES
③ ALL CANDIDATES (MAX : ⑦)
. . . . . . . . . . . . . . . .

FIG.102

```
Q_JP   SIMPLE JAPANESE ANALYSIS SYSTEM

| 【研究】 | --> investigation |
| 【これまで】 | --> prior_work |
| 【本稿】 | --> this_paper |
| 【述べ】 | --> this_paper |
| 【実現】 | --> implement |
| 【特徴】 | --> advantages |

[investigation
prior_work
this_paper
this_paper
implement]

EXTENSION OF PRIOR WORK

ORIGINAL TEXT        CORRESPONDING           TYPICAL TEXT
ELEMENTS             TARGET-LANGUAGE         STRUCTURE
                     ELEMENTS (a)                  (b)                     (c)

FIG.104

```
investigation  -->  SOMEONE's present investigation is (about SOMETHING) (for SOME PURPOSE)
prior_work     -->  SOMEONE's previous work has been (about SOMETHING) (in order to SOME PURPOSE)
this_paper     -->  This paper descusses SOMETHING
this_paper     -->  SOMETHING has been implemented (on SOME MACHINE) (using SOME METHOD)
implement      -->  SOMETHING has SOME ADVANTAGEs
```

ELEMENTS OF
TYPICAL TEXT
STRUCTURE (a)

SENTENCE GENERATED FROM
ELEMENTS OF TYPICAL TEXT
STRUCTURE (b)

FIG.105

SOMEONE's present investigation is (about SOMETHING) (for SOME PURPOSE)
SOMEONE's previous work has been (about dialogue-style Japanese parsing) (in order to SOME PURPOSE)
This paper descusses a practical Japanese parser.
SOMETHING has been implemented (on a workstation) (using a prototyping language)
SOMETHING has SOME ADVANTAGEs

FIG.106

Our group's present investigation is (about efficient morphological analysis) (for parsing Japanese).
Our previous work has been (about semantic analysis) (in order to analyze Japanese).
This paper discusses Q_JP, a Quick Japanese Parser.
Q_JP has been implemented (on a Sun Workstation) (using a prototyping language).
The method has the following advantages.
    Speed
    A small dictionary
    Syntactic analysis using only morphological information

FIG. 107

| TARGET-LANGUAGE | SOURCE-LANGUAGE | | | | |
|---|---|---|---|---|---|
| investigation | 検討 | 考察 | | | |
| prior_work | これまで | これ迄 | 従来 | | |
| goals | 狙 | 目的 | 目標 | 目指 | |
| this_paper | この論文 | 本稿 | 本論文 | ここでは | 述べ |
| implement | 実現 | 実験 | | | |
| techniques | 手段 | 手法 | | | |
| advantages | できること | 特徴 | 良い | | |

FIG. 108

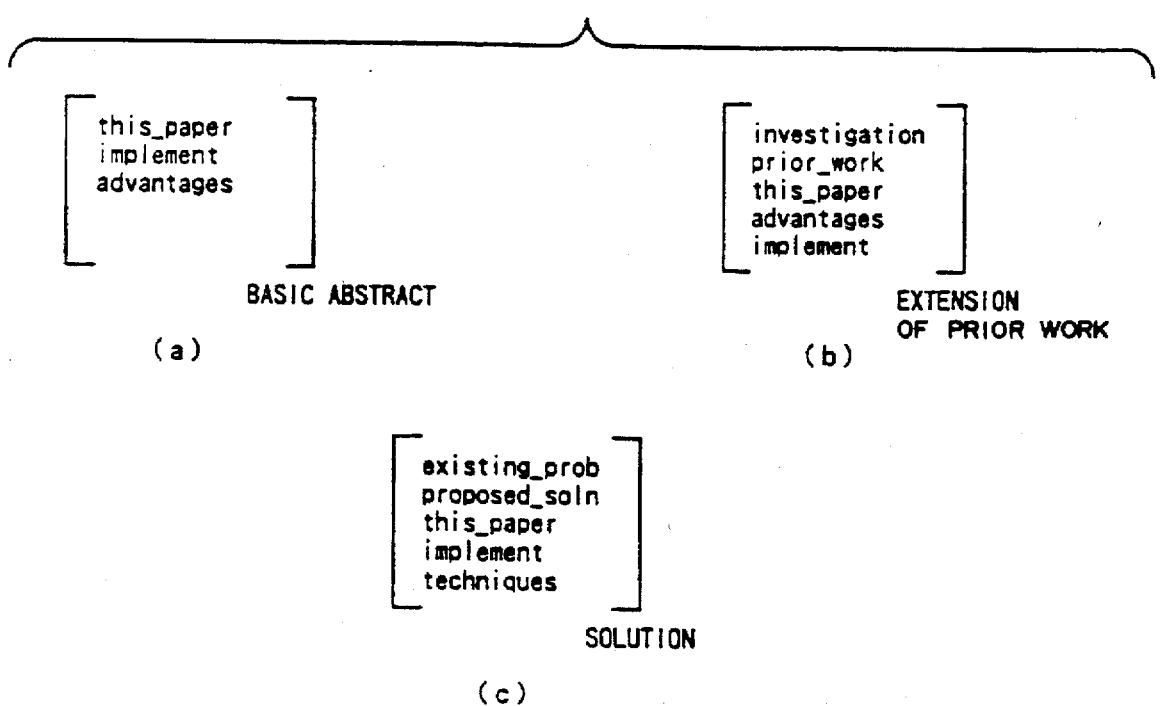

(a) BASIC ABSTRACT: [this_paper, implement, advantages]

(b) EXTENSION OF PRIOR WORK: [investigation, prior_work, this_paper, advantages, implement]

(c) SOLUTION: [existing_prob, proposed_soln, this_paper, implement, techniques]

FIG. 109A

```
ID NO.   <LABEL>     SENTENCE ID    KEYWORD

```
ID NO. (TEXT ELEMENT ID)

```
S001   This paper discusses SOMETHING.
S002   SOMEONE's present investigation is (about SOMETHING) (for SOME PURPOSE).
S003   SOMETHING has been implemented (on SOME MACHINE) (using SOME METHOD).
S004   SOMETHING has SOME ADVANTAGEs.
S005   SOMEONE's previous work has been (about SOMETHING) (for SOME PURPOSE).
S006   This paper discusses SOMETHING.
              :
              :
```

FIG. 111A

```
┌─────────────────────────────────────────────────┐
│ ☐        SELECTION OF TEXT ELEMENT              │
├─────────────────────────────────────────────────┤
│  ★   SELECT MATTER TO BE DESCRIBED              │
├─────────────────────────────────────────────────┤
│         ☑ PRIOR RESEARCH                        │
│         ☐ PURPOSE OF PRESENT RESEARCH           │
│         ☐ CONTENTS OF PRESENT MANUSCRIPT        │
│         ☑ MOUNTING CONDITION                    │
│         ☐ TESTING CONDITION                     │
│         ☐ PURPOSE OF PRESENT RESEARCH           │
│         ☑ FEATURE OF PRESENT RESEARCH           │
│         ☑ ABSTRACT OF PRESENT RESEARCH          │
│         ☐ CONCLUSION                            │
└─────────────────────────────────────────────────┘
```

FIG. 111B

```
┌─────────────────────────────────────────────────┐
│ ☐        SELECTION OF TEXT ELEMENT              │
├─────────────────────────────────────────────────┤
│  ★    TEXT STRUCTURE CAN NOT BE DETERMINED      │
│ SELECT MATTER TO BE DESCRIBED FROM FOLLOWING MATTERS │
├─────────────────────────────────────────────────┤
│         ☐ CONTENTS OF PRESENT MANUSCRIPT        │
│         ☑ ABSTRACT OF PRESENT STUDY             │
│         ☐ CONCLUSION                            │
│         ☐ EXTENSION                             │
│                                                 │
└─────────────────────────────────────────────────┘
```

FIG.114A

SOMEONE's present investigation is (about SOMETHING) (for SOME PURPOSE).
SOMEONE's previous work has beeb (about SOMETHING) (in order to SOME PURPOSE).
This paper discusses SOMETHING.
SOMETHING has been imlemented (on SOME MACHINE) (using SOME METHOD).
SOMETHING has SOME ADVANTAGEs.

FIG.114B

Our group's present investigation is (about efficient morphological analysis) (for parsing Japanese).
Our previous work has been (about semantic analysis) (in order to analyze Japanese).
This paper discusses Q_JP, a Quick Japanese Parser.
Q_JP has been implemented (on a workstation) (using a prototype language).
The method has the following advantages.
    Speed
    A small dictionary
    Syntactic analysis using only morpholigical information.

FIG.116

| ID NO. | SENTENCE PATTERN ID | SURFACE LEVEL OF ORIGINAL TEXT |
|---|---|---|
| C001 | (S002) | "以前の研究" "従来" "これまで" |
| C002 | (S008) | "研究の目的" "本研究の狙い" |
| C003 | (S001) | "本稿では" "本論文" |
| C004 | (S004) | "特徴" "特長" "長所" |
| C005 | (S003) | "実装" "実現" |
| C006 | (S002) | "概略" "本研究の概要" "本研究の要約" |
| C007 | (S010) | "実験条件" "実行環境" "使用機種" "使用メモリ" "使用データ" |
| C008 | (S007) | "結論" |

FIG.117

| ID NO. | {TEXT ELEMENT ID (IMPORTANCE) ...} |
|---|---|
| D001 | {C001(A),C012(B),C105(A),C021(B)} |
| D002 | {C006(C),C006(A),C003(A),C005(B),C004(A)} |
| D003 | {C003(A),C005(A),C004(A)} |
| D004 | {C010(B),C011(A),C006(A),C023(B)} |
| D005 | {C003(C),C009(A),C035(B),C037(A),C040(C),C008(A)} |
| D006 | {C008(A),C004(C),C005(B),C001(A),C040(C)} |
| D007 | {C008(A),C006(B),C003(A),C005(B),C004(A)} |

FIG. 118

| ID NO. (SENTENCE PATTERN ID) | {SURFACE LEVEL OF ORIGINAL TEXT} |
|---|---|
| D001(A) | {C001, C012, C105, C021} |
| D002(A) | {C001, C006, C003, C005, C004} |
| D003(B) | {C003, C005, C004} |
| D004(C) | {C003, C001, C004, C005, C007} |

```
S001  This paper discusses SOMETHING.
S002  SOMEONE's present investigation is (about SOMETHING) (for SOME PURPOSE).
S003  SOMETHING has been implemented (on SOME MACHINE) (using SOME METHOD).
S004  SOMETHING has SOME ADVANTAGEs.
S005  SOMEONE's previous work has been (about SOMETHING) (for SOME PURPOSE).
S006  This paper discusses SOMETHING.
                  ⋮
```

SOMEONE's previous work has been (about SOMETHING) (in order to SOME PURPOSE).
*SOMBONE's present investigation is (about SOMETHING) (for SOME PURPOSE).*
This paper discusses SOMETHING.
SOMETHING has been implemented (on SOME MACHINE) (using SOME METHOD).
SOMETHING has SOME ADVANTAGES.

FIG. 122B

SOMEONE's previous work has been (about SOMETHING) (in order to SOME PURPOSE).
This paper discusses SOMETHING.
SOMETHING has been implemented (on SOME MACHINE) (using SOME METHOD).
SOMETHING has SOME ADVANTAGES.

LANGUAGE CONVERSION SYSTEM AND TEXT CREATING SYSTEM USING SUCH

This application is related to prior U.S. application Ser. No. 07/626,444 filed Dec. 12, 1990 now U.S. Pat. No. 5,303,150; and Ser. No. 07/899,269 filed Jun. 16, 1992 now U.S. Pat. No. 5,338,976 for which all appropriate benefits under 35 U.S.C. §120 are claimed.

BACKGROUND OF THE INVENTION (1) Filed of the Invention

The present invention generally relates to a language conversion system, and more particularly to a language conversion system capable of being used for the document preparation, the natural language processing, and the translation between different languages. The language conversion system according to the present invention is applicable, for example, to machine translation systems, document preparation systems, cai (Computer Assisted Instruction) systems, foreign language preparation supporting system, and other OA (Office Automation) devices such as word processors and personal computers.

(2) Description of the Related Art

FIG. 1A shows a conventional machine translation method. This method is generally referred to as structure transfer method. In this method, first, an original is analyzed, and an intermediate structure in a source-language (e.g. Japanese) which structure can be easily transferred to an intermediate structure in a target-language (e.g. English) is generated based on the analyzed results. The intermediate structure in the source-language is then transferred to that in the target-language. The translation in the surface-level of the target-language is generated from the intermediate structure therein. However, even if the logically precise translation is created in accordance with the above method, it is apt to be difficult for natives of the target-language to understand the translation between languages, such as Japanese and English, with the different cultural backgrounds.

FIG. 1B shows another conventional machine translation method. In this method, a structure independent from any languages is generated based on the analyzing results obtained by the analysis of the original in the source-language. The translation in the surface-level of the target-language is then generated from the structure. However, the difference between the cultural backgrounds of the source-language and the target-language is not considered in the above method. Thus, in this case also, it is apt to be difficult for natives of the target-language to understand the translation.

The following prior arts have been known.

1) Japanese Laid Open Patent Application No. 63-44276 "AUTOMATIC GENERATOR FOR GENERATED SYNTAX":

In this system, an idea structure is obtained by the analysis of the original in the source-language, as shown in FIG. 1B, and the surface-level of the target-language is then generated from the idea structure. This system obtains the conceptual structure which is an intermediate structure independent from any languages. However, the language structure such as the intermediate structure independent from any languages can not be obtained in actuality. As a result, the conceptual structure obtained by this system may depend on the source-language. Thus, it may be difficult for natives to understand the translation generated therefrom.

2) Kumano et al., "User-Cooperative Japanese Sentence Generation System," National Conference of the 42nd Information Processing Society (First term of 1991):

This system has bene proposed on the assumption that a user of the translation carries out operations. This is, if a translation having contents different from those of the original is obtained, the user supplies information of changing and correction and supplemental information to the system. As a result, the translation having the high quality can be obtained. Hence, the target-language knowledge is not a little required for the user.

3) Saito and Tomita, November 1984, "Automatically Writing a Letter in a Foreign Language," Symposium of the Natural Language Processing Technology:

This system has been proposed for a user having no knowledge of the target-language, in which system a letter is written in the target-language using only the knowledge of the source-language. According to this system, the letter having the high quality can be written. However, as example of sentences each of which examples has blanks, are used and required words are filled in the blanks, sentences other than the examples can not be translated.

4) Nomiyama, "Lexical Selection Mechanism in Machine Translation Using Target Language Knowledge," National Conference of the 42nd Information Processing Society (First term of 1991):

As relationships between verbs and nouns cooperated with each other depend on languages, it is hard for users to read translation. In this translation technique, suitable terms for translation are selected with consideration to this matter. However, a problem is not yet solved in that it is difficult to understand the expression of the whole translated sentence.

5) Satoshi Sato and Makoto Nagao, "Toward Memory-Based Translation":

A large number of examples of translated sentences which can be relatively easily understood are gathered along with originals corresponding to the examples, and the examples are stored in a system. A sentence closest to an original input is selected from the examples of translated sentences. Parts of the selected sentence different from those of the original are detected and corrected. According to this system, a translation having a relatively high quality can be obtained. However, it is impossible to gather examples for all sentence patterns. Thus, if there is no example corresponding to an original input, the translation can not be obtained at all.

In addition, there has been proposed a system in which contents of a source-language sentence is explained by the target-language using an idea center and target-language sentence patterns driven by the idea center so that a translation is obtained, the idea center (hereinafter, for the sake of simplicity, referred to as an IC) being a central term of an idea to be explained by a sentence. Each of the target-language sentence patterns is formed of elements essential for (close to) the IC, the elements essential for the IC being obtained by analysis of actual target-language sentences.

The popular conventional system converts the analysis (tree structure) of the source-language into the tree structure of the target-language in parts, and generates the target-language. According to this system, even if the lack of knowledge is compensated for by the interaction with the user, the system tends to take a source-language-based structure. As a result, the sentence form is unnatural for the target-language, and the expression in unnatural.

On the other hand, in the system which obtains all the information through inquiries with the user, it is necessary to prepare an extremely large amount of data in order to cope with a wide range of documents. In addition, the operation is machine initiated from the beginning and makes the user feel under control of the machine.

The information required in the target-language is very often missing in the sentence of the source-language. For this reason, the system in which there is no interaction with the user tends to frequently generate incomplete output.

Moreover, the information necessary in the target-language may not exist in the original sentence. According to the convention system, the translation is in many cases completed by supplementing such necessary information by a default process. However, erroneous information may be added and necessary information may be dropped if the default process is insufficient, and this method tends to generate an unnatural translation.

On the other hand, according to the translation system which uses the examples of translated sentences, an extremely large amount of examples of translated sentences must be prepared in order to cope with a wide range of documents.

SUMMARY OF THE INVENTION

Accordingly, a general object of the present invention is to provide a novel and useful language conversion system in which the disadvantages of the aforementioned prior art are eliminated.

A more specific object of the present invention is to provide a language conversion system in which, even if cultural backgrounds of the source-language and the target-language differ from each other, a sentence in the source-language can be precisely translated in the target-language.

Another object of the present invention is to provide a language conversion system capable of being flexibly used by a user.

Another object of the present invention is to provide a language conversion system in which a precisely translated sentence can be rapidly obtained.

Another object of the present invention is to provide a language conversion system in which a sentence having natural expressions in the target-language is obtained.

The above objects of the present invention are achieved by a language conversion system for converting an original sentence in a source-language into a translated sentence in a target-language, the system comprising: original analysis means for analyzing the original sentence so as to obtain an intermediate structure of the original; idea center extraction means for extracting an idea center from the intermediate structure obtained by the original analysis means, the idea center being a central expression of an idea to be described by a sentence; identification means for identifying a sentence pattern including the idea center extracted by the idea center extraction means; information extraction means for extracting information required by the sentence pattern identified by the identification means from the intermediate structure of the original sentence; decision means for deciding an intermediate structure of a translated sentence based on the sentence pattern and request information extracted by the information extraction means; and creation means for creating a translated sentence in a surface level from the intermediate structure decided by the decision means.

The above objects of the present invention are also achieved by a language conversion system for converting an original sentence in a source-language into a translated sentence in a target-language, the system comprising: original analysis means for analyzing the original sentence so as to obtain a first intermediate structure of the original sentence; first conversion means for converting the first intermediate structure obtained by the original analysis means into an intermediate structure of a translated sentence; translation generation means for creating the translated sentence in the surface level from the intermediate structure of the translated sentence; second conversion means for converting the intermediate structure of the translated sentence into a second intermediate structure into the source-language; and surface level sentence creation means for creating a surface level sentence in the source-language from the second intermediate structure.

The above objects of the present invention are also achieved by a language conversion system applied to a machine translation apparatus having input means for inputting an original sentence, translation means for translating the original sentence into a target-language, storage means for storing information required in the translation means, and output means for outputting a result obtained by the translation means, the translation means comprising: original analysis means for analyzing the original sentence so as to obtained an intermediate structure of the original sentence; idea center extraction means for extracting an idea center from the intermediate structure obtained by the original analysis means, the idea center being central expression of an idea to be described by a sentence; identification means for identifying a sentence pattern including the idea center extracted by the idea center extraction means; information extraction means for extracting information required by the sentence pattern identified by the identification means from the intermediate structure of the original sentence; decision means for deciding an intermediate structure of a translated sentence based on the sentence pattern and request information extracted by the information extraction means; and creation means for creating a translated sentence in a surface level from the intermediate structure of the translated sentence, and the language converting means further comprising: confirmation means for confirming the result obtained by the translation means.

The above objects of the present invention are also achieved by a language conversion system for converting an original sentence in a source-language into a translated sentence in a target-language, the system comprising: idea center extraction means for extracting an idea center from the original sentence, the idea center being a central expression of an idea to be described by a sentence; identification means of identifying a representation pattern including the idea center extracted by the idea center extraction means; information extraction means for extracting information required by the representation pattern identified by the identification means from the intermediate structure of the original sentence; display means for displaying the information extracted by the information extraction means.

The above objects of the present invention are also achieved by a language conversion system for converting an original sentence in a source-language into a translated sentence in a target-language, the system comprising: idea center input means for inputting an idea center directed to input to the system by a user, the idea center being a central expression of an idea to be described by a sentence; identification means for identifying a representation pattern including the idea center input by the idea center input means; information extraction means for extracting information required by the representation pattern identified by the identification means from the intermediate structure of the original sentence; display means for displaying the information extracted by the information extraction means.

The above objects of the present invention are also achieved by a language conversion system for converting an original sentence in a source-language into a sentence in a target-language by use of a computer, the system comprising: a database for storing representation patterns in the target-language; evaluation means for evaluating an adaptivity factor of each representation pattern to the original sentence; retrieval identification means for searching for an identifying information required by a target-language pattern in the original sentence in the source-language pattern in the original sentence in the source-language to create the sentence in the target-language; interactive means for obtaining information required to create the sentence in the target-language in an interaction with a user; selecting means for selecting a representation pattern in the target-language adaptable to the original sentence based on the adaptivity factor obtained by the evaluation means; and output means for outputting the sentence in the target-language created based on the information obtained by the retrieval identification means and the interactive means, wherein, in a case where there are a plurality of representation patterns for representing similar matters, judging information based on which the representation pattern is selected is assigned to each of the representation patterns stored in the database, the judging information being displayed along with the plurality of representation patterns.

Another object of the present invention is to provide a text creating system in which the structure of an original text is analyzed, a typical text pattern is selected based on the analysis result, and a text in the target-language is created using the selected typical text pattern.

Another object of the present invention is to provide a text creating system in which the created sentence can be flexibly edited by a user.

Another object of the present invention is to provide a text creating system in which the structure of the sentence can be selected based on matters that the user wishes to express.

Another object of the present invention is to provide a text creating system in which a single text structure can be decided from among a plurality of text structure adaptive to the text structure of the original text.

Another object of the present invention is to provide a text creating system in which the text can be edited in accordance with the degree of importance of the text elements.

Another object of the present invention is to provide a text creating system capable of creating a text which may be various expressions.

The above objects of the present invention are achieved by a text creating system comprising: text input means for inputting a text in a source-language; a first structural element database for storing a plurality of structural elements forming texts in the source-language; original text analyzing means for detecting structural elements equal to those in the first structural database from the text in the source-language and for analyzing a structure of the text in the source-language; a first typical text structures in a target-language; first selecting means for evaluating an adaptivity factor of each of the typical text structures to the structure of the text in the source-language obtained by the original text analyzing means and for selecting a typical text structure having a highest adaptivity factor; text creating means for creating a target-language text based on the typical text structure selected by the first selecting means; and editing means for editing the target-language text created by the text creating means.

The above objects of the present invention are also achieved by a text creating system comprising: a text element database for storing text elements forming a text; a text structure database for storing information of text structures each of which is a set of text elements; a sentence pattern database for storing information used to generate sentences corresponding to each of the text elements; text element selecting means for selecting text elements from the text element database; text structure retrieval means for searching the text structure database for a text structure based on the text elements selected by the text element selecting means; text generating means for generating a target text based on the text structure obtained by the text structure retrieval means using the information stored in the sentence pattern database; and editing means for editing the target text created by the text creating means.

The above objects of the present invention are also achieved by a text creating system comprising: original text analyzing means for detecting text elements in an original text; text element database for storing text elements forming texts; text structure database for storing a plurality of text structures of target texts each of which structures is a set of text elements; sentence pattern database for storing information used to generate sentences corresponding to each of the text elements; target-text structure deciding means for deciding a text structure adaptive to a set of the text elements of the original text from the text structure database; text generating means for generating a target text based on the text structure decided by the target-text structure deciding means using the information of the sentence pattern database; and editing means for editing the target text created by the text generating means, wherein the text structure database stores degree of importance information of each of the text elements.

Additional objects, features and advantages of the present invention will become apparent from the following detailed description when read in conjunction with the accompanying drawings.

BRIEF DESCRIPTION OF THE DRAWINGS

FIG. 5 is a diagram illustrating an example of a field classified keyword list database.

FIG. 6 is a diagram illustrating an example of a field classified IC candidate list database.

FIGS. 7, 8, 9, 10, and 11 are diagrams illustrating examples of a target-language phrase pattern.

FIG. 12 is a diagram illustrating an example of a target-language phrase pattern database.

FIG. 13 is a diagram illustrating an example of a field classified translation dictionary database.

FIG. 14 is a diagram illustrating an example of a guidance database.

FIG. 15 is a diagram illustrating an example of contents of a translation state memory.

FIG. 16 is a diagram illustrating examples of an original sentence (J).

FIG. 17 is a diagram illustrating an example of contents of a extraction IC buffer.

FIG. 18 is a diagram illustrating an example of a source-language intermediate structure (S).

FIGS. 19 and 20 are diagrams illustrating examples of contents of request information buffer.

FIG. 21 is a diagram illustrating an example of contents of a guidance buffer.

FIG. 22 is a diagram illustrating an example of contents of a display buffer.

FIG. 23 is a diagram illustrating an example of a target-language intermediate structure (T).

FIG. 24 is a diagram illustrating an example of an intermediate structure (SI) of a reference sentence.

FIG. 25 is a diagram illustrating examples of a translated sentence (E).

FIG. 26 is a diagram illustrating examples of a reference sentence (J').

FIGS. 27, 28, 29 and 30 are diagrams illustrating examples of the interaction with a user through a screen.

FIG. 37 is a diagram illustrating a management table regarding the number of structural elements.

FIG. 38 is a diagram illustrating a target-language sentence pattern having a degree of importance.

FIG. 39 is a diagram illustrating an example of a target-language sentence pattern having structural elements in the target-language.

FIG. 40 is a diagram illustrating a translation thesaurus dictionary.

FIG. 41 is a diagram illustrating a thesaurus dictionary in the target-language.

FIGS. 42 and 43 are diagrams illustrating examples of a target-language phrase pattern database having a difference pattern.

FIG. 44 is a diagram illustrating examples of an original sentence (J).

FIG. 45 is a diagram illustrating examples of translated sentences (E) in difference pattern.

FIG. 46 is a diagram illustrating examples of a translated sentence (E).

FIG. 47 is a diagram illustrating an example of a structure conversion rule of the target-language intermediate structure.

FIGS. 48, 49, 50, 51, and 52 are diagrams illustrating examples of the interaction with a user through a screen.

FIG. 53 is a diagram illustrating a guidance list.

FIG. 56 is a diagram illustrating an example of contents of the request information buffer.

FIG. 57 is a diagram illustrating an example of the guidance list database.

FIG. 59 is a diagram illustrating another example of contents of request information buffer.

FIG. 61 is a diagram illustrating an example of a screen on which an essential part and an optional part are displayed so as to be distinguished from each other.

FIG. 62 is a diagram illustrating examples of an optional phrase pattern.

FIG. 63 is a diagram illustrating an example of a phrase pattern recorded after a confirmation operation.

FIG. 66 is a diagram illustrating a structure of a translation unit shown in FIG. 65.

FIG. 70 is a diagram illustrating an example of the extraction of the intermediate structure.

FIG. 71 is a diagram illustrating an example of the IC candidate list database.

FIG. 72 is a diagram illustrating an example of an IC candidate correspondence database.

FIG. 73 is a diagram illustrating an example of the sentence pattern database.

FIG. 74 is a diagram illustrating an example of the request information acquisition.

FIG. 75 is a diagram illustrating a screen in the original input mode.

FIG. 76 is a diagram illustrating a screen in the result confirmation mode (the SD translation).

FIG. 77 is a diagram illustrating a screen in the result confirmation mode (the TD translation).

FIG. 78 is a diagram illustrating a screen in the result confirmation mode (the word-for-word translation).

FIG. 79 is a diagram illustrating a resolution selecting screen in the result confirmation termination mode.

FIG. 81 is a diagram illustrating an original, morphemes and analyzed structure.

FIG. 82 is a diagram illustrating an example of contents of the IC "test" in the IC dictionary.

FIG. 83 is a diagram illustrating examples of the IC representation pattern in the IC representation pattern dictionary.

FIG. 84 is a diagram illustrating examples of the IC representation pattern in the IC representation pattern dictionary, each pattern having the source-language pattern.

FIG. 87 in parts of (a), (b), (c), (d) and (e) is a diagram illustrating an example of a process for the target-language pattern.

FIG. 88 is diagram illustrating an example of an interaction screen.

FIG. 89 is a flow chart illustrating another operation of the language conversion system.

FIGS. 90, 91 and 92 are diagrams illustrating examples of judging information.

FIGS. 95, 96, 97, 98 and 99 are examples of the interactive screens.

FIG. 102 is a diagram illustrating a text in the source-language (an original text).

FIG. 103 in parts of (a), (b) and (c) is a diagram illustrating elements of the original text, target-language element corresponding to the elements and a typical text adaptive to a set of the elements.

FIG. 104 in parts of (a) and (b) is a diagram illustrating structural elements of the typical text and created sentences corresponding to the structural elements.

FIG. 105 is a diagram illustrating a result in which request information extracted from the original text is inserted into the created text.

FIG. 106 is a diagram illustrating a text edited by a user.

FIG. 107 is a diagram illustrating an example of a text structural element database.

FIG. 108 in parts of (a), (b) and (c) is a diagram illustrating examples of the typical text database.

FIG. 109A is a diagram illustrating an example of contents of the text element database.

FIG. 109B is a diagram illustrating an example of contents of the text structure database.

FIG. 109C is a diagram illustrating an example of contents of the sentence pattern database.

FIGS. 111A and 111B are diagrams illustrating examples of the user-interface when the user selects text elements.

FIG. 114A is a diagram illustrating an example of a created text.

FIG. 114B is a diagram illustrating an example of text edited by the user.

FIG. 116 is a diagram illustrating the text element database.

FIG. 117 is a diagram illustrating the text structure database.

FIG. 118 is a diagram illustrating the text structure database.

FIG. 119 is a diagram illustrating the sentence pattern database.

FIG. 120 is a diagram illustrating an original sentence.

FIG. 121 is a diagram illustrating a set of text elements of the original sentence.

FIG. 122A and 122B are diagrams illustrating examples of a created text.

DESCRIPTION OF THE PREFERRED EMBODIMENTS

A description will not be given of an embodiment of the present invention.

Figure 1B:
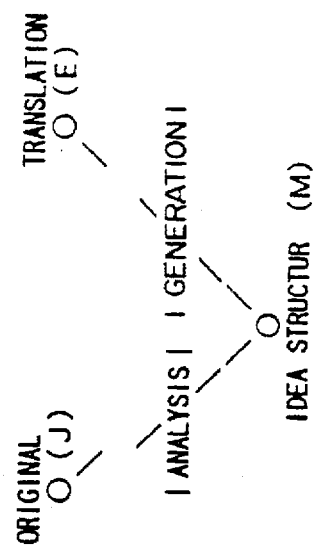
FIG. 1B is a diagram illustrating another conventional translation method.
Figure 1A:
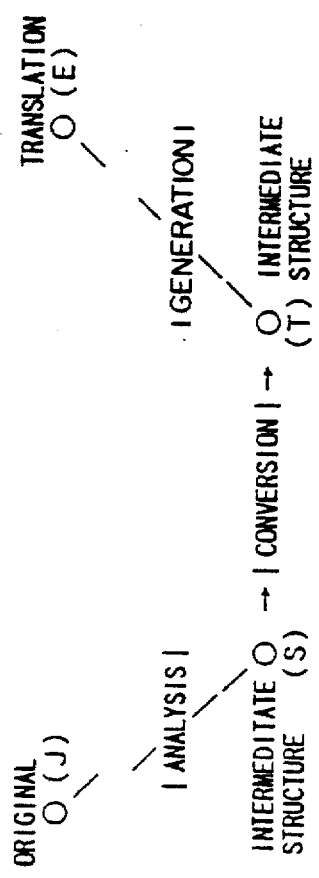
FIG. 1A is a diagram illustrating a conventional translation method.
Figure 2:
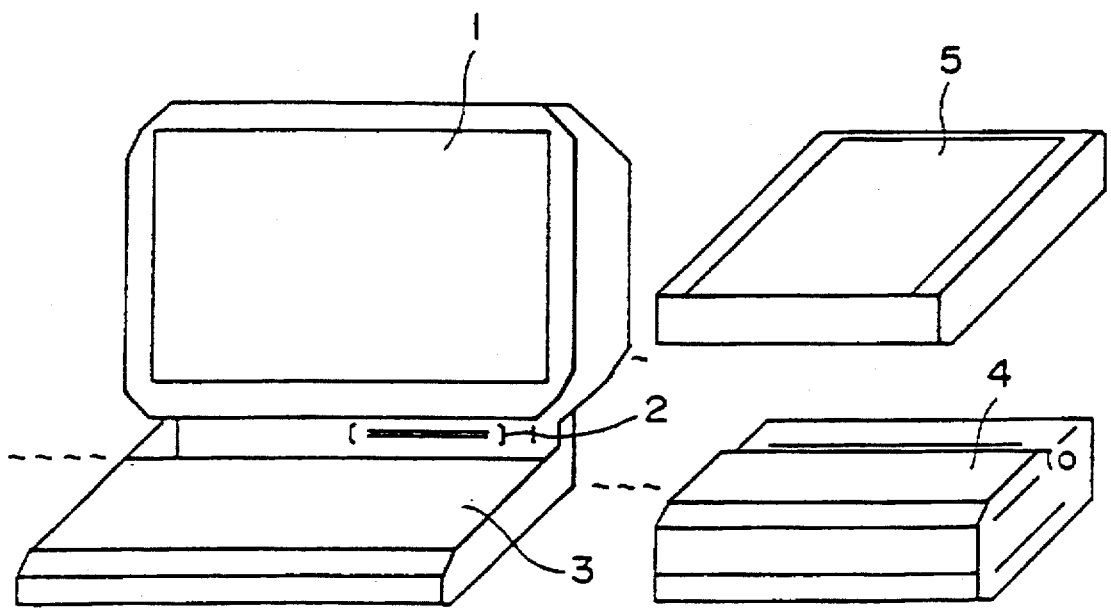
FIG. 2 is an outside view illustrating a language conversion system according to an embodiment of the present invention.

FIG. 2 shows the appearance of a system according to the embodiment of the present invention. Referring to FIG. 2, the system has a display unit 1, a floppy disk unit 2, a keyboard unit 3, a printer 4 and a scanner 5 (including an OCR). A housing of the keyboard unit 3 houses also circuit boards for a system controller, a text editing unit, various data bases, a communication system and other functions. The OCR (Optical Character Reader) included in the scanner 5 optically reads images on a sheet and converts image data into character codes. The character codes are used as input text data. The floppy disk unit 2 stores texts described by character codes, the texts being used as input texts. Output texts may be also stored in the floppy disk unit 2. Another storage unit, such as a magnetic tape unit or an optical disk unit, may be used as a recording medium for texts. The printer 4 prints texts (input texts, output texts, an original, a translation, an intermediate structure of a sentence and the like). The keyboard unit 3 is used to make texts, to input various instructions and data required for the text editing. Instructions for the printer 4 and the scanner 5 are also input by the keyboard 3. The display unit 1 displays texts input by the keyboard unit 3, an original, an intermediate structure of a sentence, a translation, a text to be output, contents of a translation knowledge data base, image data supplied from the scanner 5, information required by the system and other various information items. A housing of the keyboard unit 3 houses various circuit boards on which a controller, a text editing unit, a communication unit and the like are formed.

Figure 3:
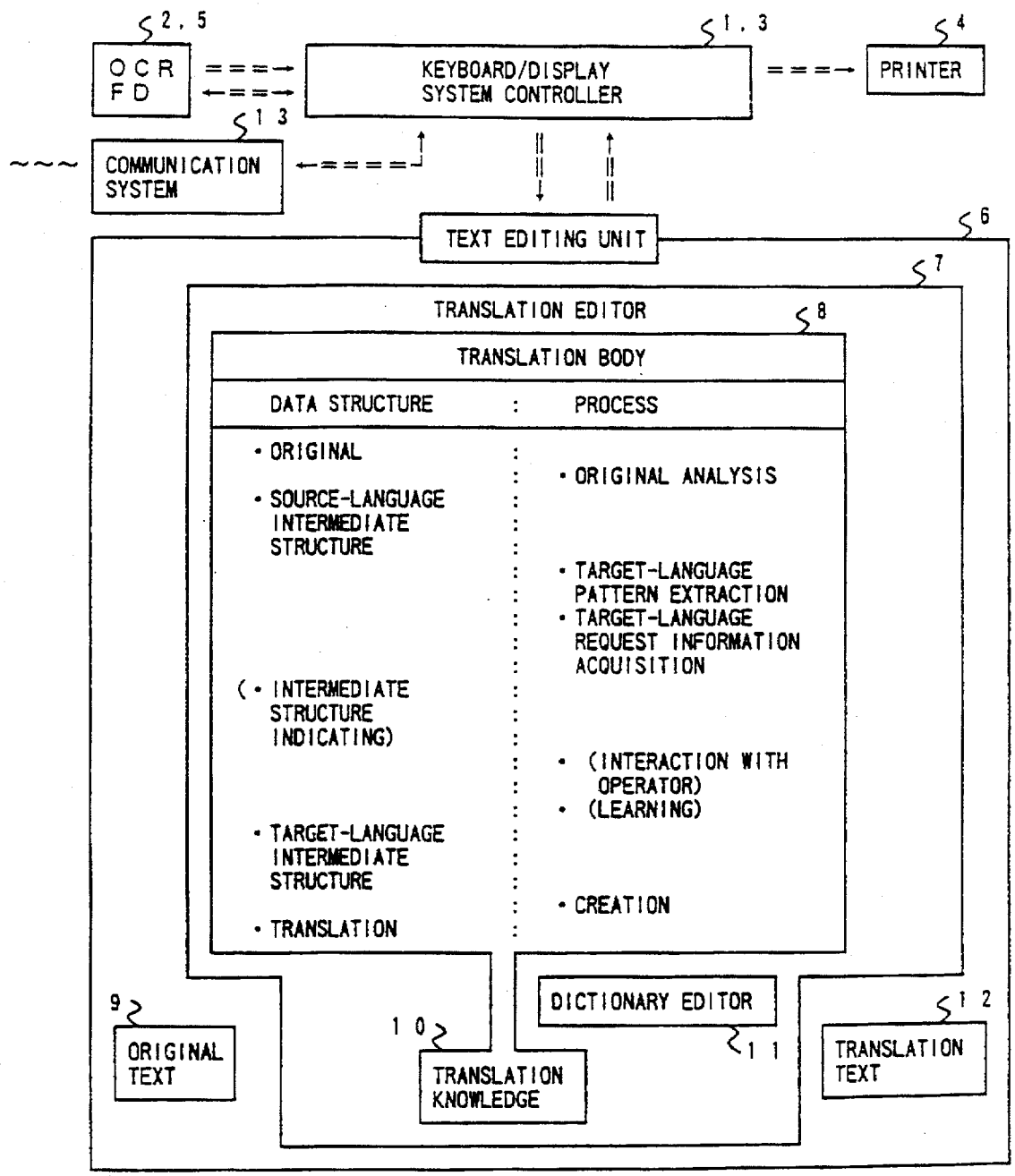
FIG. 3 is a block diagram illustrating the structure of the language conversion system according to the embodiment of the present invention.

The system is formed as shown in FIG. 3.

Referring to FIG. 3, the display unit 1, the floppy disk unit 2, the keyboard 3, the printer 4 and the scanner 5 are coupled to a system controller. A text editing unit 6 and a communication unit 13 are also coupled to the system controller. The communication unit 13 carries out communication with external unit via a telephone line or a personal line. In the communication, the communication unit 13 receives character codes used as input text data. The communication unit 13 may transmit character codes of an output text.

The text editor unit 6 edits an original text and a translated text. The editing unit 6 is formed of a translation editor 7, a original text data base 9 and a translated text database 12. The translation editor 7 includes a translation body 8, a translation knowledge database 10 and a dictionary editor 11. The text editing unit 6 extracts a part to be translated from a original text, supplies the extracted part to the translation editing unit 7 and receives a translation from the translation editing unit 7. The translation editing unit 7 manages the translation body 8 for translating a original text. The dictionary editor 11 is positioned at the same level as the translation editor 7 under the text editing unit 6, can input data to the translation knowledge database 10, and can change and edit contents of the translation knowledge database 10.

Original texts and original sentences supplied from the scanner 5 and the floppy disk unit 2 are formatted by the translation editor 7, the formatted original texts and sentences are stored in the original text database 9. Texts and sentences translated by the translation body 8 and texts processed by the translation editor 7 are stored in the translation text database 12. The text editing unit 6 has pointers indicating correspondence between contents (texts, chapters or sentences) in the original text database 9 and the translation text database 12.

In the translation body 8, a data structure is changed as shown in a left side area of a block having the reference number "8", and functions are provided as shown in a right side area of the block. In the block indicating the translation body 8, data items and functions put in brackets are not always required for the present invention. The translation knowledge database 10 is a general term of a set of a analysis grammar/dictionary database, a field classified keyword list database, an IC candidate list database, a target-language pattern database, a translation dictionary database and the like.

Figure 4:
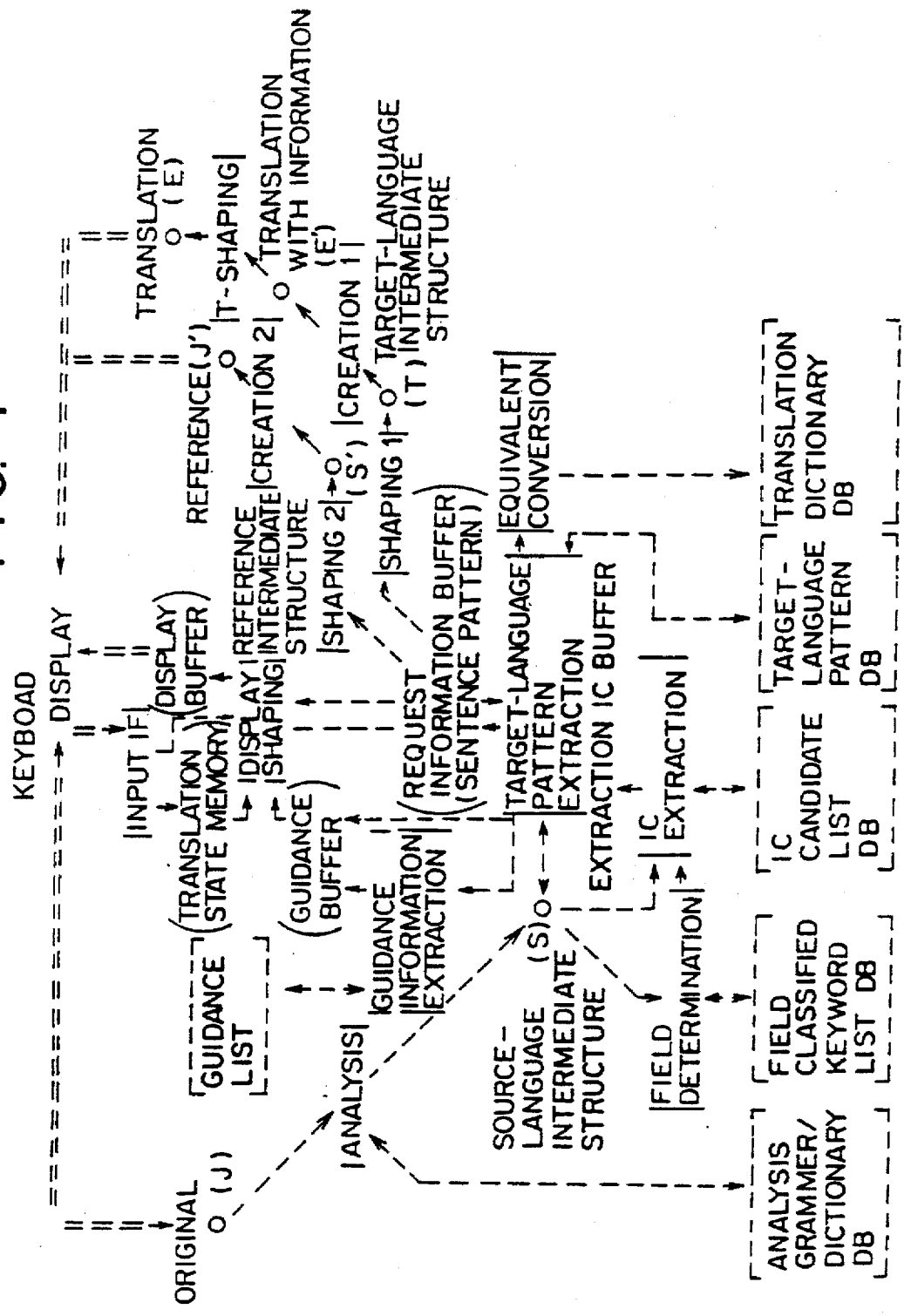
FIG. 4 is a diagram illustrating a structure of a translating body shown in FIG. 3.

FIG. 4 shows relationships between functions in the translation body 8 shown in FIG. 3. In FIG. 4, a keyboard/display represents the translation editor 7, and other parts are in the translation body 8 (an original, a translation and an input IF are located in a boundary between the translation editor 7 and the translation body 8).

Symbols in FIG. 4 will be described now.

Terms sandwiched by | | represents processing function. ○ is a information node in a translation process, and corresponds to a information memory receiving and transmitting information between respective processing functions. ( ) has the same function as ○, and information in each memory indicated in ( ) is frequently rewritten. —→ and ←— indicate flows of information in the translation body 8. =→ indicates a flow of information between the translation body 8 and an external unit. In FIG. 4, to avoid the complexity, lines indicating controls between respective processing function are omitted.

A description will now be given of each of the processing functions in a case where the source-language is Japanese (an original sentence is a Japanese sentence) and the target-language is English (a translated sentence is an English sentence).

ANALYSIS

An original text (J) is analyzed sentence by sentence. Each original sentence are analyzed using analysis grammar roles and analysis dictionary in the analysis grammar/dictionary database. As a result, an intermediate structure (S) in the source-language is obtained. In a mode in which a translation unit will be described later is "batch 1", a dividing process for a sentence is carried out in earlier steps of this analysis process.

FIELD DETERMINATION

A field of a text to be translated is automatically determined, contents of the intermediate structure (S) in the source-language is analyzed using field classified keyword list database. Thereafter, processes are performed in the determined field. This function is not essential in the present invention. The field nay be identified by a user.

IC EXTRACTION

IC is a central term of an idea to be explained by a sentence, and is an abbreviation of an idea center. In a sentence, for example, "we want to discuss an activity theme hereafter", although a main verb is "want", the subject matter of the sentence is "discuss". In addition, in a sentence "it is regarded that this contract is approved when our firm receives the application money", although the main verb is "regarded", the subject matter of the sentence is "approved". That is, "discuss" and "approved" are respectively IS (idea centers) of the above sentences. In this embodiment, to make decision the IC easy, the IC candidate list database is used. Terms to be the IC are extracted from the intermediate structure (S) of an object sentence with reference to the contents of the IC candidate list database, and the extracted terms are stored in an extracted IC buffer. Each of the extracted IS has a pointer for the target-language sentence pattern which is written in the IC candidate list database. This function (IC EXTRACTION) is not essential in the present invention. The IC can be decided by multiple use of the following function (TARGET-LANGUAGE PATTERN EXTRACTION).

TARGET-LANGUAGE PATTERN EXTRACTION

The contents of the target-language pattern database are retrieved by using of the pointer in the extraction IC buffer, the intermediate structure (S) is analyzed in accordance with retrieved contents, and the IC of the object sentence is temporarily decided. A word (or idiom), in the target-language (English in this case), corresponding to the IC which has been temporarily decided is selected. The structure of a sentence is decided by phrase patterns identified by the target-language sentence pattern which is required by the above selected word corresponding to the IC. On the other words, it is analyzed what part the English IC fulfills in the target-language sentence and what words, phrases and clauses the IC requires, the request information is extracted from the intermediate structure (S), and the structure of the sentence in the target-language is decided. In this case, the structure of the sentence is according to the target-language, and information in the source-language is made so as to correspond to information in the target-language. The information obtained by this function is stored in a request information buffer. In the system which is not an interactive conversation type, a default value is substituted for information which has not been extracted from the intermediate structure (S), and a process corresponding to this function is completed. In the system in which translation body 8 is operated with interactive conversation with an operator, if there is no information needed to decide the structure of the sentence in the information extracted from the intermediate structure, information to be requested of the operator is prepared. Comment information indicating what quality the information to be requested of the operator has is also prepared. Furthermore, comments indicating the reason why this IC has been selected or the meaning of selection of this IC are supplied to a guidance buffer.

GUIDANCE INFORMATION EXTRACTION

Regarding difference information indicating the difference between the original having no comment in the guidance buffer and translation, comments corresponding to the difference information is read out from the guidance list database, and the comments fills up the lack of the information in the guidance buffer.

In this embodiment, with respect to the original, the reason why the sentence pattern is used, and the comments regarding essential words are described in the target-language sentence pattern. Theses information items may be recorded in the guidance list and be read out therefrom.

DISPLAY SHAPING

The original (J), the contents of the request information buffer (including the translation (E), reference sentences) and the contents of the guidance buffer are composed and displayed on the display unit 1. The information to be displayed is formed so that the user can easily recognize it (the system is provided with a pointer management function by which the corresponding relationship between information input by the keyboard 3 and the request source of the information are maintained). In addition, the information to be displayed is changed in accordance with a rewriting request, and the information in the display buffer is rewritten.

INPUT INTERFACE (IF)

When the operator should correct the information in the display buffer looking the screen of the display unit 1, and when the operator inputs the request information in accordance with the request from the system, the information items are input from the keyboard 3. At this time, the interface between the input information and the display formation are carried out.

TRANSLATION STATE MEMORY

The operator identifies a state under which the translation body processes a sentence to be translated, the identified state is stored in a flag memory. If a field is automatically set in the system, the determination result of the field is stored in the system. The translation process may be carried out in accordance with the field stored in the system.

SHAPING 1

Only information needed for the translation sentence (E) is read out from the request buffer, and an target-language intermediate structure (T) capable of easily creating the translation sentence is generated. In the interactive mode, the pointer information is also shaped to maintain the relationship between the processed information and the information supplied to the "DISPLAY SHAPING".

SHAPING 2

Only information needed for the reference sentence (J') (a sentence written by the same language of the original sentence) is read out from the request buffer, and a reference intermediate structure (S') capable of easily creating the reference sentence is generated. In the interactive mode, the pointer information is also shaped to maintain the relationship between the processed information and the information supplied to the "DISPLAY SHAPING".

CREATION 1

The translation sentence (E) in the surface level of the target-language is created from the target-language intermediate structure. In the interactive mode, the pointer information is also created to maintain the relationship between the created information and the information supplied to the "DISPLAY SHAPING".

CREATION 2

The reference sentence (J') in the surface level of the source-language (the Japanese) is created from the reference intermediate structure. In the interactive mode, the pointer information also created to maintain the relationship between the created information and the information supplied to the "DISPLAY SHAPING".

T-SHAPING

The relation pointer with respect to the information in the "DISPLAY SHAPING" is removed.

A description will now be given of databases used in the various functions (processes).

ANALYSIS GRAMMAR/DICTIONARY DATABASE

Since contents of this database are not directly concerned with the present invention, the detailed description is not given. This database may be selected from among conventional databases, but the following condition must be satisfied. The dictionary is constituted so that a writing form of each word in the source-language intermediate structure (S) is normalized, and in the analysis process, each word having the normalized notation is processed. For example, " 行う " (okonau) can be written as " 行う " (okonau) and " おこなう " (okonau). Even if any of the three words is used in the original sentence, the word is uniformly written as " 行う " (okonau) in the source-language intermediate structure (S). Regarding sets of words {" 止める " (todomeru), " 停める " (todomeru), " とどめる " (todomeru)}, (todomeru), {" 区分する " (sokubunsuru), " 区別する " (sokubunsuru), " 分別する " (solubunsuru)} and {" 心服する " (shinpojumu), " しんぷく " (shinpogiumu)}, even if any of the words in each set is used in the original sentence, one of the words in each set is representatively used in the system. Hereinafter, underlined characters as indicated above correspond to kanji.

Other databases will be described below with reference to FIGS. 5–14.

FIELD CLASSIFIED KEYWORD LIST DATABASE

FIG. 5 shows an example of the field classified keyword list database.

In FIG. 5, words by which a field can be easily decided are gathered, and these words are mainly noun. To characterize the field, words are gathered without distinction between the short unit and the long unit. This database is provided with, as the attribute, "ENTRY", "READING", "PART OF SPEECH", "FEATURES", and "USING FREQUENCY" in each field. The words in the "ENTRY" are written in the representative form in the same manner as those in the intermediate structure (S). The "READING" and the "PART OF SPEECH" are used, in a case where this database is retrieved by the dictionary editor, to correct information in this database and to add information to this database. Even if words have the same notation, their meanings may differ from each other in accordance with fields in which the words are used. Thus, the "FEATURE" is used to distinguish meanings of the words having the same notation. For example, a case where a word "ukekuchi is used as a mouth is identified by HEL in the "FEATURE", and a case where a word "ukekuchi is used as an inlet of a mailbox is identified by IEL in the "FEATURE". Using frequencies of words are statistically investigated in respective field, and the values obtained by the investigation is logarithmically normalized. The "USING FREQUENCY" has the normalized values concerning the using frequency of words. This database is provided with three fields, the first field that words have been investigated in newspapers and magazines, the second field that words have been investigated in papers regarding software and hardware of computers, and the third field that words are investigated in trade journals regarding the heavy electrical equipment. The number of fields is not limited and the "USING FREQUENCY" may be roughly or finely classified into fields.

IC CANDIDATE LIST

FIG. 6 shows an example of the IC candidate list.

A word to be the IC is a declinable word (a verb, an adjective, an adjective verb and the like) and a part of an auxiliary verb ("-da" used for conclusion, "-desu" and "-no youda"). However, a verb "suru" can not be the IC.

This database is provided with, as the attribute, "ENTRY", "READING", "PART OF SPEECH CONJUGATION", "POSSIBILITY" and "POINTER". Each word in the "ENTRY" is written in the present notation used in the intermediate structure (S). The "READING" and the "PART OF SPEECH CONJUGATION" are used, in a case where the dictionary editor retrieves this database, to add information to this database and to correct information in this database. The "PART OF SPEECH CONJUGATION" is also used as an operator of the possibility. The "POSSIBILITY" is a possibility by which a word may be the IC in a Japanese sentence, and is obtained by the analysis of a large number of sentences.

In the analysis of the sentence "kongo no katsudo tema ni tsuite disukasshyon shitai to omoimasu" (we want to discuss an activity theme hereafter.) Words "katsudou suru" (be active), "disukasshyon suru" (discuss) and "omou" (want) can be the IC. The word "disukasshyon suru" (discuss) is the IC in this sentence, so that this word is provided with 3 points. Although the word "omou" (want) is a main verb in this sentence, the "monou" (want) is not the IC in this sentence. Thus, the word "omou" (want) is provided with 0 point. It is not analyzed whether or not the word "katsudo suru" (be active) is the IC in this sentence, so that this word is provided with 1 point.

In another sentence "hon keiyaku wa tosha ga moshikomikin wo juryo shita toki ni seiritu surumonoto shimasu" (It is regarded that this contract is approved when our firm receives the application money), although "shimasu" (regarded) is a main verb in this sentence, the subject matter is "seiritu suru", so that the words "keiyaku suru" (contract), "moshikomu" (apply), "juryo suru" (receive), "seiritu suru" (approve) and "suru" (regarded) are respectively provided with 1 point, 1 point, 1 point, 3 points, and 0 point.

These points are provided to the words with reference to the translated sentence. In a case where the translated sentence in English is a complex sentence, a candidate of the IC corresponding to a word which is the subject matter in the translated sentence in English is provided with 2 points.

The points are totaled every candidates of the IC, and the results are logarithmically normalized. The "POINTER" is used to detect a part corresponding to the IC from the information in the target-language pattern database.

The target-language pattern database is divided into the target-language sentence pattern database and the target-language phrase pattern database.

TARGET-LANGUAGE SENTENCE PATTERN DATABASE

FIGS. 7–11 show examples of the target-language sentence patterns.

In this database, a fundamental sentence pattern for each IC is described in the target-language (English), and a sentence pattern by which contents of the original sentence can be explained easiest is selected as the fundamental sentence. This database has a pointer used to extract phrase patterns, such as a to-infinitive phrase, a gerund phrase, and a preposition phrase.

Referring to FIGS. 7–11, in the first line, the IC, an English term corresponding the IC and the meaning that the IC is used in this case are provided (the English term corresponding to the IC is referred to as an English IC.

<Required>: This label indicates essential information which is information to be essential in the translated sentence having the English IC.

<Preferred>: This label indicates preferred information which is information preferable to be included in the translated sentence having the English IC.

<Optional>: This label indicates optional information which is information apt to be used in the translated sentence having the English IC. Even if the optional information does not exist in the sentence having the English IC, the sentence is not unnatural.

<Subj-__>: This label indicates the subject in the sentence.

<DirObj-__>: This label indicates the direct object in the sentence.

<IndObj-__>: This label indicates the Indirect object in the sentence.

<Xobj-__>: This label indicates another object (an object of a to-infinitive phase, an object of a gerund and the like).

<Alternates>: Information to be indicated, as information required in the translation, to the operator and the default information, such as <someone> and <something> are written in the <Alternates>. The information required in the translation is indicated when the information does not exist in the intermediate structure (S), and if the required information is not supplied to the system by the user, the default information is used.

<Feature>: This indicates features of information required. If the features correspond to the information in the intermediate structure (S), the reliability increases.

<Japanese>: This indicates case labels in the intermediate structure (S) and another condition information written in this position.

<English-Pattern-Pointer>: This is a set of pointers indicating phase patterns having contents (arrangement of words or phrases) more detailed than description roughly characterizing the English sentence pattern (values of <Restriction>). This is indicated, for example, as <v-ltestl-001>.

TARGET-LANGUAGE PHRASE PATTERN

FIG. 12 shows an example of the target-language phrase pattern.

A sentence structure is decided by use of phase patterns identified by the target-language sentence pattern so that whole contents explained by the source-language can be explained by the target-language.

<Pattern>: This is a unit of the arrangement of English words, default values and other phrases which are grammatically acceptable in the sentence.

<Example>: This is an example of explanation used for the update of this database.

<Component>: This is indicated by <Xn, Xm>. <Xn, Xm> means that the m-th X identified by the n-th X is selected, X being an element described in the <Pattern>.

TRANSLATION DICTIONARY

FIG. 13 shows an example of the translation dictionary.

Independent words or content words in the source-language are provided with equivalents in the target-language. Even if the equivalents regarding the same words, they may differ from each other in accordance with the fields. The translation dictionary may have the function of the field classified keyword list described above, but in the light of the simplicity of the management of the databases, it is preferable that the translation dictionary be separated from the field classified keyword list.

The translation dictionary is provided, as the attribute, with "ENTRY", "READING", "PART OF SPEECH", "FEATURES", and "ENGLISH DESCRIPTION". In the "ENGLISH DESCRIPTION", English equivalents of Japanese words are described. The "FEATURES" is used for the relationship analysis with respect to features required in the target-language phase patterns. Other items are the same as those in the field classified keyword list.

GUIDANCE LIST

FIG. 14 shows an example of the guidance list database.

This list has comments why the sentence pattern is selected for the original, why equivalents corresponding to words in the original do not exist in the translated sentence, and why equivalents corresponding to words which do not exist in the original is required.

EXCHANGE: This is a comment given in a case where appropriate terms are substituted for terms which are generally easily erroneous for Japanese.

REQUIRED: This is a comment given in a case where words corresponding to words not described in a Japanese sentence are needed in English.

RELATIONAL: This is a comment given in a case where an English word to which a word (especially an independent word) described in a Japanese sentence is to be directly translated does not exist in a translated sentence.

An operation of the translating system according to the present invention will be described below with reference to FIGS. 15-26.

First, the operator must decide a state in which the translation body 8 is to be used. This system must have a memory for storing the state of the translation body. FIG. 15 shows a translation state memory.

Information indicating the state in which the translation body 8 is to be used and information required when the translation body 8 changes conditions are stored in the translation state memory. Flags having "0" or "1" are assigned to state items in the translation state memory. The state items are "TRANSLATION UNIT", "INTERACTION" and "FIELDS". The state item "TRANSLATION UNIT" is divided into "BATCH 1", "BATCH 2" and "SINGLE SENTENCE UNIT". The "BATCH 1" is a mode in which an automatic sentence separation process for separating sentences in a text from each other can be performed within the analysis process so that a text having a plurality of sentences can be translated. The "BATCH 2" is a mode in which a set of sentences clearly separated from each other is translated. "SINGLE SENTENCE UNIT" is a mode in which a single sentence is translated. The state item "INTERACTION" is divided into "EXISTENCE OF INTERACTION", "EXISTENCE OF GUIDE DISPLAY", "EXISTENCE OF WORD LEARNING" and "EXISTENCE OF SENTENCE PATTERN LEARNING". The state item "FIELD" is divided into four fields (0)–(3) in this embodiment. The number of fields is not limited to four. In this embodiment, the field (0) corresponds an automatic mode, the field (1) is a generic field, the field (2) is related to the electronics and information, and the field (3) is related to the heavy electrical equipment.

A manual flag section is a flag section in which flags can be identified by the operator. An automatic flag section is assigned to only the state item "FIELD". The manual flag section is prior to the automatic flag section, and the automatic flag section is activated in only a case where a flag of a field (0) in the manual flag section is set at "1". In this embodiment, it is assumed that the state items "SINGLE SENTENCE UNIT", "EXISTENCE OF INTERACTION", "EXISTENCE OF GUIDE DISPLAY", and the field (0) are active (corresponding flags in the manual flag section are and the items "EXISTENCE OF WORD LEARNING" and "EXISTENCE OF SENTENCE PATTERN LEARNING" are inactive (corresponding flags in the manual flag section are "0").

Hereinafter, a description will be given of operations for translating two original sentences (1) and (2) shown in FIG. 16. In the "SINGLE SENTENCE UNIT", the sentences are read out from the original text database sentence by sentence. Each of the sentences read out from the original text database is assigned with a tag of SourceTex (J).

FIG. 18 shows an example of the source-language intermediate structures (S) obtained by the analysis of the original sentence (J).

Referring to FIG. 18, in an item "sem", an independent word (including an affix and a coined word component) which is the main analysis result is described in the original form. A state in which the independent word is used in the sentence is indicated immediately under the item "sem". The state may be indicated using a plurality of lines if necessary, and the state may be not indicated if unnecessary. An item name positioned at the front of [ ] is a symbol indicating a part, in the sentence, assigned to contents in the [ ], and is referred to as a part label.

Here, it is indicated that a word "okonau" is the main verb of the sentence (1). "tens" and "PAST" (ta) indicate that the word is accompanied with an auxiliary verb "ta" so as to be in the past tense. Although a word "testosuru" is originally a sa-hen verb, it is indicated that the word "testosuru" is used as a noun in the sentence. "wo obj" positioned at the front of [ ] in which "testosuru" is written indicates that the word "testosuru" is used as the object in the sentence. A part label "pre-supp" is assigned to a set of words "suru", "taisho" and "hendensho".

In the intermediate structure (s) of the sentence (2), since the main verb "suru" is the present tense, the "tense" and "PASTE" are omitted as the default. "aspect" and "STATE" (iru) indicates that the sentence is a state indicating sentence accompanied with an assistance verb "iru". <renyo>mod indicates that a set of words "doyoda, "baai", "shorisuru" and "togo" in the [ ] modifies a word in a renyo-style (hi) of the adjective verb ". . . da". The "ha topic" is the part label indicating that a set of words "jitsugensuru", "jo", "konpyuta" is the subject matter of the sentence.

When the analysis process is completed, it is determined, with reference to the state item "FIELDS", whether or not the automatic mode is active. If the automatic mode is active (the flag of the field (1) is set to "1"), the field determination process is carried out. If a field has been designated, the field determination process is skipped.

In a case of the sentence (1), the values "okonau", "tesutosuru", "suru", "taisho", "hendensho" in all the items "sem" are extracted from the intermediate structure (S). The "ENTRY" of the field classified keyword list (see FIG. 5) is searched for the above values. Only the value "hendensho is detected, and a frequency "076" in the field (1), a frequency "014" in the field (2) and a frequency "232" in the field (3) are read out from the "FREQUENCY". The frequency in the field (3) has the largest value, and this information is supplied to the translation state memory, so that the automatic flag corresponding to the field (3) in the state item "FIELDS" in the translation state memory (see FIG. 15) is set to "1". Hereinafter, information belonging to the field (3) related to the "heavy electrical equipment" is preferentially processed.

In a case of the sentence (2), all the values in the item "sem" are extracted from the intermediate structure (S), and the classified keyword list database is searched for the extracted values. As a result, values "gengo" having frequencies "045", "224" and "006" in the fields (1),(2) and (3), "ronrigata" having frequencies "021", "088" and "014", "besu" having frequencies "156", "045" and "092", "baai" having frequencies "273", "210" and "084", "togo" having frequencies "000", "043" and "000" and "konpyuta" having frequencies "033", "321" and "174" are detected in the "ENTRY" of the classified keyword list database. The total values of the frequencies of the extracted values in the fields (1), (2) and (3) are then calculated. The total values of the frequencies are "528" in the field (1), "931" in the field (2) and "370" in the field (3)>. The total value of the frequencies in the field (2) is maximum. Thus, the flag corresponding to the field (2) in the automatic flag section of the translation state memory is set to "1". Hereinafter, information belonging to the field (2) related to the "electronics/information" is preferentially processed.

When the field determination process is completed, the IC is extracted from a sentence to be translated.

In a case of the sentence (1), values (words) "okonau", "testosuru", "suru", "taisho", "hendensho" in all the items "sem" are extracted from the intermediate structure (S) (the part label belonging to each item "sem" is also extracted), and the "ENTRY" of the IC candidate list (see FIG. 6) is searched for the extracted values. In this case, "testosuru" (wo obj) and "okonau" (Hed) are detected. The possibility E=f(S,P) by which each detected word is the IC is calculated using a coefficient P depending on the inflection of the part of speech of each detected word and the part label and a possibility value P. The calculation results are stored as scores in the extraction IC buffer along with pointers, as shown in FIG. 17.

In a case of the sentence (2), all the values (words) in the items "sem" and the part labels are extracted from the intermediate structure (S), and the IC candidate list (see FIG. 6) are searched for the extracted values in the items "sem". In this case, two words "kotsigemsuru" (wa topic) and "shorisuru" (<renyo>mod) are detected, and the possibility E by which each word is the IC is calculated. The calculation results are stored as scores in the extraction IC buffer along with pointers, as shown in FIG. 17.

After this, the target-language pattern of each sentence is extracted.

In a case of the sentence (1), the target-language sentence pattern database is searched for the pointer "0378" of the word "testosuru" having the highest score in the extraction IC buffer, and information shown in FIGS. 7–11 is obtained.

First, the intermediate structure (S) is checked for the description of the <Restrictions> in the <English-Pattern-Pointer>. In this case, it is checked where the part label of the DirObj-PATIENT exists in the intermediate structure (S). However, since the DirObj-PATIENT does not exist in the intermediate structure (S), the process proceeds to the next step. In item "AND", (@noun, sem (suru)—upper structure, function name (wo obj)) is described. This means that the word "tesutosuru" has the attribute "noun", the function name thereof is "wo obj" and "suru" exists in the upper item "sem". As a result of checking, conditions of the "@noun" and the "function name" (wo obj) are satisfied, but the "suru" does not exist in the upper item "sem". Next, it is checked whether or not "ukeru" exists in the upper item "sem". However, the "ukeru" does not exist in the upper item "sem".

In the next item "AND", (@noun, sem (okonau), —upper structure function name (wo obj)) is described. The intermediate structure (S) is checked in the same manner as that in the above case. As a result, it is determined that the word "testosuru" has the attribute "@noun", the "okonau" exists in the upper item "sem" and the part label is (wo obj). The all the conditions are satisfied, so that this pattern is accepted. Since the pointer is <v-|testl-003>, conduct <n-|testl-002> is obtained due to the retrieving of the target-language phrase pattern database. This means that the translated sentence should have a sentence pattern in which a word "conduct" having a direct object "test" is a main verb. Information in < > is a pointer, and the retrieval process is performed using the information in < >. As a result, |testl (<p-|ofl-001>) and (<p-|forl-001>) are obtained. This description has a component section in which (X1, X1)<DirObj-PATIENT> and (X2, X2)<Xobj-CONDITION> are indicated. Thus, <p-|ofl-001> is retrieved, and |ofl<SOMETHING> is obtained as the default value.

After this, the intermediate structure (S) is searched for a word using the part label of <DirObjPATIENT>. As this label is an English label, the English label is converted into a Japanese label using a reference table in which one or a plurality of Japanese labels corresponding to the English label are arranged in the priority order. As a result, "wo obj" is obtained the highest priority. The intermediate structure (S) is retrieved using this label, a word "hendensho is obtained. Here, the translation dictionary database is searched for hendensho, so that an equivalent "transformer station" in English is obtained, the attribute of the equivalent being an INS (institution). As the INS belongs to the PATIENT, it is confirmed that the "transformer station" may be inserted after |ofl.

When <p-|forl-001> is checked, |forl<SOME PURPOSE> is obtained as the default information. A Japanese label corresponding to the part label of <Xobj-CONDITION> is "ni obj", and the intermediate structure (S) is searched using the label "ni obj". As a result, a word "taisho" is obtained. Here, the translation dictionary database is retrieved, so that an equivalent "subject" and a meaning attribute "APP( )" are obtained. Further, as the CONDITION is not directly related to the APP, it is determined that the word taisho is not inserted after the |forl. Thus, the taisho is not selected as a candidate of <SOME PURPOSE>. After the information extracted from the intermediate structure (S) in accordance with the request from the target-language pattern is completely processed, the item "sem" (suru) is processed in a "specific process of suru".

To be concrete, if the item "sem" is left over in a pattern ". . . a postpositional word (functioning as an auxiliary)/ "APP":meaning appanage/suru . . . ", such as ". . . wo/taisho/nishite . . . ", ". . . wo/taisho/toshita", ". . . no/baai/nishite . . . " and ". . . wo/baai/toshite", the word "suru" is not converted into a word in the target-language. In a case where a Japanese word is not directly converted into an English word as described above, the information regarding this is supplied to the guidance information extraction. At the last, returning to the target-language side, the contents of <Required> are checked. As a result, it is determined that the item <Subj-AGT> is not filled with information, and the contents (the default value of <someone>) is supplied to the request information buffer. The comments are transmitted to the guidance buffer. The item <DirObj-PATIENT> is provided with a word "test" itself and "PreDO" of the word "test".

Now, the whole information in the intermediate structure of the sentence (1) has been completely processed. However, even if the process for the information in the intermediate structure (S) reaches an impasse, the target-language pattern extraction process may be terminated at a time the patterns in English have been completely used (reference to FIGS. 19 and 20).

The guidance information extraction receives from the target-language pattern extraction information indicating that the items "sem" (taisho) and (suru) are not necessary. Thus, "taishonishite" is created from the structure, and a guidance message indicating that the meaning is included in the sentence pattern is selected from the guidance database. The "taishonishite" and the guidance message are supplied to the guidance buffer.

In the display shaping process, <someone> and <who> in the item <Subj-AGT> are selected as the essential information from the request information buffer. The label indicating these are essential information and the essential information are supplied to the display buffer. To be concrete, <<someone: >> as the information for IM(e) and <<who: >> as the information for IM(J') are respectively supplied to the IM(e) and IM(J').

In addition, comment information—"tesutosuru": "test": "in a case where machines and equipments are tested"—is selected from the guidance buffer, and are shaped into a form so as to be easily read by the operator. The comment information is supplied to the Comment section of the display buffer. Further, the comment information of "taishonishite" which has been supplied from the guidance information extraction is selected from the guidance buffer, and is supplied to the Comment section of the display buffer. In addition, the information written in the <Alternates> which is the essential information in the target-language pattern extraction is selected from the guidance buffer, and is supplied to the Example section of the display buffer.

DISPLAY BUFFER

In FIG. 22, the description surrounded by [ ] in the item value means that information identified by the title is indicated. The description without [ ] is the description itself. The description in the item "Intoed(e):" is surrounded by [ ], contents of the description is "GenResult(E')". Thus, a translated sentence (E') at this time is displayed. This is a sentence created by shaping of the information read out from the English section of the request information buffer. This has a pointer for indicating the relationship between the information in the request information buffer and the translated sentence in the surface level. The description in the item "Intoed(J'):" is surrounded by [ ], contents of the description is "GenResult(J')". Thus, a reference sentence (J') at this time is displayed. This is a sentence created by shaping of the information read out from the Japanese section of the request information buffer. This has a pointer for indicating the relationship between the information in the request information buffer and the reference sentence in the surface level.

Text(J) indicates that SourceTex(J) is read out from the original memory and is supplied to the translation editor 7.

Text(e) indicates that TranTex(E) is read out from the translation memory and is supplied to the translation editor 7.

SHAPING 1

In the request information buffer, the intermediate structure described by English sentence patterns are provided along with corresponding information of a Japanese sentence. only information items needed to create an English sentence is selected from the information items in the request information buffer, and are shaped so as to easily create the English sentence. The headings in the request information buffer are described in Japanese and in English. "conduct a test" in English is selected from the headings in the request information buffer, the main verb "conduct" is a value of the Head-label, and the direct object "a test" is a value of the DirObj-label. In this case, these are associated with the contents of the PrepDo-label in the request information buffer. The value of the Xobj-label may be moved to the creation side as it is. In these operations, the information in Japanese is removed. The results are indicated as shown in FIG. 22 (1).

A sentence in the surface level is created in accordance with creation rules in the "CREATION 1".

The "tense" label is "PAST", and the main verb is changed to the past tense. The essential value of the subject word is surrounded by << >>. If the essential value does not exist, the value (a word) of the DEF-label is inserted into << >>. If the essential value exists, the value of the DEF-label is first inserted into << >> and a value (a word) of the sem-label is then surrounded by ( ). A value (a word) of a phrase such as the Xoj-label is surrounded by < >. At this time, "<<someone>> conducted a test of <<something (the transformer station)>> <for some purpose>" is obtained. This sentence label is the GenResult (E').

In the T-shaping process, accompanying information of a part having no vagueness is removed from the sentence labeled by the GenResult (E'), and a sentence having a form close to the normal description form (If there is no vagueness at all, a sentence having the normal description form is obtained). At this time, "<<someone>> conducted of a set of transfer station".

SHAPING 2

The request information buffer is provided with the intermediate structure described by English sentence patterns. The request information buffer is also provided with corresponding information concerning the Japanese sentence. Only information needed to create a Japanese sentence is read out from the request information buffer and is shaped in a form by which the Japanese sentence is easily created. The "SHAPING 1" can be actualized by a simple shaping process, but a creating process is required for the "SHAPING 2" in a some measure. The headings in the request information buffer are described in English and in Japanese, "testo wo okonau" in Japanese is selected from the headings in the request information buffer. The main verb "okonau" is a value of the sem-label of Head, and the direct object "testo" is a value of the obj-label. In this case, these are associated with the contents of the PrepDo-label in the request information buffer in the same manner as those in the above English case. Now, a value of the candidate-label is "hendensho and a value of the Prep-label is "of", so that the "no"mod-label is added to the structure. A value of the Xobj-label may be maintained as it is, but the form thereof is converted into that in Japanese. Since a value (a word) of the option label is "nannotameni" and a value of the Prep-label is "for", the mod-label is added to the structure. The process is completed at this time, and the result including the option label may be moved to the creation side. All the English information is removed from the result, and the result is described as shown in FIG. 24 (1).

A sentence in the surface level is created in accordance with creation rules in the "CREATION 2".

The "tense" label is "PAST", and a past auxiliary verb "ta" is substituted for an auxiliary verb.

The essential value, for the subject, is described so as to be surrounded by << >>. If there is no value to be in << >>, a value of the essential label is entered in << >>. If there is a value to be in << >>, the candidate label is substituted for the label name and the value is entered in << >>. An optional clause such as the mod-label is described such that a value of the option label is surrounded by << >>. At this time, "<<darega>><nannotameni><<hendensho>>no testo wo okonatta" is obtained. The label of this sentence is the GenResult (J') (see FIG. 26 (1)).

A description will now be given, with reference to FIGS. 27–30, of screens on the display unit.

Figure 27:
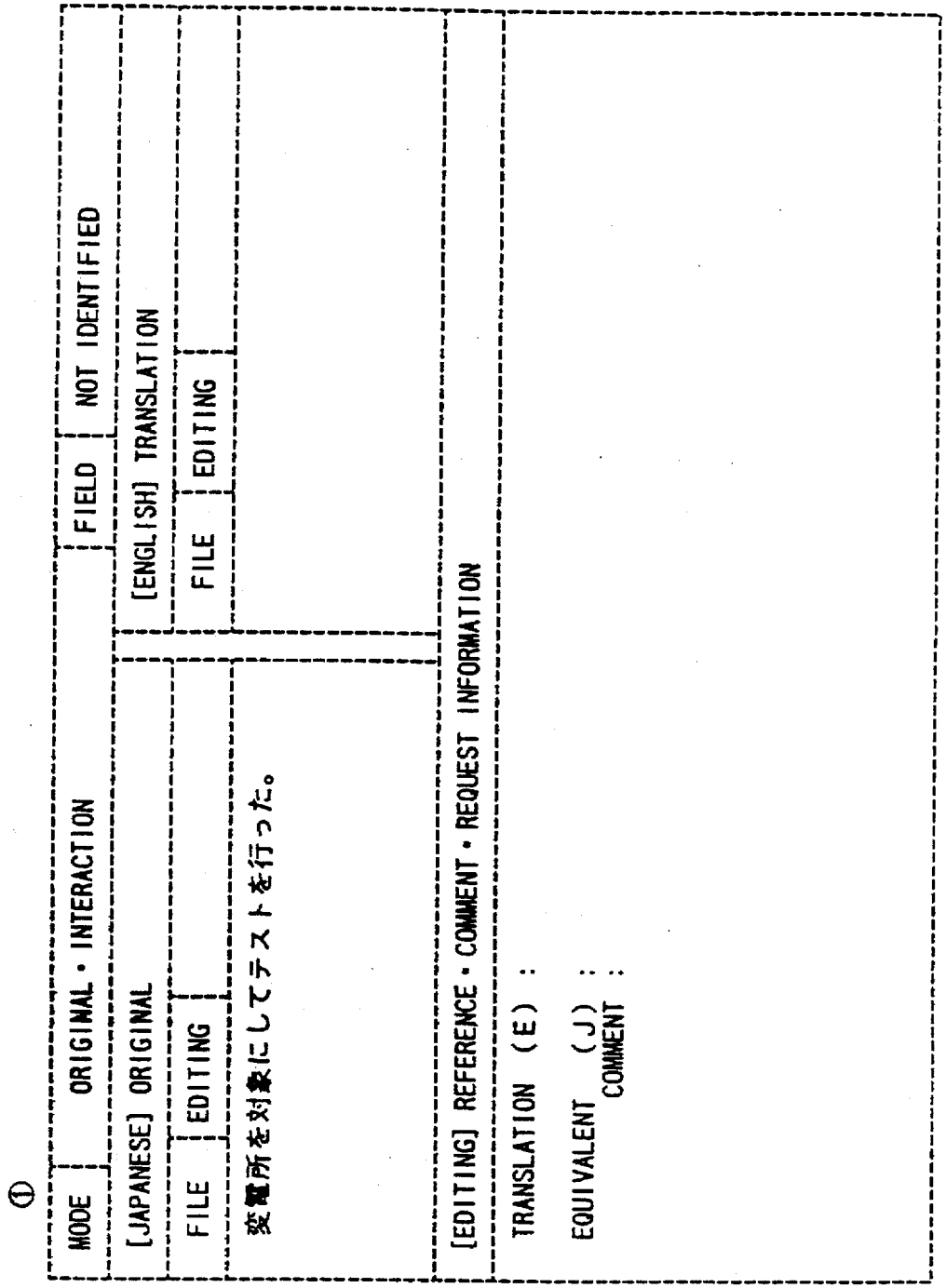

When the initial setting operation (see FIG. 15) is completed and an original sentence is selected, the display unit has a screen as shown in FIG. 27. In this state, when a starting instruction of the translation is input from the keyboard, processes from |ANALYSIS| to |CREATION 2| and |T-SHAPING| are performed. After the processes are completed, the contents in the display buffer is then displayed on the display unit as shown in FIG. 28. Referring to FIG. 28, in a section of the [editing] reference sentence, a sentence existing at this time in the GenResult (E') is indicated in the "translation (E):" area, and a sentence existing at this time in the GenResult (J') is indicated in the "equivalent (J):" area. In the "comment:" area, a reason why "conduct a test" has been used and a reason why an English word corresponding to a word "taishonishite" in the original sentence does not exist in the translation sentence.

This screen is provided with a message "Please fill the following essential items". An "essential item (Japanese):" and an "essential item (English):" may be filled with words. In "English example:", examples of English words capable of filling the "essential item (English):". When the return key is operated under the condition in which the "essential item (English):" is filled with an English word, the translation sentence (E) and the reference sentence (J') in which the English word in the "essential item (English):" is reflected are created. Thus, contents in the "[English] translation" section and in the "translation (English):" area may be changed, but contents in the "equipment (Japanese):" are not changed. When the "essential item (Japanese):" is filled with a required word, the translation dictionary is retrieved and an English description corresponding to the required word is selected. The English description is used in the following processes. The result as shown in FIG. 29 obtained so that the translation is completed.

After the request information has been obtained, the following operation is carried out.

When a Japanese word "seifu enters the "who" in the Japanese side of the essential subj-label in the request information buffer, the |TARGET-LANGUAGE PATTERN EXTRACTION| influences the |EQUIPMENT CONVERSION| and the translation dictionary is retrieved. As a result, an equipment "government" of the Japanese word seifu is obtained. The word "government" is inserted into the slot in the English side. The result is shown in FIG. 19 (1)'. After this, in |SHAPING 1|, |CREATION 1|, |T-SHAPING| |SHAPING 2| and |CREATION 2|, processes are carried out in the same manner as the above case. The results are obtained as shown in FIGS. 25(1)', and 26(1)'.

If the operator who does not satisfy the translation inputs a word "agency" after the word "government" and operates the return key, the contents in ( ) of the request information buffer are changed as shown in FIG. 20 (1)". The processes are then carried out in |SHAPING 1|, |CREATION 1|, |T-SHAPING|. The respective results are obtained as shown in FIG. 25 (1)". In this case, the contents in the Japanese side of the request information buffer are not changed, so that the reference sentence (J') is not changed. A sentence (1)" in FIG. 26 is equal to a sentence (1)'.

Figure 31:
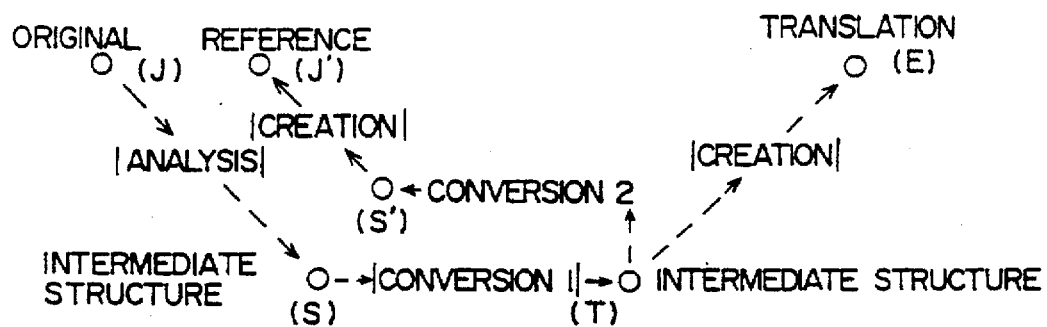
FIG. 31 is a diagram illustrating a translation system according to another embodiment of the present invention.
Figure 32:
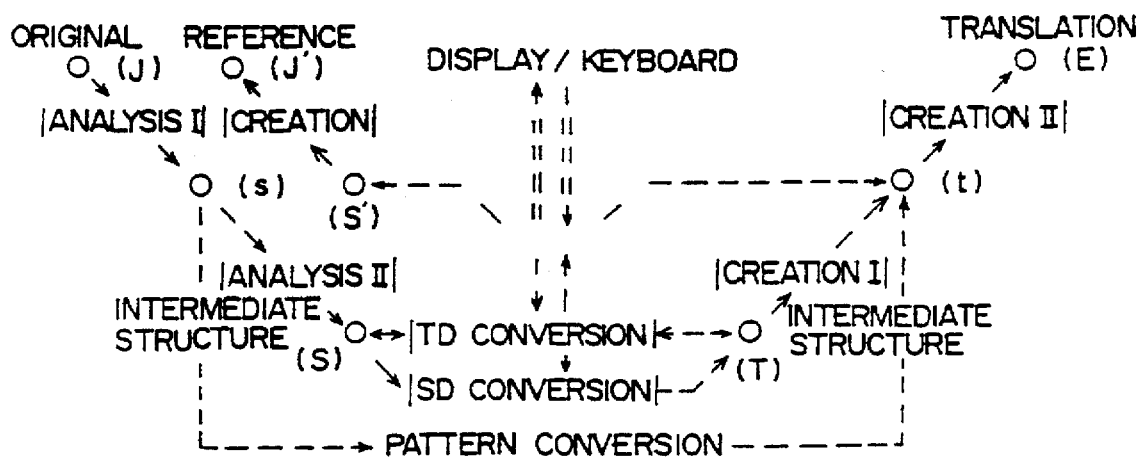
FIG. 32 is a diagram illustrating a translation system according to another embodiment of the present invention.

FIGS. 31 and 32 respectively show a second embodiment and a third embodiment of the present invention.

Figure 33:
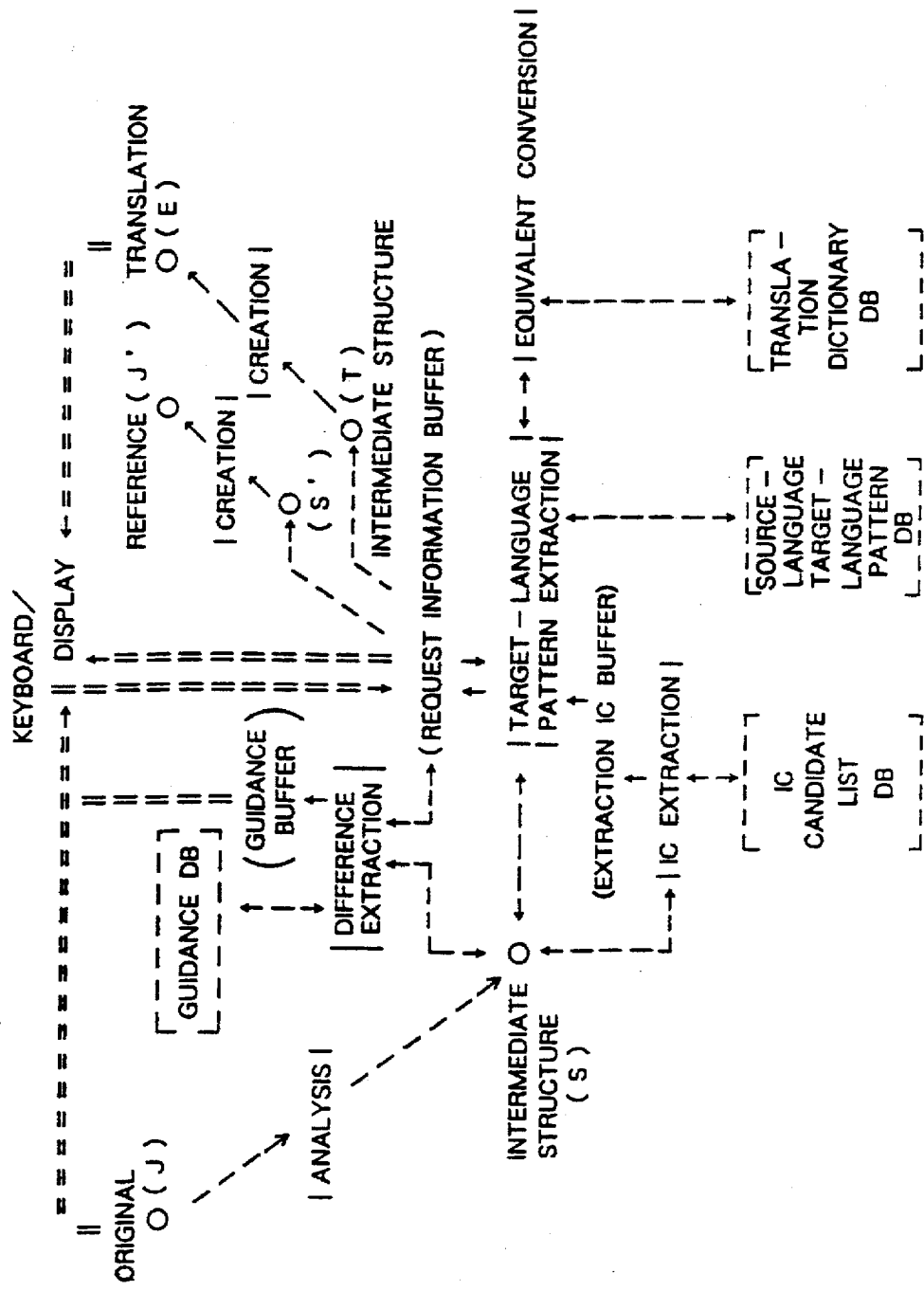
FIGS. 33, 34, 35 and 36 are diagrams illustrating examples of a TD method.
Figure 34:
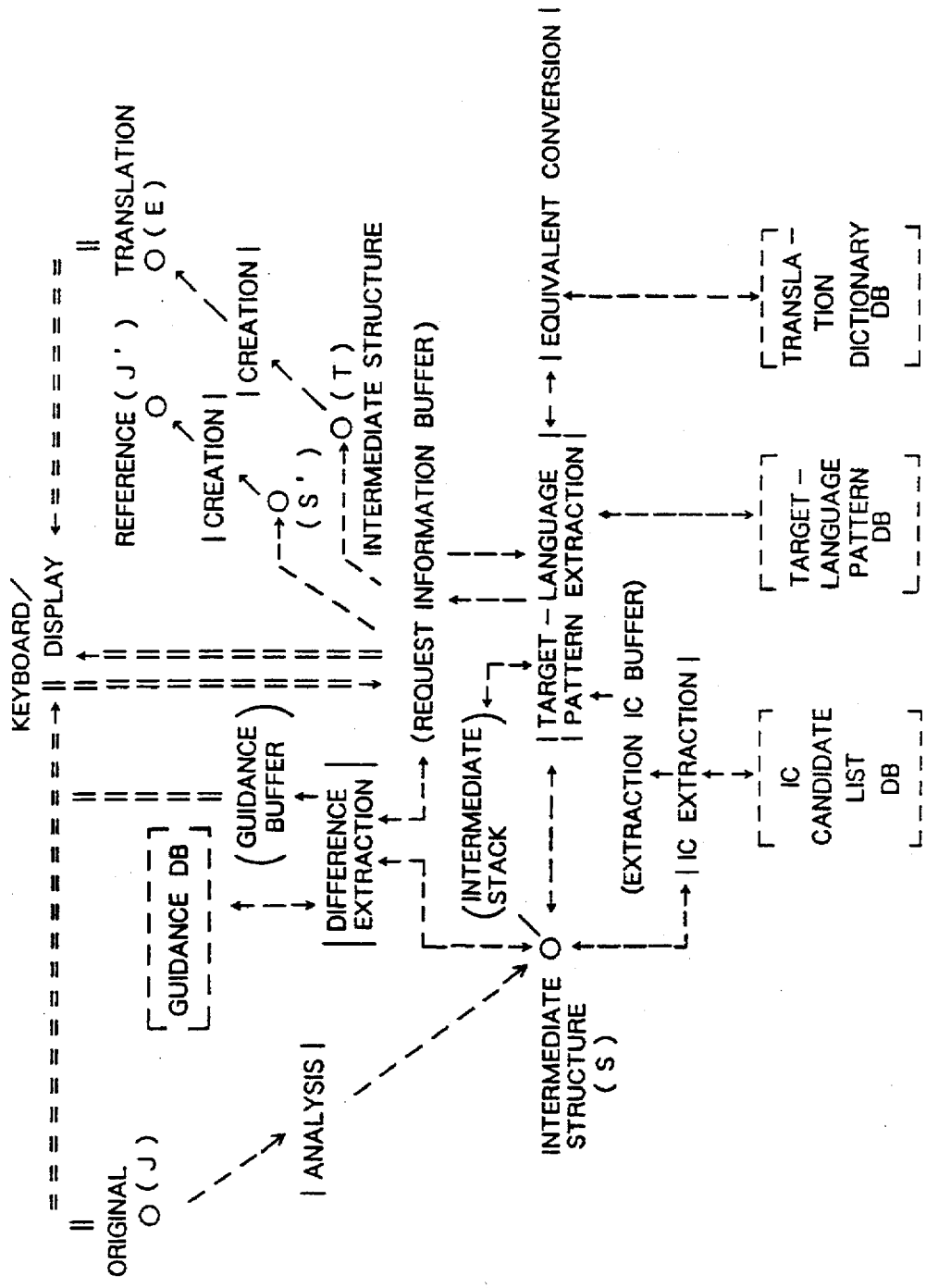
Figure 35:
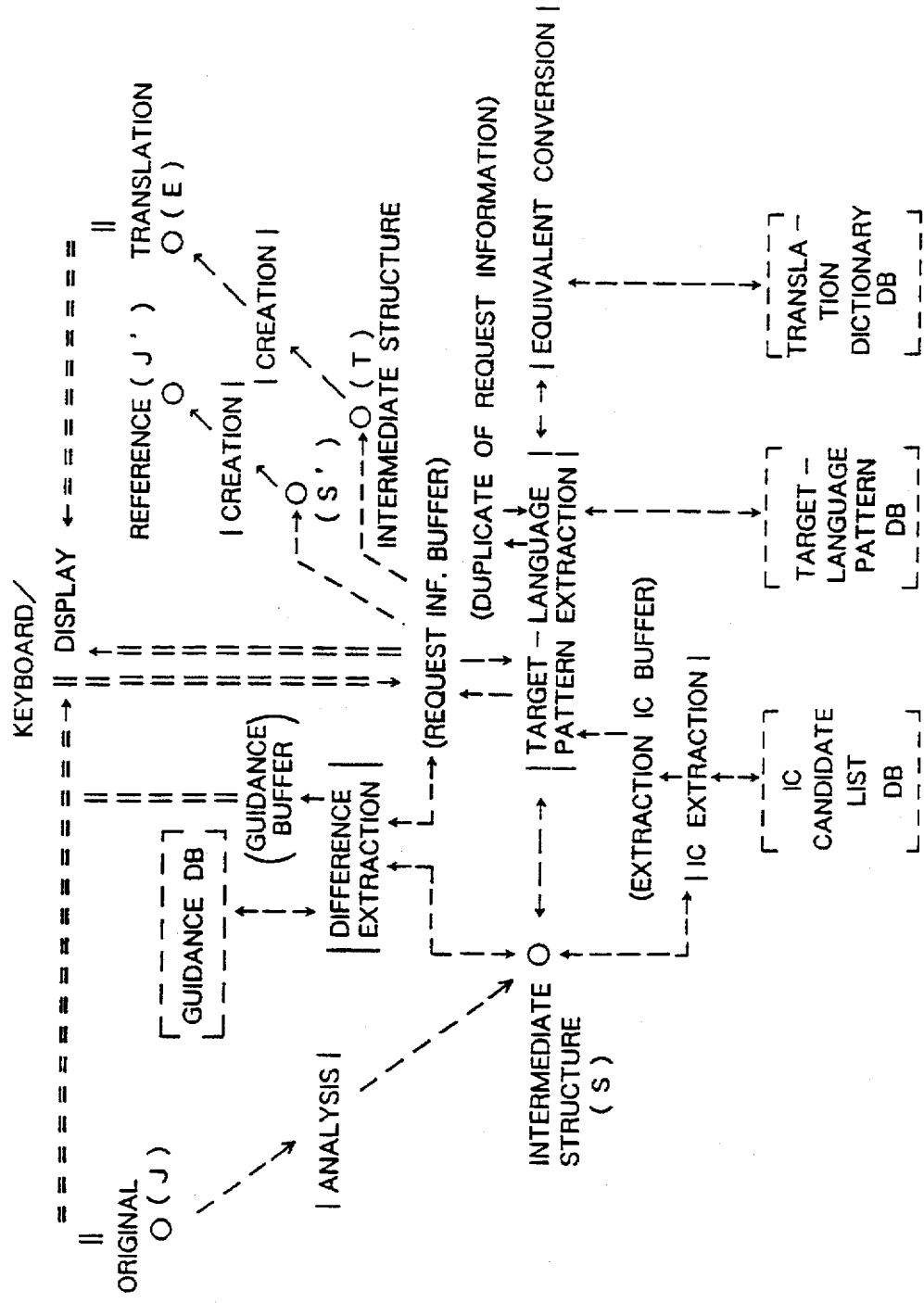
Figure 36:
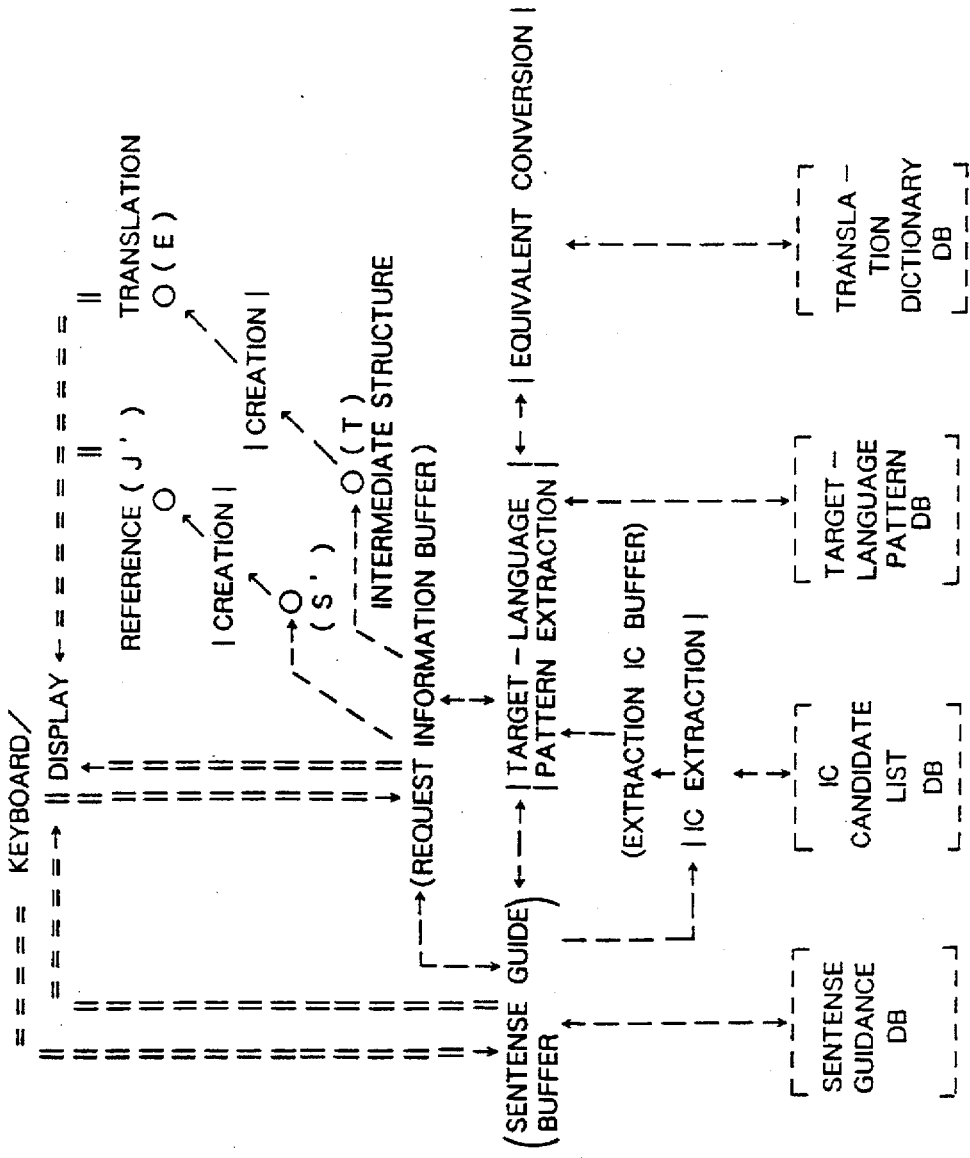

In these embodiment, a translated sentence can be obtained by the same processes as the above embodiment. In addition, FIG. 33 shows an embodiment of a TD method (the source-language, and the target-language pattern database), FIG. 34 shows an embodiment of the TD method (the context), FIG. 35 shows an embodiment of the TD method (with a learning process), and FIG. 36 shows an embodiment of the TD method (with a learning process and the creation of the original text).

A description will now be given of modifications of the pattern matching process regarding the target-language pattern.

It is determined, in accordance with the following methods, how certain the target-language sentence pattern as shown in FIGS. 7–10 is matched to the source-language sentence.

(1) It is determined in accordance with counting matched elements.

The certainty is determined based on the number of elements in the target-language sentence pattern, which elements are satisfied by the source-language information. Examples will be described below.

As to a sentence "hendensho wo taishoni shite, tesuto wo okonatta" (a sentence (1) shown in FIG. 16) (an example a), <Restrictions> of a pattern in the <English-Pattern-Pointers> the IC "testosuru" are compared with the source-language intermediate structure (shown in FIG. 18), and it is determined which <Restrictions> are matched to elements in the source-language intermediate structure. In the embodiment of the present invention, it is determined that (@noun sem (okonau)—upper structure function name (wo obj) is matched to the source-language intermediate structure (FIG. 18) by the following steps 1–8.

In step 1, from among <Restrictions> of the patterns in the <English-Pattern-Pointers>, objects having the sem ( ) item matched to the sem item in the source-language intermediate structure is selected. In the embodiment of the present invention, (@noun sem (okonau)—upper structure function name (wo obj) is matched to the element in the source-language intermediate structure. Furthermore, (wo obj) is also matched to an element in the source-language intermediate structure. Thus, the target-language pattern <v-ltestl-003> corresponds to the source-language intermediate structure.

In step 2, starting from the target-language pattern <v-ltestl-003>, target-language phrase patterns <v-ltestl-003>, <n-ltestl-002> and <p-lofl-001><p-lforl001> are successively compared with the source-language intermediate structure in this order.

First, the target-language phrase pattern <v-ltestl-003> is formed of (<Pattern> (conduct <n-ltestl-002>)
          (conduct <n-ltestl-003>)), so that it is determined that the target-language pattern has a sentence pattern in which the verb is "conduct" and the object is either <n-ltestl-002> or <n-ltestl-003>.

In the next step 3, the target-language phrase pattern <n-ltestl-002> is formed of (<Pattern> (ltestl (<p-lofl-001>) (<vinf-lto determinel-002>))
(<Example> "A TEST OF (test-subj) TO DETERMINE (A or B)")
(<Component> ((X1 X1) <DirObj-PATIENT>)
            ((X2 X1)
             <Xnnn-BINARY_CONTRAST>)), so that it is determined that <Component> ((X1 X1) <DirObj-PATIENT>) in the first line of the <Component> section, that is <something> of <p-lofl-001>, corresponds to <DirObj-PATIENT> of the IC "testosuru" (see FIGS. 7–11), where (X1, X1) means that a first item of elements in a first item of the <Pattern> line.

According to the IC "testosuru", <DirObj-PATIENT> belongs to <Required>, so that it is the essential element. An element corresponding to <DirObj-PATIENT> is extracted from the source-language intermediate structure. Since <DirObj-PATIENT> is the label in the target-language, it is not directly extracted from the source-language intermediate structure. Thus, a reference table in which a plurality of labels in the source-language corresponding to each label in the target-language are arranged in a priority order is previously prepared, and the label in the target-language is converted into the label in the source-language using the reference table. Based on the label obtained by the conversion, a corresponding element is then extracted from the source-language intermediate structure. In the embodiment of the present invention, "wo obj" corresponds to <DirObjPATIENT> with first priority, so that it is determined that an element "hendensho" of "wo obj" in the source-language intermediate structure corresponds to <DirObj-PATIENT>.

In step 4, according to the translation dictionary database, the equivalent, in the target-language, of the element hendensho obtained in step 3 is "transformer station", and its meaning attribute is INS. That is, it is determined that <SOMETHING> of <p-lofl-001> is "transformer station" and its meaning attribute is INS.

In step 5, it is determined whether or not a condition is satisfied in which condition <SOMETHING> of <p-lofl-001> is <DirObj-PATIENT>. Referring to the meaning reference table (which is a kind of a meaning network and indicates relationships between meaning attributes, a meaning attribute INS belongs to a meaning attribute PATIENT, so that the above condition is satisfied and it is determined that there is an element corresponding to <DirObj-PATIENT> in the source-language intermediate structure.

In step 6, ((X2 X1) <Xnnn-BINARY_CONTRAST>)) in the second line of the <Component> section is processed in the same manner as that in the first line where (X2, X1) means that a first item of the elements of a second item in the <Pattern> line. In this case, an element corresponding to (<vinf-lto determinel-002>) does not exist in the source-language intermediate structure. However, the first item of the elements of (<vinf-lto determinel-002>) corresponds to <Xnnn-BINARY_CONTRAST> of the IC "testosuru". Since this is <Required>, even if the element corresponding to (<vinf-lto determinel-002>) does not exist in the source-language intermediate structure, there is no problem.

In step 7, according to the above results, it is determined that <n-ltestl-002> is matched to the source-language intermediate structure. It is also determined, in the same manner as described above, that <n-ltestl-003> is also matched to the source-language intermediate structure.

Thus, it is determined, in step 8, that two patterns (<Pattern> (conduct <n-ltestl-002>)
          (conduct <n-ltestl-003>)

of <v-ltestl-003> are matched to the source-language intermediate structure.

On the other hand, as to an original sentence "anzenka, anzendenaika, wo kimeru tameni hendensho wo taishonishite, testo wo okonatta." (an example b), the comparison process is performed in the same manner as the above example a. As a result, <n-ltestl-002> in patterns (<Pattern> (conduct <n-ltestl-002>)
          (conduct <n-ltestl-003>))

corresponds to DirObj-PATIENT—"hendensho": <Required> and Xnnn-BINARY_CONTRACT—not matched: <Preferred>, in a case of (<Pattern>    (ltestl(<p-lofl-001>)(vinf-lto determinel-002>))
(<Example> "A TEST OF (test-subj) TO DETERMINE (A or B)")
(<Component>    ((X1 X1)  <DirObj-PATIENT>)
                ((X2 X1)
                 <Xnnn-BINARY_CONTRAST>)).
<n-ltestl-003> corresponds to DirObj-PATIENT - "hendensho" : <Required> and Xnnn-BOOLEAN - "anzenka, anzendenaika" <Preferred>
in a case of (<Pattern> (ltestl (<p-lofl-001>) (vinf-lto determinel-001>))
(<Example> "A TEST OF (test-subj) TO DETERMINE (WHETHER A or not A)")
(<Component>    ((X1 X1) <DirObj-PATIENT>)
                ((X2 X1)
                 <Xnnn-BOOLEAN>)).
Thus,
(conduct <n-ltestl-002>) and
(conduct <n-ltestl-003>)

are matched to the source-language intermediate structure.

In the above case, there is a problem in that it must be determined which target-language phrase pattern is selected. However, although there is no source-language information corresponding to Xnnn-BINARY_CONTRAST of <n-ltestl-002>, source-language information corresponding to Xnnn-BOOLEAN of <n-ltestl003> exists. Since both Xnnn-BINARY_CONTRAST and Xnnn-BOOLEAN belong to <Preferred>, even if there is no corresponding source-language information, the target-language phrase pattern is satisfied. However, if source-language information corresponding to <Preferred> exists, it can be determined that the target-language phrase pattern is likely to be certain. That is, in this embodiment, a priority order is decided as the following order of (conduct <n-ltestl-003>) and (conduct <n-ltestl-002>).

Due to counting of the number of elements, corresponding to which the source-language information exists, among the elements in the target-language phrase pattern, the above determination can be performed. In the above example b, if the number of elements corresponding to which the source-language information exists is managed in every phrase pattern (a management table is shown in FIG. 37), based on the results of the following comparison processes, <v-ltestl-003>-<n-ltestl-002>-<p-lofl-001><vinf-lto determinel-002>, the number of elements is obtained by the total of the number of elements having corresponding source-language information in respective phrase pattern. That is, 0+0+(1+0)=1 is obtained. In addition, in a case of <v-ltestl-003>-<n-ltestl-001>-<p-lofl-001><vinf-lto determinel-001>, 0+0+1+1=2 is obtained.

(2) A degree of importance is assigned to each matched element.

As described in the above section (1), the source-language intermediate structure and the target-language phrases are compared with each other, and it is determined which source-language information item corresponds to an element of the target-language phrase. There are two types of elements in the target-language phrase pattern, the first type of elements belonging to <Required>, and the second type of elements belonging to <Preferred>. Source-language information items corresponding to the elements belonging to the <Required> must exist in the source-language intermediate structure, and it is not necessary for source-language information items corresponding the elements belonging to <Preferred> to exist. However, if a plurality of target-language phase patterns are matched to the source-language intermediate structure, it can not be determined, based on only the above rules, which phase pattern must be preferentially treated. Thus, a degree of importance of each element in each target-language phase pattern is stored as a numeral value in the system, and a comparison score for each target-language phrase pattern is calculated using the degree of importance of each element therein. The priority is determined based on the comparison score, so that an appropriate target-language phrase pattern is selected.

In a case of the target-language sentence pattern shown, for example, in FIGS. 7-11, a degree of importance is assigned to each element as follows.

```
(<Required>
    (<Subj-AGT
    20
    (<DirObj-PATIENT>
    30
(<Preferred>
    (<Xobj-CONDITION>
    3
    (<X-BINARY-CONTRAST>
```

-continued

```
3
    (<Xnnn-BOOLEAN>
    3
```

The larger the degree of importance the more important. If only the source-language information corresponding to an element <Subj-AGT><DirObj-PATIENT> belonging to <Required> exist, the comparison score (S) of the target-language phrase is calculated using values of the above degree of importance as follows.

$$S=20+30+3=53$$

After the comparison score of each target-language phase pattern capable of being matched to the source-language intermediate structure is obtained as described above, it is determined that the target-language phrase having a higher comparison score is to be preferentially treated.

(3) A degree of importance is assigned to each of the target-language sentence pattern and the target-language phrase pattern.

A Japanese sentence "hendensho wo taishonishite testo-suru" is matched to the following examples of the target-language sentence pattern as shown in FIGS. 7-11;

"test" (to test machine and equipment) and

"examine" (to examine subjects of study and knowledge).

In a case where the source-language intermediate structure is matched to a plurality of target-language sentence patterns, a frequency at which the target-language description exists is detected, and the degree of importance calculated based on the detected frequency is assigned to each target-language sentence pattern. Even if the source-language intermediate structure is matched to a plurality of target-language sentence patterns, the plurality of target-language sentence patterns are treated in the priority order based on the degree of importance of each target-language sentence pattern.

The degree of importance is assigned to each target-language sentence pattern as shown in FIG. 38. In FIG. 38, a numerical value positioned at the side of each reference number indicates a degree of importance. There is a case where the source-language intermediate structure is matched to a plurality of target-language sentence patterns. In the above example, the source-language intermediate structure is matched to two target-language phase patterns of (conduct <n-ltestl-003>) and (conduct <n-ltestl-002>). In this case, to clarify the priority order, the degree of importance is assigned to each target-language phrase pattern as follows.

```
(conduct <n-ltestl-003>)
    50
(conduct <n-ltestl-002>)
    40
```

If the source-language intermediate structure is matched to a plurality of patterns, the patterns having a higher degree of importance is preferentially treated.

(4) A plurality of matching conditions are provided to the system.

As described in the section (1), when elements in the target-language phrase pattern are compared to the source-language information, each element must be equivalent to the source-language information in meaning. Thus, a meaning marker of a equivalent of the source-language information is made, and it is determined whether or not each element of the target-language phrase pattern belongs to a required meaning marker.

In addition, the surface level of the source-language is directly described in elements of the target-language phrase pattern, and the surface level described in the elements is compared to the surface level of the source language information. Only when they are equal to each other, the source-language information matched to the target-language phrase pattern. Thus, as to a unusual description, the matching hardly occurs in error. In addition, in a case where the source level of the source-language is included in element of the target-language phrase pattern, as to a regular description, it is not necessary to carry out the translation process and to compare the meaning marker. Thus, the load of the processing can be decreased.

Furthermore, if the thesaurus dictionary in the target-language and the translation thereof in the target-language are prepared, comparison conditions can be made by describing the target-language in the elements of the target-language phrase pattern.

According to the present method, conditions satisfying the elements can be described by use of target-language words. Thus, the target-language phrase pattern can be completed by searching of a sentence example corresponding to the target-language phrase pattern and gathering of target-language words corresponding the elements. That is, it become easy to make the target-language phrase pattern.

A description will now be given of other examples.

In an example of the target-language sentence pattern shown in FIGS. 7-11, target-language words which can be elements are described in each element section as shown in FIG. 39.

In the comparison process described above, a target-language equivalent corresponding to a source-language word is obtained by using a translation thesaurus dictionary as shown in FIG. 40, and a thesaurus word of the target-language word is obtained by using the target-language thesaurus dictionary as shown in FIG. 41, instead of searching for whether or not the meaning marker of the target-language equivalent corresponding to the source-language word is equal to the meaning marker of the target-language sentence pattern. That is, the target-language thesaurus word corresponding to the source-language word is obtained. If the obtained target-language is contained in the target-language sentence pattern shown in FIG. 39, it is determined that the element is satisfied by the source-language word information corresponding to the target-language thesaurus word.

An embodiment according to the present invention as claimed in claim 6 will be described below.

In the above system, only a single sentence description is obtained with respect to the matched sentence pattern. Thus, when the same sentence pattern is obtained, a translation having the same structure is always obtained. However, the description of the translation becomes monotonous, and there is a case where translation having a sentence pattern unusual in conversation is obtained. According to fundamental rules of the conversation structure, new information is apt to be positioned at a position near the end of a sentence, and old information is apt to positioned at a position near the head of the sentence. Thus, in a case where sentences including the same key noun are successively arranged, in the first sentence, the key noun is apt to be used as the object positioned at a position near the end of the first sentence, and in the following sentence, the key noun is apt to be used as the subject positioned at a position near the head of the sentence. In this case, if only a single sentence description is obtained with respect to the same sentence pattern, the above difference can not be described. Thus, a plurality of description patterns which can be created from the same request items are prepared, if sentences matched to the same pattern are successively arranged, the translation is carried out by using different description patterns.

Next, functions will be described below.

In the target-language pattern extraction function, the target-language pattern database is retrieved by using the pointer in the exaction IC buffer, the intermediate structure (S) is analyzed in accordance with contents of the target-language pattern database. The IC (idea center) of a sentence to be translated is temporarily selected. Based on a word (an idiom) in the target-language (English in this case) corresponding to the IC temporarily selected, a sentence structure is decided by using phrase patterns identified by the required target-language sentence pattern so that all contents described by the source-language are described by the target-language. In other words, it is analyzed how the English IC functions in a sentence in the target-language (English) and what other words, phrases and clauses are needed, the request information obtained by the analysis is extracted from the intermediate structure (S), and the sentence structure in the target-language is decided.

Each phase pattern may have a default description and one or a plurality of other description patterns. Thus, even if descriptions of the original sentences are matched to the same phase pattern, the continuous arrangement of translated sentences having the same description can be avoided.

A description will be given of contents of the databases used in the system.

An example of the target-language phrase pattern is shown in FIG. 12.

The sentence structure is decided by using phrase patterns identified by the target-language sentence pattern so that contents described by the source-language are described by the target-language.

<Pattern> : This indicates English words grammatically appropriate, default values and a unit of the arrangement of other phrase patterns <Example> : This indicates explanation examples used for the update of the database <Component>: This indicates an item (Xn Xm), (Xn Xm) meaning that the m-th X indicated by the n-th X is selected.

The target-language phrase pattern with different patterns is shown in FIGS. 42 and 43.

<AltPat>: This indicates another arrangement of the same items as those in <Pattern>.

Other items are almost the same as those shown in FIG. 12.

A description will now be given of the operation.

An example of a case where the target-language phrase database has other patterns will be described below. FIGS. 42 and 43 shows examples of a "test" phrase pattern database.

In the translation (FIG. 45) of originals shown in FIG. 44, an example of the selection of other patterns will be described. In this embodiment, when, to translate a sentence, the same phrase pattern as the sentence immediately prior the sentence to be translated is required, another pattern is compulsorily created.

An example of a original text shown in FIG. 44 includes three sentences. The first sentence (a reference number J01 is assigned to it) is supplied to the system, and the source-language analysis process, the IC extraction process, the target-language pattern matching process and the like are carried out. As a result, a translated sentence E01 is obtained. In this translation, "kensyu" and "mokuteki are keys in the source-language, and "study" and "purpose" are corresponding keys in the target-language. The reference number of the processed sentence is stored in a using pattern storage buffer along with a pointer indicating phrase patterns used in the translation. In this case, for example, J01: <n-|purpose|-001> is stored in the using pattern storage buffer.

Next, the second sentence (a reference number J02 is assigned to it) is supplied to the system. The source-language analysis is carried out, and the source-language intermediate structure is obtained. Since the "sem" item matched to the <English-Patterns-Pointer> is only "okonau", <v-|test|-003> is selected. <v-|test|-003> identified by the pointer of the sentence pattern is selected from the phrase pattern database shown in FIGS. 42 and 43.

At this time, the selected pointer is compared to the pointer stored in the using pattern storage buffer. A sentence immediately prior to the sentence to be translated is accessed, the pointer of the accessed sentence and the selected pointer are compared to each other. In this case, the pointer of the accessed sentence is <n-|purpose|-001> and the selected pointer is <v-|test|-003>. That is, these pointers are not equal to each other. As a result, a phrase pattern contained in <Pattern> shown in FIGS. 42 and 43 is used as it is. A set of the reference number J02 of the second sentence and the pointer used thereby (J02: <v-|test|-003> is added to the using pattern storage buffer.

Since the phrase pattern <v-|test|-003> has a lower order patterns, (|conduct| <n-|test|-002> is selected from among the lower order patterns. The matching process for respective items is carried out in the same manner as that described above, so that a translated sentence E02 is obtained. In this example, a pronoun "we" corresponding to which a word does not exist in the original sentence (the second sentence J02) is contained as the subject of a word "conducted" in the translated sentence E02.

After this, the third sentence (a reference number J03 is assigned to it) is supplied to the system. Since the "sem" item in the source-language intermediate structure matched to <English-Patterns-Pointer> is only "okonau", <v-|test|-003> is selected and the same pointer is also selected in the phrase pattern database. The pointer of the second sentence J02 immediately prior the third sentence J03, which pointer has been stored in the using pattern storage buffer, is compared to the selected pointer. In this case, since these pointers are equal to each other (<v-|test|-003>), another pattern contained in <AltPat> is used.

(<n-|test|-003> |be conducted|) is selected from among the lower order patterns, a translated sentence E03 is obtained. Elements contained in the phrase pattern <n-|test|-003> are positioned behind "be conducted" in the translated sentence. FIG. 46 shows examples of translated sentences obtained by the processes performed without other patterns.

A description will now be given of an example of a case where a translated sentence is created under a condition in which the request information is deficient (No. 11).

In a case of the sentence (1), it is determined, by the target-language pattern extraction process, that the <Subj-AGT> item required in the target-language is not filled with. That is, the subject of action is deficient. In this case, an intermediate structure in which the subject of action may not be contained is created, instead of the creation of the intermediate structure for a translated sentence containing a default value previously prepared in the system Thus, structure converting rules (FIG. 47) of the target-language intermediate structure are accessed, a structure of a passive sentence in which no subject of action is acceptable is created as the intermediate structure. Thus, a screen as shown in FIG. 52 is displayed on the display unit, instead of the display of screens shown in FIGS. 48–51. In the comment section, information that the translated sentence is created in passive since there is no subject in the original sentence. FIG. 53 shows a guidance list.

A description will now be given of an example corresponding to claim 8.

In this embodiment, the operation is carried in accordance with the following steps.

Figures 54, 55:
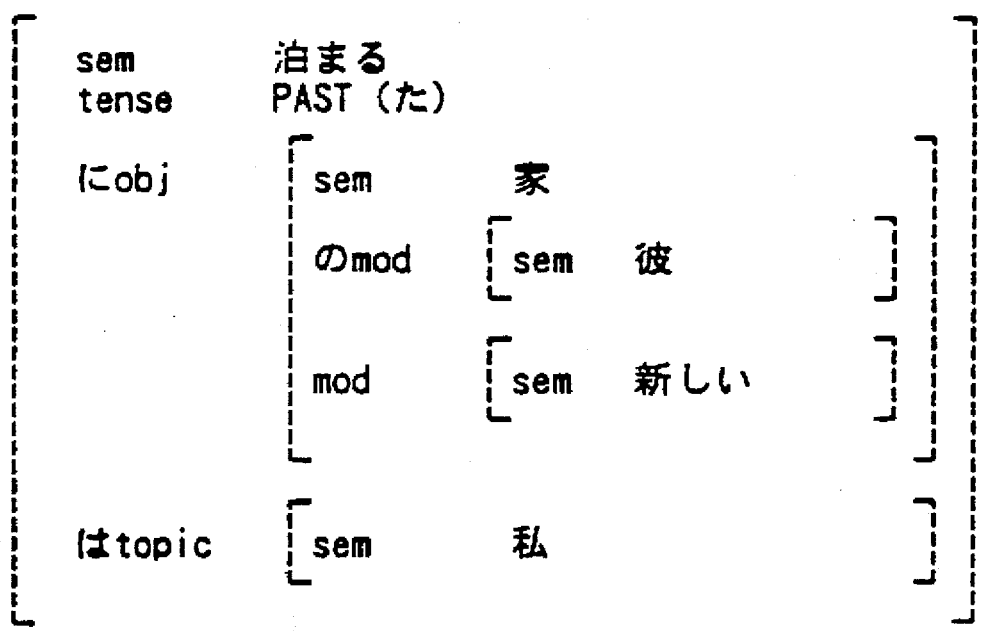
FIG. 54 is a diagram illustrating another example of an original sentence.
FIG. 55 is a diagram illustrating an example of the source-language intermediate structure.

(1) An input original sentence is-analyzed, the source-language intermediate structure is formed. FIG. 54 shows an example of an original sentence and FIG. 55 shows the source-language intermediate structure for the original sentence.

(2) Words which can be the IC (idea center) are extracted from the original sentence with reference to the IC candidate list database, and they are stored in the extraction IC buffer.

(3) The extracted IS have pointers identifying the target-language pattern contained in the IC candidate list database.

(4) The target-language pattern data base is retrieved by using the pointers, the intermediate structure is analyzed in accordance with the retrieval results, and the sentence structure in the target-language is decided.

(5) In the above process, information items in the source-language corresponding to the information items in the target-language is made. These information items are stored in the request information buffer. At this time, the information item in the original sentence, which item is not reflected in the target-language, is stored in the request information buffer. This information item is referred to as excessive information. FIG. 56 shows an example of the request information buffer. In FIG. 56, the excessive information is contained in an item "REL-STAY_WITH". In this case, a word "atarashii" is not reflected in the translated sentence, and is treated as the excessive information.

(6) In a case where the translation body is operated in the interactive mode, the excessive information and comment information regarding the excessive information are supplied to the guidance buffer, and the sentence structure is decided.

(7) The above comment information is read out from the guidance list database. That is, the comment information is selected from information classified into "RELATIONAL". The comment information includes information regarding a question whether or not the excessive information is reflected. FIG. 57 shows an example of the guidance list database.

Figure 58:
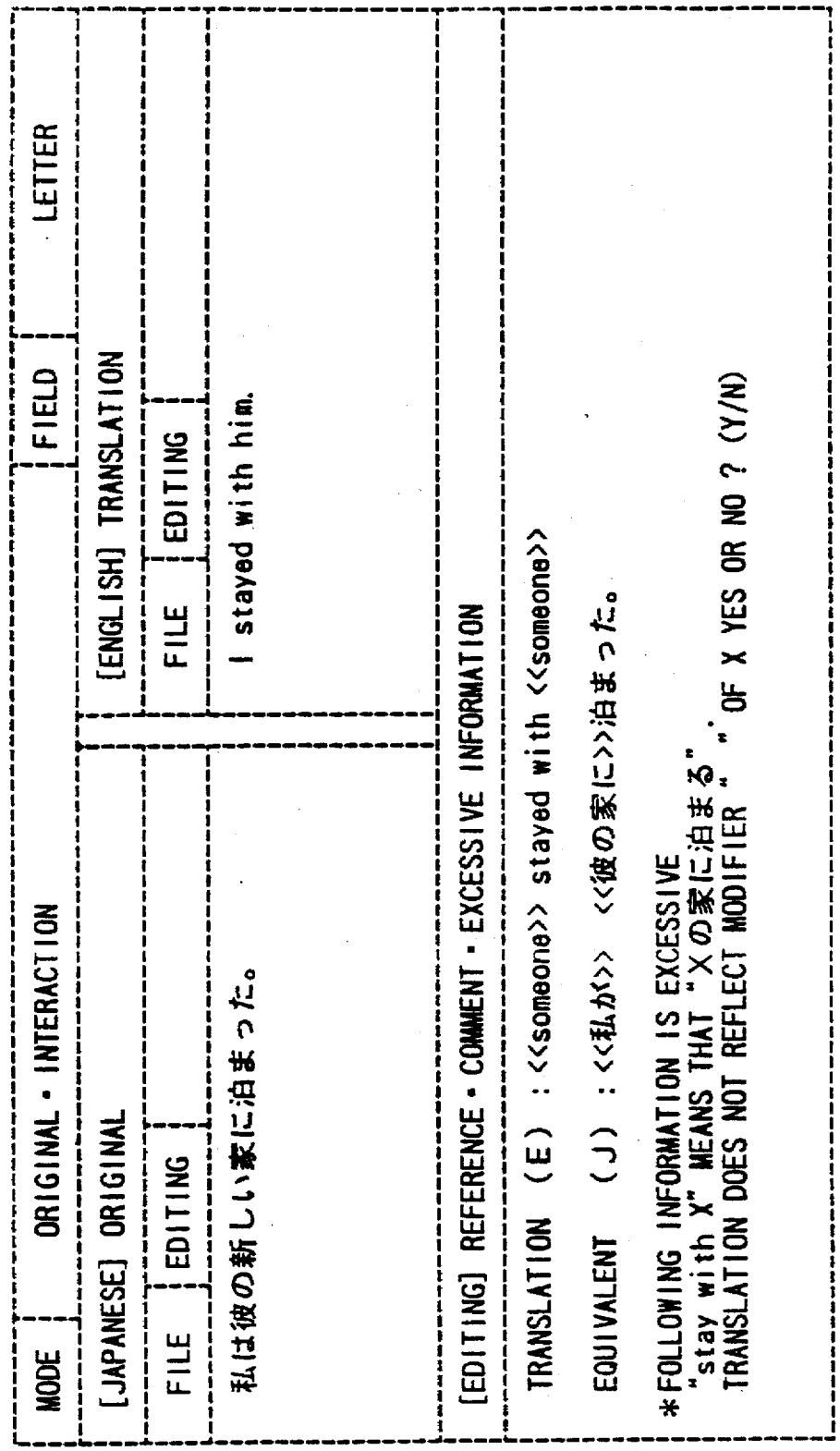
FIG. 58 is a diagram illustrating an example of an interactive screen.

(8) The original sentence, information in the request information buffer and information in the guidance buffer are combined with each other, and the combined information is supplied to the display buffer. As a result, the above information is displayed on the display unit. FIG. 58 shows an example of an interactive screen on the display unit.

(9) The system receives the instruction indicating whether or not the excessive information is reflected, the instruction being supplied from the operator through the input interface (IF).

(10) If the instruction from the operator indicates that the excessive information is not reflected, the process is continued.

Figure 60:
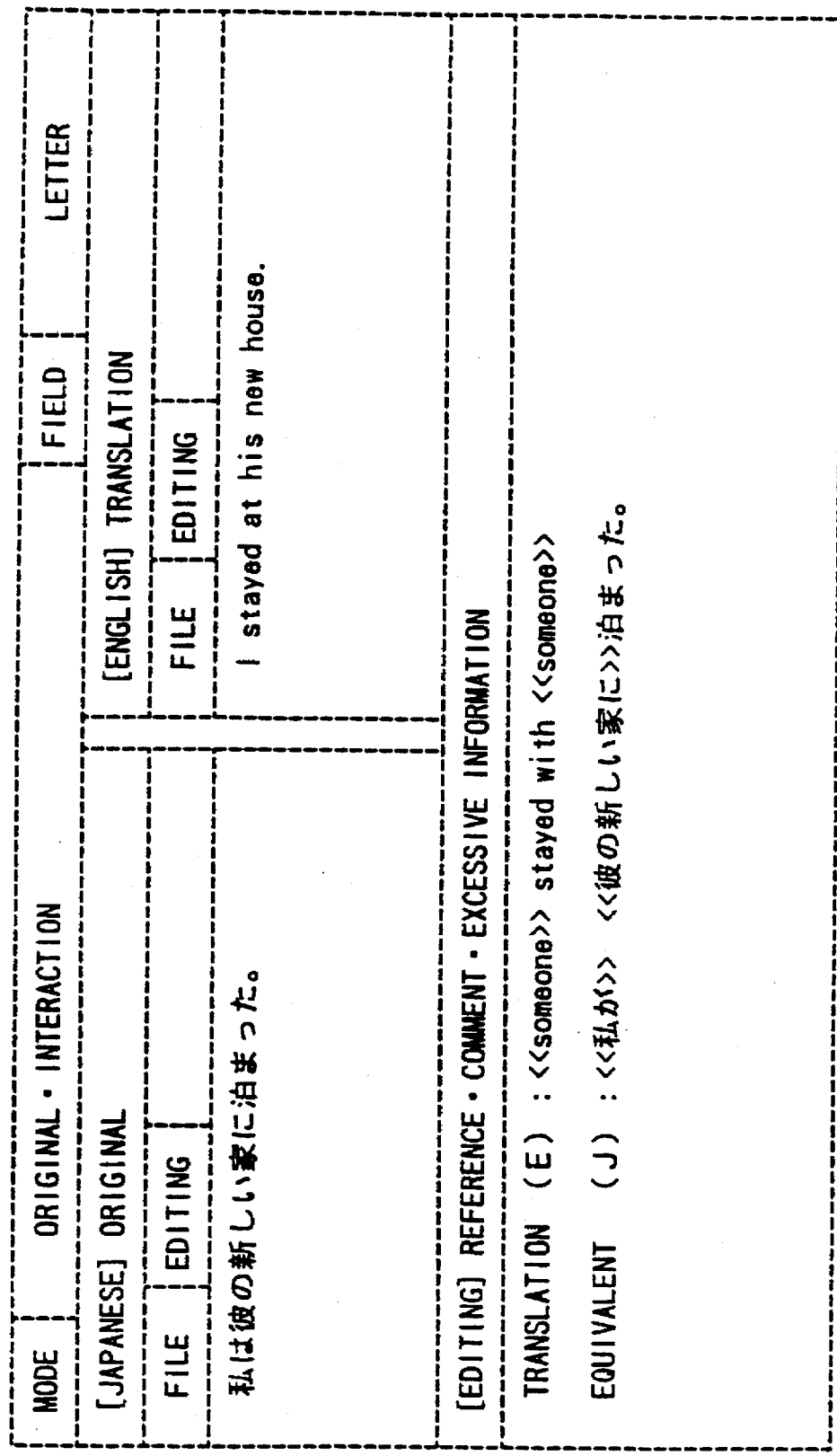
FIG. 60 is a diagram illustrating another example of an interactive screen.

(11) If the instruction from the operator indicates that the excessive information is reflected, the process returns to a step for selecting the target-language pattern, and the structure of the target-language in which the excessive information is reflected is formed. After this, the process is continued. FIG. 59 shows an example of the request information buffer in a case where the excessive information is reflected, and FIG. 60 shows a new interactive screen in the display unit.

A description will now be given of an embodiment corresponding to the claim 16 (No. 21).

In a target-language-driven translation (hereinafter referred to as a TDC), the comparison process regarding the following sentence is carried out. "watashiha, anataga suruka inakawo ketsudansurutameni sochiwo testo suru."

(1) From among <Restriction> of the pattern in <English-Pattern-Pointers>, one that the "sem" ( ) item is matched to the "sem" item in the source-language is selected.

In this embodiment, (@noun sem (okonau)—upper structure—function name (wo obj)) is matched to the source-language intermediate structure, and (wo obj) is further matched thereto. Thus, the target-language pattern <v-ltestl-003> corresponds to the source-language intermediate structure.

(2) The target-language phrase pattern is compared to the source-language intermediate structure starting from the target-language pattern <v-ltestl-003> in the following order.

<v-ltestl-003>-<n-ltestl-002>-<p-lofl-001><p-lforl-001>

The target-language pattern <v-ltestl-003> is formed of

| (<Pattern> (conduct<n-ltestl-002>) |
| (conduct<n-ltestl-003>)). |

Thus, it is determined that the target-language has a sentence pattern in which the verb is "conduct" and the object is either <n-ltestl-002> or <n-ltestl-003>.

(3) The target-language phrase pattern <n-ltest-l002> is formed of (<Pattern> (ltestl(<p-lofl-001>) (<vinf-lto determinel-002>))

| (<Example> "A TEST OF (test-subj) TO DETERMINE (A or B)") |
| (<Component> ((X1 X1) <DirObj-PATIENT>) |
| ((X2 X1) |
| <Xnnn-BINARY_CONTRAST>)), | so that it is determined that <Component> ((X1 X1) <DirObj-PATIENT>) in the first line of the <Component> section, that is <something> of <p-lofl-001>, corresponds to <DirObj-PATIENT> of the IC "testosuru" (see FIGS. 7–11), where (X1, X1) means that a first item of elements in a first item of the <Pattern> line.

According to the IC "testosuru", <DirObj-PATIENT> belongs to <Required>, so that it is the essential element. An element corresponding to <DirObj-PATIENT> is extracted from the source-language intermediate structure. Since <DirObj-PATIENT> is the label in the target-language, it is not directly extracted from the source-language intermediate structure. Thus, a reference table in which a plurality of labels in the source-language corresponding to each label in the target-language are arranged in a priority order is previously prepared, and the label in the target-language is converted into the label in the source-language using the reference table. Based on the label obtained by the conversion, a corresponding element is then extracted from the source-language intermediate structure. In the embodiment of the present invention, "wo obj" corresponds to <DirObj-PATIENT> with first priority, so that it is determined that an element "sochi" of "wo obj" in the source-language intermediate structure corresponds to <DirObj-PATIENT>.

(4) According to the translation dictionary database, the equivalent, in the target-language, of the element sochi obtained in the above (3) is "the device", and its meaning attribute is INS. That is, it is determined that <SOMETHING> of <p-lofl-001> is "the device" and its meaning attribute is INS.

(5) It is determined whether or not a condition is satisfied in which condition <SOMETHING> of <p-lofl-001>is <DirObj-PATIENT>. Referring to the meaning reference table (which is a kind of a meaning network and indicates relationships between meaning attributes), a meaning attribute INS belongs to a meaning attribute PATIENT, so that the above condition is satisfied and it is determined that there is an element corresponding to <DirObj-PATIENT> in the source-language intermediate structure.

(6) ((X2 X1) <Xnnn-BINARY_CONTRAST>)) in the second line of the <Component> section is processed in the same manner as that in the first line, where (X2, X1) means that a first item of the elements of a second item in the <Pattern> line. In this case, an element corresponding to (<vinf-lto determinel-002>) does not exist in the source-language intermediate structure. However, the first item of the elements of (<vinf-lto determinel-002>) corresponds to <Xnnn-BINARY_CONTRAST> of the IC "testosuru". Since this is <Required>, even if the element corresponding to (<vinf-lto determinel-002>) does not exist in the source-language intermediate structure, there is no problem.

(7) According to the above results, it is determined that <n-ltestl-002> is matched to the source-language intermediate structure. It is also determined, in the same manner as described above, that <n-ltestl003> is matched to the source-language intermediate structure.

(8) Thus, it is determined that two patterns

| (<Pattern> (conduct <n-ltestl-002>) |
| (conduct <n-ltestl-003>)) | of <v-ltestl-003> are matched to the source-language intermediate structure.

(9) A target-language phrase pattern corresponding to "anataga suruka inakawo ketudansurutameni" in the source-language intermediate structure is not detected. Thus, the target-language phrase pattern matched to it is searched for. Here, in the target-language sentence pattern shown in FIGS. 7–11, the three elements <Xobj-CONDITION>, <X-BINARY-CONTRAST> and <Xnnn-BOOLEAN> are not filled. Thus, it is checked which one of the three correspond to "anataga suruka inakawo ketudansurutameni".

The "... tameni" in Japanese may be used for two ways, (1) the purpose and (2) the reason. In this embodiment, it is assumed that the "... tameni" is used for (1) the purpose. The equivalent, in English, corresponding to the "... tameni" used for (1) the purpose is an infinitive "to ... ", and it is easily determined, by using the Japanese-English dictionary, that the equivalent, in English, corresponding to "ketudansuru" is "decide". Thus, the target-language phase pattern is searched for <vinf-lto decidel-XXX>.

(10) It is assumed that <vinf-lto decidelXXX> in the target-language phrase pattern is obtained by the above searching result, as shown in FIG. 61.

With respect to <vinf-lto decidel-000>, Xnnn-BOOLEAN corresponds to "anataga suruka inaka"; <Preferred>. In the target-language phrase pattern shown in FIG. 12, Xnnn-BOOLEAN is filled.

With respect to <vinf-|to decide|-001>, there is no element corresponding to Xnnn-BINARY_CONDITION. Thus, the phrase pattern <vinf-|to decide|-001> is not matched to the source-language intermediate structure.

(11) According to the comparison process in (10), "anataga suruka inakawo ketsudansurutameni" is translated into the target-language by <vinf-|to decide|-000>. Since the relationship between the source-language intermediate structure and the elements in the target-language phrase pattern is obtained, in accordance with the target-language creating rule, "anataga suruka inaka" is translated into "you will do it or not".

(12) Since the element having no relationship with the phrase pattern structure has been out in the source-language intermediate structure, the elements that the relationships with the phrase pattern are obtained are translated into the target-language in accordance with the target-language creation rule as follows.

"I conduct a test of it (the essential part) to decide whether you will do it or not. (the optional part)".

In a case, as described above, where there is no element in the source-language intermediate structure corresponding to the element in the target-language phrase pattern driven by the IC, if the element belongs to <Preferred> (option), the target-language phrase pattern is selected without regard to the IC for only the element, and the translation in the target-language is obtained. Thus, even if the target-language phrase pattern is defective, the translation can proceed.

A description will now be given of another embodiment (NO. 22).

However, since the optional part is selected without regard to the essential part, the optional part and the essential part are not always coordinated. Thus, the essential part and the optional part are displayed so as to be distinguished from each other, as shown in FIG. 61. In an example of a screen based on the graphical-user-interface, the operator inputs the instruction for accepting the optional part or for rejecting the optional part using a pointing device such as a mouse.

According this, since the essential part that the adequacy thereof is guaranteed in the target-language and the optional part that the propriety thereof is not guaranteed in the target-language are distinguished from each other, the operator can be determined whether or not the optional part cooperates the essential part in the target-language. Thus, it can be avoid to make a mistaken target-language sentence.

A description will now be given of another embodiment (No. 23).

There is a case where the above confirmation operation for the optional part is troublesome. Thus, in the system according to this embodiment, the operator can set whether or not the above confirmation operation is carried out. Thus, the system can be flexibly operated in accordance with purposes.

A description will now be given of another embodiment (No. 24).

In the above confirmation operation, when the operator confirms that the essential part and the optional part are appropriate, target-language phrase patterns selected without regard to the IC are newly recorded as the target-languages with regard to the IC. In the above example, the following two patterns were matched to the source-language intermediate structure.

(<Pattern> (conduct<n-|testl-002>)
(conduct<n-|testl-003>))

In these patterns, only <DirObj-PATIENT> which is the essential element (<Required>) satisfies the element in the source-language intermediate structure. This element is contained in both the above pattern in common. This element is combined with the new target-language phrase pattern <vinf-|to decide|-000> which is added as the optional element <(Preferred>), and the new target-language phrase pattern <n-|testl-004> is then made. FIG. 62 shows an example of the phrase pattern <vinf-|to decide|-XXX>.

FIG. 63 shows examples of phrase patterns recorded after the confirmation operation.

The target-language phrase pattern corresponding to the essential element selected based on the IC and the target-language phrase pattern corresponding to the optional element selected without regard to the IC are combined with each other, and the new target-language phrase pattern obtained by the combination is recorded. This operation is repeated, the target-language pattern precisely describing contents surrounding the IC in accordance to the sentence to be translated is obtained. Thus, the target-language sentence which is desired by the operator can be precisely and rapidly obtained.

After this, when the same source-language sentence is translated, the target-language sentence is made using the target-language phrase patterns that the adequacy thereof was confirmed. Thus, it is not necessary to repeat the confirmation operation.

In addition, the phrase patterns may be classified in accordance with a predetermined rule and be stored. According this, the system can be further flexibly operated in accordance with purposes. If an operator classification rule is used as the predetermined rule, the target-language phrase patterns corresponding to sentence which are wished to be translated by the operator are used, so that the target-language sentence required by the operator can be precisely and rapidly obtained. If an field classification rule is used as the predetermined rule, after a field to which the sentence to be translated belongs is selected, the translation process is performed, so that the target-language phrase patterns appropriate to the selected field are used in the translation process. As a result, the sentence can be precisely translated.

To classify the target-language phrase patterns into classifying items, the target-language pattern database is provided with classification field sections. In a case where the new pattern is recorded, a classifying item of the new pattern may be inserted into a corresponding one of the classification field sections ("USER 1" and "USER 2" in FIG. 64). In the translation process, the target-language phrase pattern having a classifying item in the classification field section, which classifying item is equal to that required by the operator may be extracted.

The present invention is not limited to the above embodiments. The present invention essentially provided with the following functions (1)-(7).

(1) In a case where there is no element, in the source-language intermediate structure, corresponding to an element in the target-language phrase pattern driven by the IC, if the element belongs <Preferred> (option>, regarding the element the target-language phrase pattern is selected without regard to the IC, and the translated sentence in the target-language is made.

(2) The essential part and the optional part are indicated on a screen so as to be distinguished from each other, it is required of the operator to confirm the essential part and the optional part.

(3) A mode whether or not the confirmation operation is carried out is set.

(4) The target-language phrase pattern corresponding to the essential element selected based on the IC and the target-language phrase pattern corresponding to the optional element selected without regard to the IC are combined with each other, so that a new target-language phrase pattern is made.

(5) The new target-language phrase made in the above step (4) is stored.

(6) The target-language phrases are classified in accordance with a predetermined rule.

(7) The phrase pattern corresponding to the classifying item is searched for.

Figures 64, 65:
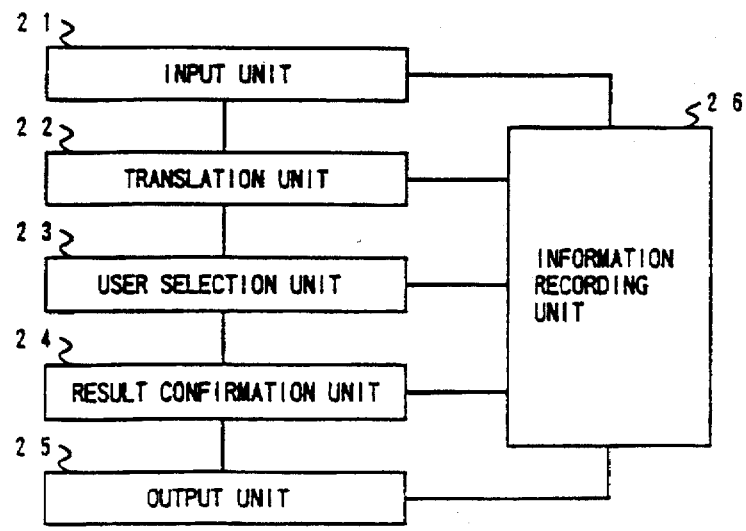
FIG. 64 is a diagram illustrating examples of the phrase pattern having a classifying field.
FIG. 65 is a block diagram illustrating a language conversion system according to another embodiment of the present invention.

FIG. 65 shows a language conversion system according to another embodiment of the present invention.

Referring to FIG. 65, the system has an input unit 21, a translation unit 22, a user selection unit 23, a result confirmation unit 24, an output unit and an information recording unit 26. The input unit 21 has a function for reading an original sentence, and may be provided with a keyboard, an OCR (Optical Character Reader) and a speech input unit. The translation unit 22 carries out a translation process for converting the original sentence into a sentence in the target-language. The result confirmation unit 24 is used to confirm the result obtained by the translation unit 22. The user selection unit 23 selects required target-language words based on the translation result obtained by the translation unit 22. The information recording unit 26 has a recording device such as an FD (Flexible Disk) device, a memory, a RAM and a ROM disk device. Buffer needed in processes, dictionaries needed in the translation process and databases are in the information recording unit 26. The output unit 25 displays the translation result obtained by the translation unit 22 and the output information from the result confirmation unit 24. The output unit 25 may be provided with a display unit, a printer and a voice synthesizer unit.

FIG. 66 shows functions of the translation unit 22 shown in FIG. 65 in comparison with a conventional translation unit.

The translation unit 22 has an intermediate structure acquisition portion, an IC extraction portion, a sentence pattern identification portion, a sentence pattern request information acquisition portion, an intermediate structure decision portion and a translated sentence creation portion.

Figure 67:
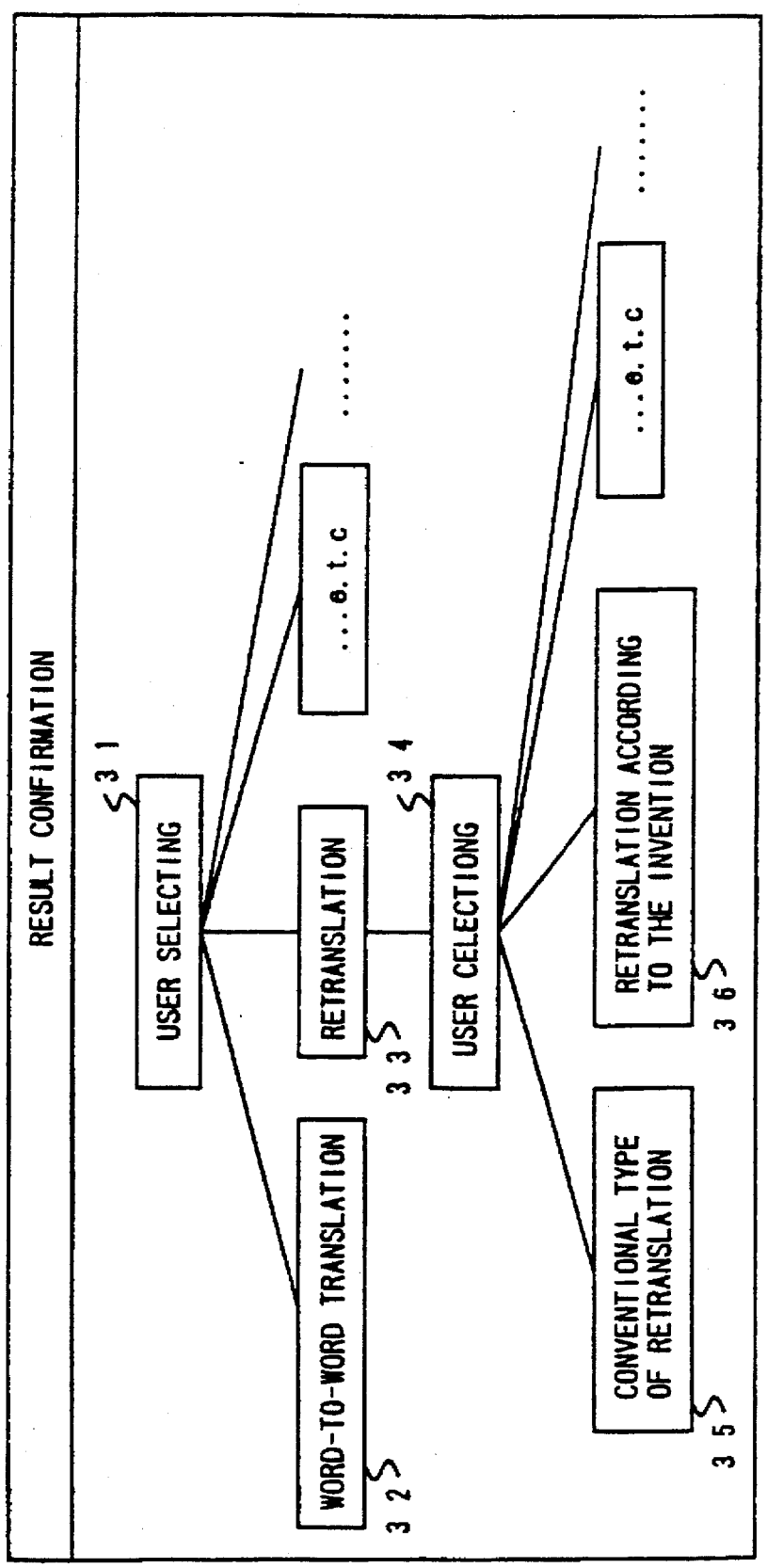
FIG. 67 is a diagram illustrating a structure of a result confirmation unit shown in FIG. 65.

FIG. 67 shows a constitution of the result confirmation unit 24 shown in FIG. 65. Referring to FIG. 6, a user selecting portion 31 (a second selecting means) is coupled with a word-to-word translation portion 32 and a retranslation portion 33. The retranslation portion 33 is coupled with a user selecting portion 34 (a first selecting means). The user selecting portion 34 is coupled to a first retranslation portion 35 (a conventional type) and a second retranslation portion 36 (according to the present invention).

The user selecting portion 31 selects either a word-for-word translation or a retranslation. The user selecting portion 34 selects either a conventional type of retranslation or a retranslation according to the present invention. Other functions may be coupled to the user selecting portion 31 (the second selecting means) and to the user selecting portion 34 (the first selecting means).

Figure 68:
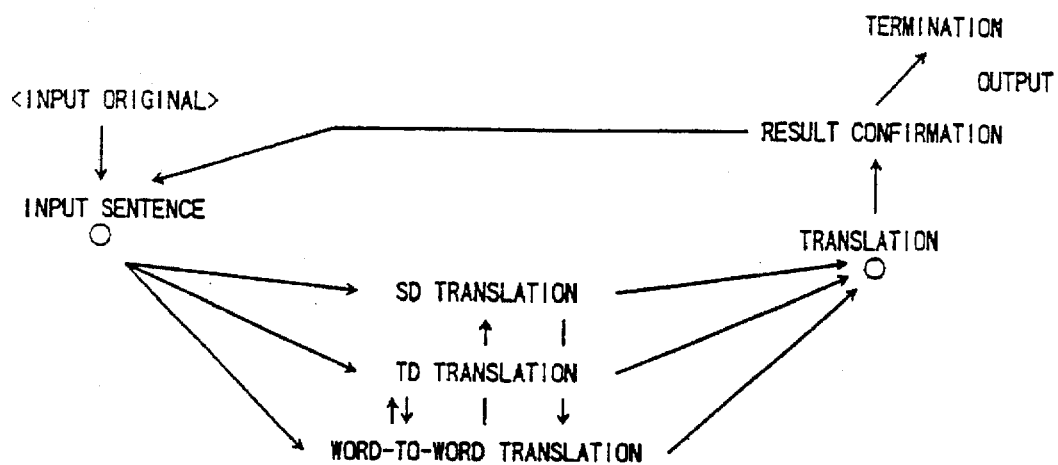
FIG. 68 is a diagram illustrating an example of information flows in the language conversion system.

FIG. 68 shows an example regarding the transfer of information.

Referring to FIG. 68, in a "TD translation" section, a sentence is translated by the translation unit according to the present invention, and in a "SD translation" section, a sentence is translated in accordance with a conventional method (TD: Target-language Driven, and SD: Source-language Driven).

An input sentence is supplied to the translation unit. In a word-for-word translation, information is obtained by using a dictionary. When a translated sentence is obtained at a first time, the result confirmation process is performed. An input sentence for the reconfirmation is identified in accordance with the result confirmation, required contents are confirmed by the translation and the word-for-word translation. After the sentence for the reconfirmation is translated, the result confirmation process is performed again. When a translated sentence corresponding to the input original sentence is identified in the result confirmation process, the last solution is obtained.

Figure 69:
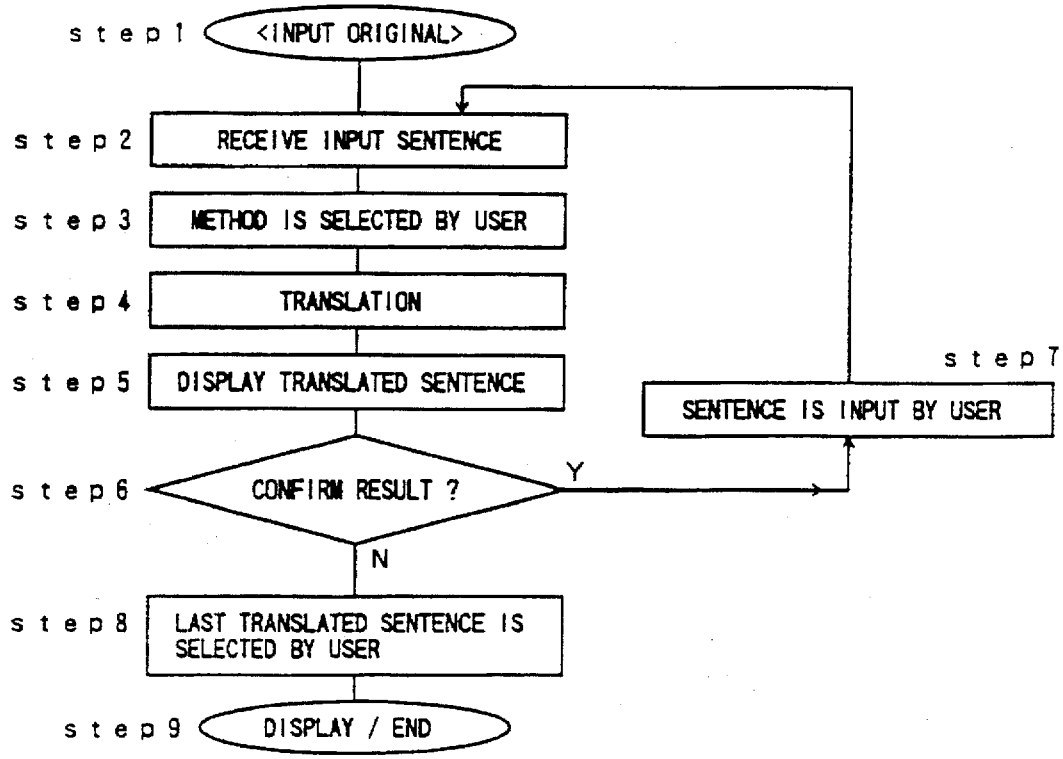
FIG. 69 is a flow chart illustrating an operation of the language conversion system.

FIG. 69 shows a process of the language conversion system according to the present invention. In the process, if there is no information item identified by the operator, a default process is performed.

Referring to FIG. 69, when an original sentence is supplied to the system (step 1), the input unit receives the original sentence as an input sentence (step 2). The system inquires of the operator which translation process is to be selected (step 3). The translation process which has been identified by the operator is carried out (the default is the TD-translation process) (step 4). When the translation process is completed, the translated sentence is displayed on the display unit (step 5). The system inquires of the operator whether or not the operator confirms the translation result (step 6). If the result confirmation process is selected, the system receives an input sentence in the confirmation mode (step 7). On the other hand, if the result confirmation process is not selected, the last translated sentence selected by the operator is obtained as the translation result in the system (step 8). The last translated sentence is then displayed on the display unit.

Figures 70, 71:
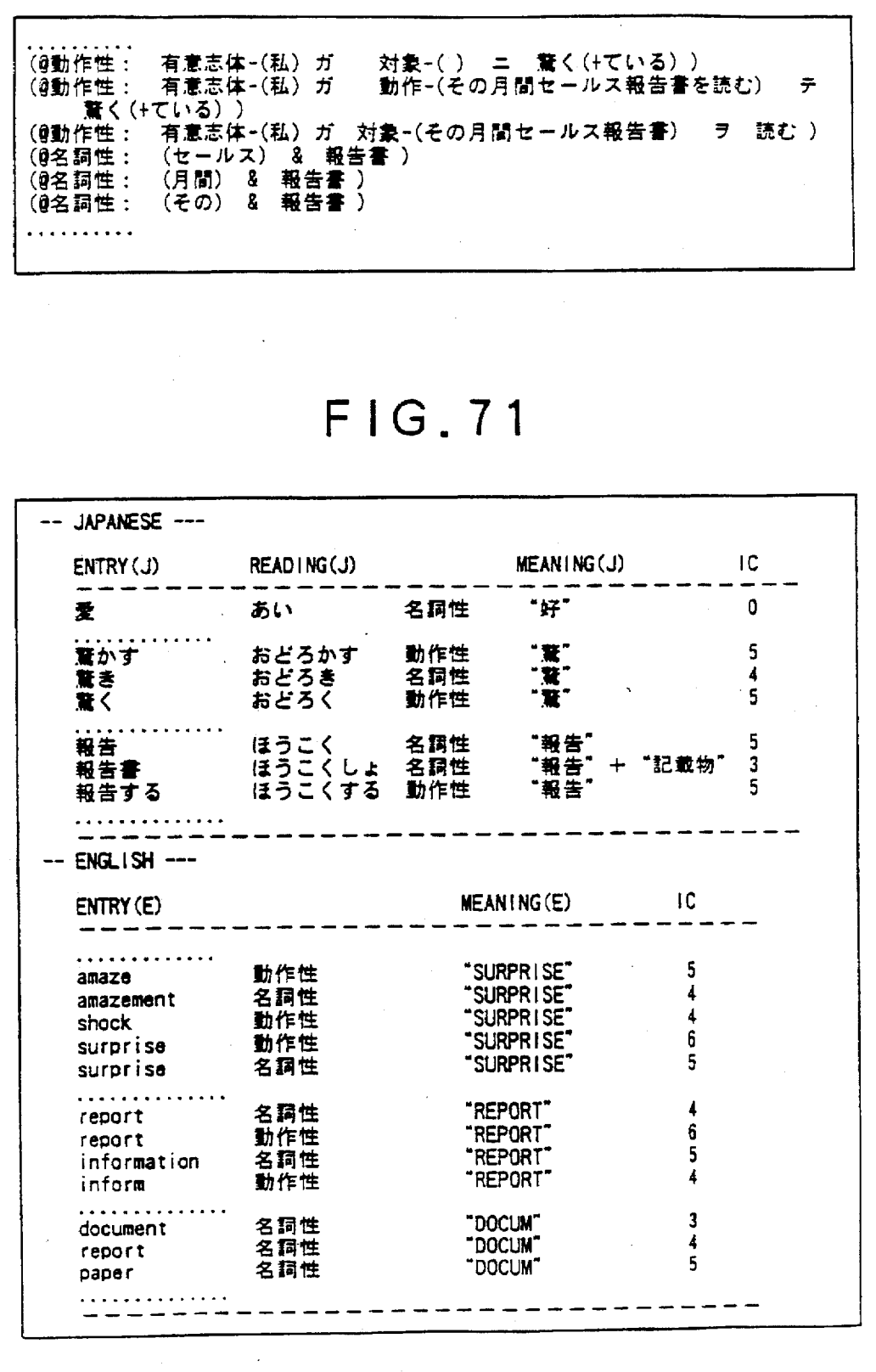

FIGS. 70 and 71 show translation method according to the present invention.

In this example, the source-language is Japanese (an original sentence is a Japanese sentence), and the target-language is English (a translated sentence is an English sentence).

EXAMPLE (an original sentence):

"watashiwa sonogekkanserusuhoukokushowoyondeodoroiteiru."

1) INTERMEDIATE STRUCTURE EXTRACTION

Although a format of the intermediate structure is not limited, the information must be supplied from the intermediate structure to the "IC extraction", the "sentence pattern identification", and "request information acquisition".

(2) IC EXTRACTION

The IC (idea center) is decided with reference to the IC candidate list database as shown in FIG. 71. In the IC candidate list database, IC degree numbers are assigned to words. Each degree number has been previously calculated based on a frequency at which a corresponding word is used, a field in which a corresponding word is used, and an importance of a corresponding word. Since the IC candidate list database shown in FIG. 71 is also used as a dictionary, the IC degree number "0" is assigned to each word which is not a candidate of the IC.

(3) SENTENCE PATTERN IDENTIFICATION

After the IC is extracted from the original sentence, an English sentence pattern corresponding to the IC (Japanese)

must be detected. In FIGS. 71 and 72, upper order meaning of each word is assigned to a, corresponding word, and the upper meaning corresponds a sentence pattern. Each word may correspond to a sentence pattern. In FIG. 72, a pointer indicating a sentence pattern is assigned to the upper order meaning, and the sentence pattern in the database is accessed using the pointer as shown in FIG. 73.

(4) SENTENCE PATTERN REQUEST INFORMATION ACQUISITION

The structure of a sentence depends on the target-language, and information in the source-language is made so as to correspond to the information in the target-language (see FIG. 74). The information is stored in the request information buffer. In a case of the system which is not interactive, the default value is substituted for the information which is not extracted from the intermediate structure, and the process is then completed.

(5) INTERMEDIATE STRUCTURE DECISION

The intermediate structure is decided so that the contents described in the source-language can be described by phrase patterns identified by the target-language sentence pattern required by a word (or an idiom), in the target-language, corresponding to the IC.

(6) CREATION OF TRANSLATED SENTENCE

The contents of the target-language intermediate structure is converted into a translated sentence in the surface level.

FIGS. 75–79 show examples of screens on the display unit. In FIGS. 75–79, underlined parts are input by the operator. The translation of the default is performed by the translation process according to the present invention. The translation according to the present invention is referred to as the "TD-translation". The conventional translation is referred to as the "SD-translation".

FIG. 75 shows a screen in an original input mode.

In step 1, the operator inputs a sentence as shown in the screen. This sentence can be identified by "a". This function for identifying the sentence by "a" is not essential in this system.

In step 2, a translation result (a translated sentence) is displayed on the screen. The translation result can be identified by "b". "b=a" means that "b" is the translation result of "a".

In step 3, the system inquires of the operator whether or not the operator confirms the translation result (Y or N). The operator inputs by. (Yes).

FIG. 76 shows a screen in a result confirmation mode (retranslation by the SD-translation).

In step 4, the result confirmation mode is activated, and one of types of confirmation methods is selected by the operator. In this example, the retranslation identified by "1" is selected. As a result, the "retranslation mode" is activated.

In step 5, the "SD-translation" is selected.

In step 6, a language in which the-sentence is translated is selected. If the sentence is to be translated in a language which is not prepared in the system, a dictionary must be identified in the next step and required information must be input. In this example, Japanese "1" is selected.

In step 7, language data such as a dictionary is identified. If a language which is not prepared in the system is selected in step 6, a file having the language data to be used is required. In this example, the dictionary which has been prepared in the system is selected (Y).

In step 8, the input sentence for the retranslation is identified. In this example, "b" (This monthly . . . ) is identified. "=b" means that "b" is input.

In step 9, a result obtained by the SD-translation of "b" is displayed. This result can be identified by "c".

In step 10, the system inquires of the operator whether or not the translation process is continued.

In step 11, the same function as in step 8 is executed, and "watashiwa sono gekkan . . . " of "a" is identified.

In step 12, the result of the SD-translation of "watshiwa sono gekkan . . . " is displayed on the screen.

FIG. 77 shows a screen in the result confirmation mode (the retranslation by the TD-translation).

In step 13, "N" is identified so that the SD-translation is completed.

In step 14, one of the types of translation process is selected again. At this time, the TD-translation is selected.

In step 15, the same function as in step 8 is executed, and "soho gekkanno . . . " of "c" is identified.

In step 16, the result of the TD-translation of "soho gekkanno . . . " is displayed on the screen.

FIG. 78 shows a screen in the result confirmation mode (word-for-word translation).

In step 17, "N" is identified so that the TD-translation is completed.

In step 18, "N" is identified so that the retranslation is completed.

In step 19, "Y" is identified so that the result confirmation mode is continued.

In step 20, one of the types of result confirmation methods is selected. "2" is identified so that the confirmation method using the word-for-word translation is selected.

In steps 22–24, the word-for-word translation mode is activated.

FIG. 79 shows a screen of the termination of the result confirmation mode and of the solution selection.

In step 25, the system inquires of the operator whether or not the retranslation is continued.

In step 26, the system inquires of the operator whether or not the result conformation is continued. After this, the confirmation mode is activated.

In step 27, one of the translation results is selected.

In an embodiment corresponding to claim 18 (No. 32), an IC extraction unit for extracting an IC in the source-language, an identification unit for identifying a representing pattern including the IC in the target-language, a information extraction unit for extracting information, from the source-language sentence, required by the representing patter identified by the identification unit, a display unit for displaying information required by the representing pattern, and an editing unit for changing the information displayed by the display unit are provided.

Figure 80:
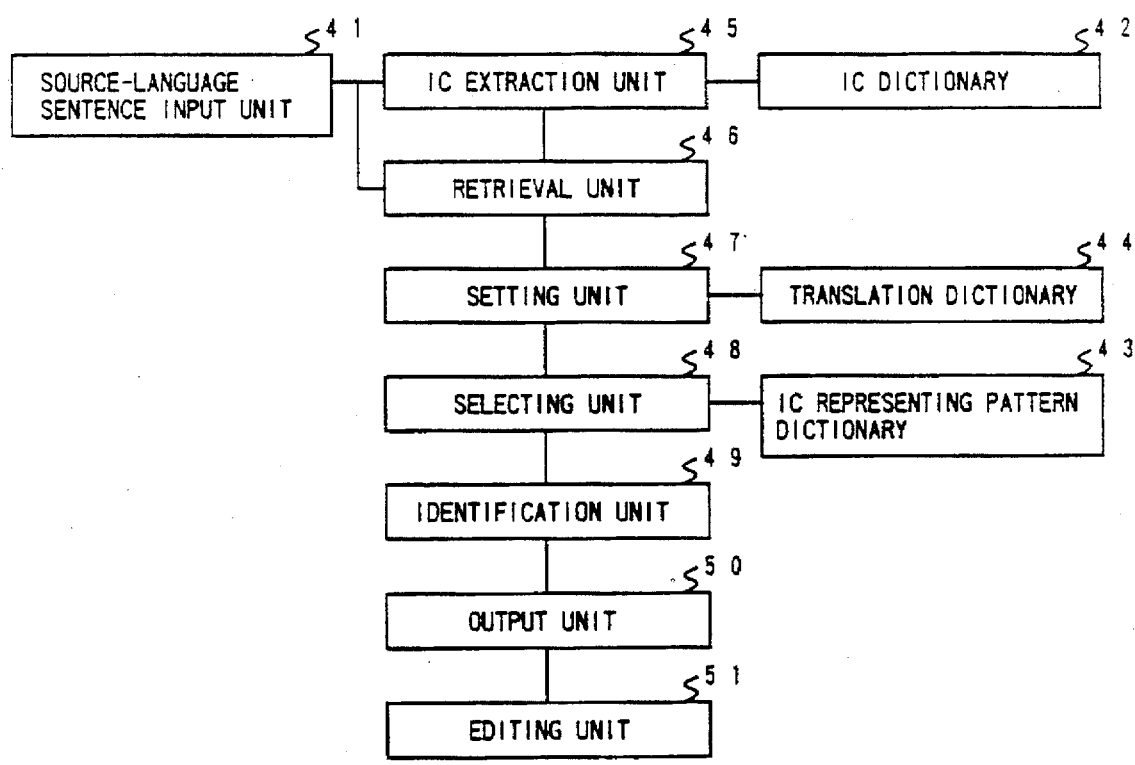
FIG. 80 is a block diagram illustrating a language conversion system according to another embodiment of the present invention.

FIG. 80 shows an example having the above units excepting the display unit. The system according to this embodiment is provided with a source-language sentence input unit 41, an IC dictionary 42, an IC representing pattern dictionary 43, a translation dictionary 44, an IC extraction unit 45, a retrieving unit 46, a setting unit 47, a selecting unit 48, an identification unit 49, an output unit 50, an editing unit 51. The source-language sentence input unit 41 is used to input either a source-language sentence or an analyzed structure obtained by the analysis of the source-language sentence. The IC dictionary 42 has a word in the source-language corresponding to each IC, information required by the IC and a default value, a set of candidates of representing patterns containing each IC, and constraint conditions. The IC representing pattern dictionary 43 has information of terms required for each representing pattern for the IC. The translation dictionary 44 has words in the source-language and corresponding words in the target-language. The IC extraction unit 45 extracts an IC from an input sentence in the source-language using the IC dictionary. The retrieving unit 46 searches the source-language sentence for information required by the IC. The Setting unit 47 obtains a word in the target-language corresponding to the word in the source-language searched for the retrieving unit 46. The setting unit 47 further sets the words in the both language at positions corresponding to each other on a memory for an IC information table. The selecting unit 48 values the conformity of the words set by the setting unit 47 with the constraint condition assigned to candidates of the representing pattern for the IC. The selecting unit 48 then selects a representing pattern from among the candidates of the representing pattern in accordance with the conformity. The identification unit 49 identifies either words required for the representing pattern selected by the selecting unit 48 from the IC information table or a default value of a required word. The output unit 50 outputs a target-language sentence in which words identified by the identification unit 49 are arranged in accordance with the representing pattern. The editing unit 51 edits the target-language sentence output from the output unit 50.

INPUT OF SOURCE-LANGUAGE SENTENCE

A description will now be given of an example of a Japanese sentence as shown in FIG. 81.;

"hendensho wo testoshita".

Regarding the above example sentence, the following string of morphemes and analyzed structure.

```
ORIGINAL:        hendensho wo tesutoshita
MORPHEMES:       <hendensho><wo><testosuru><ta>
ANALYZED STRUCTURE:
[testosuru
    (tense <PAST>)
    (@ wo [hendensho])]
```

EXTRACTION OF IC

English IS are recorded in the IC dictionary, and the data of each IC has the structure as shown in FIG. 82. Referring to FIG. 82, the data item labeled by "TO_SEARCH" is an condition indicating whether or not a term corresponding to the English IC is in a Japanese sentence. There are two this kinds of data times, "TO_SEARCH 1" and "TO_SEARCH 2". They have the following strings of morphemes and analyzed structures.

```
TO_SEARCH 1  (<tesutosuru> <shikensuru>
              <testo<wo>.*<okonau><shiken>.<wo><o
konau>)
TO_SEARCH 2  (testosuru shikensuru)
```

The string of morphemes and an original sentence may be an object of the process in the source-language, but in this embodiment, it is supposed that the analyzed structure is processed. According to the "TO_SEARCH 2" is a condition indicating whether or not the item <tesutosuru> or <shikensuru> is in the analyzed structure. The analyzed structure of the first example sentence has an item "(sem tesutosuru)", so that the first analyzed structure satisfies the condition. The same check about each IC in the IC dictionary is performed, the IC satisfying the condition is selected. A plurality of IS may be selected from among the IS in the IC dictionary. For the sake of simplify, it is assumed that an IC "test" shown in FIG. 82 be selected.

Other methods for detecting the IC can be considerable. For example, a data base having a table indicating each set of the IC in the target-language and a corresponding term in the source-language is previously made, a value of each item in the analyzed structure is searched for with reference to the above table in the database.

RETRIEVAL AND SETTING OF ESSENTIAL INFORMATION OF IC

All the data items belonging to the selected IC, each data item having a table format, are copied and stored in a memory. The following data items belonging to "Required" and "Preferred" are respectively essential information for the IC and preferable information of the IC.

```
Required
    AGENT : shugo
        DEFAULT_VALUE ((<SOMEONE> <koisha>)
                       (<PERSON> <tesutosuruhito>)
                       (<AGENCY> <testo wo okonau hito>
                       (<TEST CONDUCTOR> <testo wo okonau hito>))
        TO_FILL        ((@ ga [*]))
    OBJECT : chokusetsu mokutekigo
        DEFAULT_VALUE ((<SOMETHING> <taisho>)
                       (<TEST SUBJECT> <tesutotaisho>))
        TO_FILL  ((@ wo [*]) (@ no [*])
                  ([suru (@ to [taisho] ) (@ wo [*] )] )
                  ([suru (@ ni [taisho] ) (@ wo [*] )] ))
Preferred
    CONDITION : jotai
        DEFAULT_VALUE    ((<CONDITION/STATE><jotati>)
                          (<CIRCUMSTANCES> <jokyo>))
        TO_FILL          ((@ tameni [*] ) (@ notame [*] ))
    OR_COND : OR_jotai
        DEFAULT_VALUE ((<A or B> <A ka B>)
```

-continued

| | (<CONDITION/STATE A or B> |
|---|---|
| <jotai A ka B>) | |
| | (CIRCUMSTANCES A or B> |
| <jokyo A ka B>)) | |
| TO_FILL | ((@ tameni (@OR [*1] [*2] )) |
| | (notameno (@OR [*1] [*2] ))) |

That is, "AGENT: shugo" and "OBJECT: chokusetsu mokutekigo" are the essential items and "CONDITION: jotai" and "OR_COND: OR_jotai" is the preferable item. (In each ". . . : . . . ", a part prior to ":" indicates a English term, a part behind "." indicates a Japanese term.) Each of the essential and preferable items has lower order items "DEFAULT" and "TO_FILL". "DEFAULT" is so called a default value formed of a set of an English term and a Japanese term. In "TO_FILL", a retrieval method for filling a "VALUE" of the item is described (retrieving the analyzed structure in the source-language). For example, the "AGENT" item indicates a value of an item having a label name "@ ga", and the "OBJECT" item indicates a value of an item having a label name "@ wo" or "@ ga" or indicates that a label in a part structure in which "[suru (@ to [taisho]) (@ wo [*])]" is "[suru (@ ni [taisho]) (@ wo [*])]" is a value of "@ wo". Thus, from the analyzed structure of the first example sentence, only the "OBJECT" item out of four items obtains "hendensho, and a corresponding English term is obtained by using the translation dictionary. The retrieval processes about other items miscarries. As a result, the "DEFAULT" item activated in a case where the "VALUE" item and a value of the "VALUE" items are "nil" is formed as follows.

```
Required
    AGENT : shugo
        VALUE    nil
        DEFAULT_VALUE ((<SOMEONE> <koisha >)
                       (<PERSON> <tesutosuruhito>)
                       (<AGENCY> <testo wo okonau hito>
                       (<TEST CONDUCTOR> <testo wo okonau hito>))
    OBJECT : chokusetsu mokutekigo
        VALUE     (|transformer station| hendensho)
        DEFAULT_VALUE ((<SOMETHING> <taisho>)
                       (<TEST SUBJECT> <tesutotaisho>))
Preferred
    CONDITION : jotai
        VALUE    nil
        DEFAULT_VALUE ((<CONDITION/STATE> <jotati>)
                       (<CIRCUMSTANCES> <jokyo>))
    OR_COND : OR_jotai
        VALUE    nil
        DEFAULT_VALUE ((<A or B> <A ka B>)
                       (<CONDITION/STATE A or B > <jotai A ka B>)
                       (CIRCUMSTANCES A or B> <jokyo A ka B>))
```

Words corresponding to a phrase in the target-language may be obtained from the identified term in the source-language (Japanese) by using a translation dictionary (Japanese-English). In this case, the identified term is converted into the phrase in the target-language by using a simplified Japanese-English translation function. This function can be accomplished by the conventional technique. The symbol "|" in the above "|transformer station|" indicates the original form.

SELECTION OF IC REPRESENTING PATTERN

Next, a representing pattern is selected based on a set of the each representing pattern name, such as "<v-|testl-000> belonging to the "PATTERNS" item of the data of the IC shown as follows, and the constraint condition.

| PATTERNS | |
|---|---|
| <v-ltestl-000> | (#OBJECT#) |
| <v-ltestl-001> | (#OBJECT# #CONDITION#) |
| <v-ltestl-002> | (#OBJECT# #CONDITION#) |
| <v-ltestl-003> | (#OBJECT# #OR_COND#) |
| <n-ltestl-001> | ((others <noun>) #OBJECT# #CONDITION#) |
| <n-ltestl-002> | ((others <noun>) #OBJECT# #OR_COND#) |

That is, the list provided to each set of representing patterns indicates a value of the "VALUE" item belonging to the <Required> or <Preferred> storing the IC data or the constraint condition in the analyzed structure. For example, "<v-ltestl-000>" requires that the "OBJECTS" items is filled, and "<v-ltestl-001>" and "<v-ltestl-002> respectively require that "OBJECT" item and "OR_COND" item are filled. In addition, "<n-ltestl-000> further requires that a structure "(others<noun>)" exists in the analyzed structure. According to these constraint conditions, "<v-ltestl-000> satisfies one out of one constrain condition, each of "<v-ltestl-001>", "<v-ltestl-002>" and "<v-ltestl003> satisfies one out of two constraint conditions, and each of "<n-ltestl-001>" and "<n-ltestl-002>" satisfies only one out of three constraint conditions. The constraint conditions are used to select appropriate representing pattern. In this embodiment, <v-ltestl-000> is selected.

IDENTIFICATION OF WORDS OF REPRESENTING PATTERN

A target-language sentence is made based on the selected representing pattern. That is, the following information corresponding to the selected <v-ltestl-000> is described in the IC representing pattern diectionary shown in FIG. 83.

```
<v-ltestl-000>
    PATTERN
        ((X0 ltestl X1))
    COMPONENT
        ((X0 #AGENT#)
         (X1 #OBJECT#)
    EXAMPLE
        ((<SOMEONE> tests <SOMETHING>))
```

In the "PATTERN" item, one or a plurality of candidates of the arrangement of words of the representing pattern are identified. In this case, an arrangement of "X1", "ltestl" and "X2" is identified. The word in the target-language is put between symbols "|", "X0" indicates a word positioned prior to the IC and each of "X1", "X2", . . . indicates a word positioned behind the IC. In the "COMPONENT", an item with which each variable number is to be filled is identified in a format of an item name of the IC information. That is, "X0" is an "AGENT" item, and "X1" is an "OBJECT" item. In the later, a value of the "VALUE" item is "(|transformer station| hendensho)", the former, a value of the "VALUE"

item is nil, so that a value of "DEFAULT VALUE" item is identified. In this case, the value of the "DEFAULT VALUE" is a set of a plurlarity of English and Japanese words, but, normally, a first word "<SOMEONE> <koisha> is selected from among them. A word following the first word may be referred to if necessary.

In this embodiment, a set of words in the source-language and the target-language is searched for, the word in the target-language is identified among the words. That is, "X0" takes "<SOMEONE>" and "X1" takes "|transformer station|".

CREATION OF THE TARGET-LANGUAGE SENTENCE

The identified and converted words are arranged in the representing pattern as follows.

```
<SOMEONE> |test| |transformer station|
```

To output an actual English sentence, the morpheme of the word put between the symbols "|" having the original form must be created and an articles must be added to words. These creation and addition may be performed in accordance with a conventional machine translation technique. As a result, the following sentence is created.

<SOMEONE> tested a transformer station. In the English sentence obtained above, the subject omitted in the Japanese sentence is compensated for by the default value. Thus, the English sentence naturally represented can be obtained. The language converting system according to an embodiment of the present invention claimed in claim 19 (NO. 33) is provided with an editor for editing the target-language sentence, the editor being used by a user.

A supplementary description will now be given of other data items.

In accordance with the following retrieval Condition in the "TO_FILL" item of the "OBJECT" item; ([suru (@ to [taisho]) (@ wo [*])]) ([suru (@ ni [taisho]) (@ wo [*])]), a word "hendensho" is searched for in the following analyzed structure;

```
[okonau(tense<PAST>) (wo [testosuru(others<noun>)] )
         (pre-supp[suru (@ni [taisho]) (@ wo
[hendensho] )] )].
```

In the following candidates of the representing pattern;

| PATTERNS | |
|---|---|
| <v-ltestl-000> | (#OBJECT#) |
| <v-ltestl-001> | (#OBJECT# #CONDITION#) |
| <v-ltestl-002> | (#OBJECT# #CONDITION#) |
| <v-ltestl-003> | (#OBJECT# #OR_COND#) |
| <n-ltestl-001> ((others <noun>) #OBJECT# #CONDITION#) | |
| <n-ltestl-002> ((others <noun>) #OBJECT# #OR COND#) | | the pattern <v-ltestl-000> has the largest number of constraint conditions satisfied and the largest degree of satisfaction in the above case. However, if "CONDITION" is set as the IC information, the patterns "<v-ltestl-001>" and "<v-ltestl-002>" have the largest them, and if there is further <noun>, the pattern "<n-ltestl-001>" and "<n-ltestl-002>" have the largest them.

In the following representing pattern;

```
<v-ltestl-000>
   PATTERN     ((X0 ltestl X1 <p-lforl-001>))
   COMPONENT   ((X0 #AGENT#)
                (X1 #OBJECT#)
                ((X2 X1) #CONDITION#))
   EXAMPLE     ((<SOMEONE>tests <SOMETHING>
                 for <CONDITION/STATE>)),
```

"(X2 X1)" is used in a part identificating a valiable number of the "COMPONENT" item. This means that a word "X1" in a pattern "X2" which is the second pattern from the IC is identified in the "CONDITION" item, the pattern "X2" being <p-lforl-001>;

```
<p-lforl-001>
   PATTERN     ((lforl X1))
   EXAMPLE     ((of <SOMETHING>)), and
```

"X1" being a word next to the word "|for|".

[DISPLAY IN TABLE FORMAT and EDITING] (No. 33)

In the language converting system according to the present invention claimed in claim 18, the information required by the representing patterns is displayed in the table format, values displayed in the table format can be edited by an editor.

In the present invention, if the "VALUE" item belonging to "Required" or "Preferred" or a value of the "VALUE" item is nil, values of the "DEFAULT-VALUE" item are displayed in the table format, and the user can edit the values. The display unit displays the values in the table format as shown, for example, in TABLE-1.

TABLE 1

IC : test

| | SLOT name | VALUE | DEFAULT_VALUE |
|---|---|---|---|
| Req. | AGENT | | <SOMEONE> |
| | OBJECT | |transformer station| | |
| Pref. | CONDITION | | <CONDITION/STATE> |
| | OR_COND | | <A OR B> |

Furthermore, the values indicated in TABLE-1 can be edited. For example, a "VALUE" section in the "AGENT" item is filled with "we" as shown in TABLE-2

TABLE 2

| Req. | AGENT | we | <SOMEONE> |
|---|---|---|---|

After the editing of the values by the user is completed, the changed value is reflected in the IC information in the memory as follows.

```
Required
   AGENT : shugo
      VALUE          (|we|)
      DEFAULT VALUE  ((<SOMEONE> <koisha>),
                      (<PERSON> <testosuruhito<)
                      (<AGENCY> <testo wo okonau hito>)
                      (<TEST CONDUCTOR> <testo wo okohau hito>))
```

|   |   |
|---|---|
| OBJECT : chokusetsu mokutekiho | |
| VALUE | \|transformer station\| hendensho) |
| DEFAULT_VALUE | ((<SOMETHING> <taisho>) |
|  | (<TEST SUBJECT> <testotaisho>)) |

After this, the representing pattern is selected based on the above information, and a target-language sentence is then created based on the selected representing pattern. In this embodiment, the representing pattern <v-ltestl-000> is selected, and "X0" in the representing pattern is identified. Based on the following arrangement of words;

|Wel, ltestedl and ltransformer stationl, the following sentence is created;

"We tested a transformer station".

[IMPROVEMENT OF DISPLAY AND EDITING] (NO. 34)

In the screen on which the IC information is displayed in the table format as shown in TABLE-1, sections on which items belonging to the "Required" item are to be positioned are emphasized to urge to set essential information. For example, the "VALUE" section of the "AGENT" belonging to the "Required" item, which "VALUE" section having no value, is displayed with half-tone screen as shown in TABLE-3 so that the "VALUE" section is emphasized. In TABLE-3, the half-tone screen is indicated by ///.

TABLE 3

I C : test

|   | SLOT name | VALUE | DEFAULT_VALUE |
|---|---|---|---|
| Req. | AGENT | ///////////////// | <SOMEONE> |
|   | OBJECT | \|transformer station\| | |
| Pref. | CONDITION OR_COND |  | <CONDITION/STATE> <A OR B> |

[REAL-TIME REFLECTION OF DISPLAY AND EDITING] (No. 35)

The target-language sentence is created every time a value displayed in the table format. The target-language sentence is created based on the IC information corresponding to the contents displayed at the present time and is displayed on the screen as shown in TABLE-4.

TABLE 4

I C : test
<SOMEONE> tested a transformer station.

|   | SLOT name | VALUE | DEFAULT_VALUE |
|---|---|---|---|
| Req. | AGENT |  | <SOMEONE> |
|   | OBJECT | \|transformer station\| | |
| Pref. | CONDITION OR_COND |  | <CONDITION/STATE> <A OR B> |

Here, if a word "Wel is inserted into the "VALUE" section of the "AGENT" item, the screen as shown in TABLE-5 is obtained.

TABLE 5

I C : test
<SOMEONE> tested a transformer station.

|   | SLOT name | VALUE | DEFAULT_VALUE |
|---|---|---|---|
| Req. | AGENT | we | <SOMEONE> |
|   | OBJECT | \|transformer station\| | |
| Pref. | CONDITION OR_COND |  | <CONDITION/STATE> <A OR B> |

Immediately after changing values, the IC information in the memory is updated, and the target-language sentence is also updated based on the changed values as shown in TABLE-6.

TABLE 6

I C : test
We tested a transformer station.

|   | SLOT name | VALUE | DEFAULT_VALUE |
|---|---|---|---|
| Req. | AGENT | \|we\| | <SOMEONE> |
|   | OBJECT | \|transformer station\| | |
| Pref. | CONDITION OR_COND |  | <CONDITION/STATE> <A OR B> |

After this, every time a value in the "VALUE" section is changed, the IC information in the memory is updated and the target-language sentence is also updated through the selection of the representing pattern. The following TABLE-7 shows an example of a case where the "VALUE" section in the "OBJECT" item is updated.

TABLE 7

I C : test
We tested a new transformer station.

|   | SLOT name | VALUE | DEFAULT_VALUE |
|---|---|---|---|
| Req. | AGENT | \|we\| | <SOMEONE> |
|   | OBJECT | \|new transformer station\| | |
| Pref. | CONDITION OR_COND |  | <CONDITION/STATE> <A OR B> |

[DISPLAY OF A PLURALITY OF REPRESENTING PATTERNS] (No. 36)

In the above embodiments, a single representing pattern is selected. In this embodiment, a plurality of representing patterns may be selected. In an example in which only the "OBJECT" item is filled, each representing pattern has the number of satisfied constrain conditions (referred to as an NSC) and the degree of satisfaction of constrain conditions (referred to as a DSC) as shown in TABLE-8.

TABLE 8

|   | NSC | DSC |
|---|---|---|
| <v-ltestl-000> | 1 | 1.0 |
| <v-ltestl-001> | 1 | 0.5 |
| <v-ltestl-002> | 1 | 0.5 |
| <v-ltestl-003> | 1 | 0.5 |
| <n-ltestl-001> | 1 | 0.33 |
| <n-ltestl-002> | 1 | 0.33 |

Here, an adaptivity factor is defined as a product of the NSC and DSC. It is assumed that the representing patterns having the first and second highest adaptivity factor be selected. In the above case, there are three representing patterns having the second highest adaptivity factor. As a result, four representing patterns are selected. The following target-language sentences based on the selected representing patterns.

```
<v-ltestl-000>:
    <SOMEONE> tested a transformer station.
<v-ltestl-001>:
    <SOMEONE tested a transformer station for
        <CONDITION/STATE>.
<v-ltestl-002>:
    <SOMEONE> made a test of a transformer
for
        <CONDITION/STATE>.
<v-ltestl-003>:
    <SOMEONE> conducted a test of a
        transformer station to determine <A or
B>.
```

In this case, a screen, for example, shown in TABLE-9 is obtained.

TABLE 9

I C : test
We tested a new transformer station.
We tested a new transformer station for <CONDITION/STATE>.
We made a test of a new transformer station for <CONDITION/STATE>.
We conducted a test of a new transformer station to determine <A or B>.

| | SLOT name | VALUE | DEFAULT_VALUE |
|---|---|---|---|
| Req. | AGENT | |we| | <SOMEONE> |
| | OBJECT | |new transformer station| | |
| Pref. | CONDITION OR_COND | | <CONDITION/STATE> <A OR B> |

[DISPLAY OF SOURCE-LANGUAGE SENTENCE USING SOURCE-LANGUAGE REPRESENTING PATTERN] (claim 20, No. 37)

In this embodiment, a source-language representing pattern corresponding to the target-language representing pattern in the IC representing pattern dictionary is provided, and a source-language sentence is created based on the source-language representing pattern.

The IC representing pattern dictionary has a source-language representing pattern corresponding to each target-language representing pattern as shown in FIG. For example, a representing pattern "J-PATTERN" in Japanese is added to items in the target-language representing pattern <v-ltestl-000> as follows.

```
<v-ltestl-000>
    PATTERN
        ((X0 ltestl X1))
    COMPONENT
        ((X0 #AGENT#)
         (X1 #OBJECT#)
    EXAMPLE
        ((<SOMEONE> TESTS,<SOMETHING>))
    J-PATTERN
        ((X0 ga X1 wo testosuru))
```

The source-language sentence obtained based on this source-language pattern is displayed along with the target-language sentence on the screen. A word in the source-language is selected, as a value identified in the IC information, from among words in the source-language and in the target-language. That is, a Japanese word "<koisha>" corresponding to <SOMEONE> is selected as X0, and a Japanese word "hendensho" corresponding to "|transformer station|" and existing in the original sentence is selected as X1. These selected words are arranged in accordance with the Japanese representing pattern, and the following Japanese sentence is obtained along with the English sentence.

<SOMEONE> tested a transformer station.

<koisha> ga hendensho wo testoshita.

According to this embodiment, the user can also check required item in the Japanese sentence.

[EDITING IN THE SOURCE-LANGUAGE SENTENCE]

This embodiment is provided with a unit used by a user to edit the source-language sentence created as described above, and a unit for detecting a word in the source-language positioned a changed position in the edited source-language sentence and for setting a word corresponding to the detected word in the source-language in the target-language representing pattern, a process after selecting the representing pattern is carried out based on the target-language sentence having the changed word.

In this embodiment, the source-language sentence displayed on the screen is edited. A word changed in the editing process is detected, and a word, in the target-language, corresponding to the changed word is obtained. The IC information in the memory is then updated based on the changed word, and the target-language sentence is created.

For example, in a source-language;

<koisha> ga hendensho wo tesutoshita, a part <koisha> is changed to "karera". As a result, the source-language is rewritten as follows, karera ga hendensho wo tesutoshita.

The system determines, based on a source-language representing pattern based on which the above source-language sentence is created, that X0 is changed to "karera". The IC information is then updated along with a word, in the target-language, corresponding to "karera". As a result, a value of the "AGENT" item is changed to "(|they| karera)". A target-language sentence is created based on the updated item, and the following target-language sentence is then obtained, "They tested a transfer station."

[REAL TIME EDITING PROCESS IN SOURCE-LANGUAGE SENTENCE] (No. 39)

In this embodiment, every time a value is changed in the editing of the source-language sentence, the changed value is reset in the memory and operations following this are carried out so that a target-language sentence is output.

[A PLURALITY OF TARGET-LANGUAGE PATTERNS ARE SELECTED BY SELECTION OF SOURCE-LANGUAGE PATTERNS] (No. 40)

In this embodiment, a source-language sentence created based on a source-language pattern corresponding the selected representing pattern is displayed on a screen. If a plurality of source-language sentences are displayed on the screen, one of the source-language sentences is selected by user's operations. A target-language sentence is created based on a representing pattern corresponding to the selected source-language sentence.

In the above examples, the following four representing patterns were selected:

<v-ltestl-000>,

<v-ltestl-001>,

<v-ltestl-002>, and

<v-ltestl-003>.

Based on these representing patterns, the following target-language sentences were created:

"<SOMEONE> tested a transformer station",

"<SOMEONE> tested a transformer station for <CONDITION/ STATE>. - - - ,

"<SOMEONE> made a test of a transformer station for <CONDITION/SATE>." and

"<SOMEONE> conducted a test of a transformer station to determined <A or B>."

In this embodiment, only source-language sentences are created based on source-language patterns as follows instead of creation of the above creation of the target-language sentences:

"<koisha> ga hendensho wo tesutoshita",

"<koisha> ga <jotai> no tameni hendensho wo tesutoshita",

"<koisha> ga <jotai> no tameni hendensho no tesuto wo okonatta", and

"<koisha> ga <jotai A ka B> wo kimerutameni hendensho no tesuto wo jisshishita".

After this, if the user edits or selects one of the source-language sentences, a representing pattern corresponding to the selected source-language sentence is decided. A target-language sentence is created based on the representing pattern. For example, if the user changes the word <koisha> to "karera" in the first source-language sentence, the first source-language sentence is selected, so that the representing pattern <v-ltestl-000> is selected. The target-language sentence is created based on the selected representing pattern as follows.

"karera ga hendensho wo tesutoshita"

"They tested a transformer station."

[ACCEPTANCE OF SOURCE-LANGUAGE TERM IN EDITING OF TARGET-LANGUAGE SENTENCE] (claim 21, No. 41)

In this embodiment, if a value changed in the edited target-language sentence is a term in the source-language, the term in the source-language is converted into a term in the target-language using the translation dictionary. A term, in the target-language, corresponding to the term in the source-language is changed to the converted term. Based on the relationship between the target-language sentence and the representing pattern in the target-language, the changed term and the position thereof, that is the corresponding IC information is detected. Further, if the changed term is a term in the source-language, a corresponding term in the target-language is obtained by the translation dictionary or the simple translation function. The IC information in the memory is updated based on the term as above obtained. After this, a target-language sentence is created.

For example, if a part <SOMEONE> is changed to "karera" in the target-language sentence:

"<SOMEONE> tested a transformer station.", the following sentence is obtained:

"karera tested a transformer station."

The system determines, based on the target-language representing pattern based on which the target-language sentence is created, that X0 is changed to "karera". Since "karera" is a term in the source-language, the IC information in the memory is updated using a corresponding term in the target-language obtained by using the translation dictionary. In this embodiment, a value in the "AGENT" item is changed to "(|they| karera)". Based on the updated information, the following target-language sentence is obtained:

"They tested a transformer station."

[REAL-TIME PROCESS OF ACCEPTANCE OF SOURCE-LANGUAGE TERM IN THE EDITING OF TARGET-LANGUAGE SENTENCE] (NO. 42)

In this embodiment, a term in the source-language is changed to a term in the target-language every time a value is changed based on the changing of the term in the source-language. That is, every time the target-language sentence is changed, the IC information in the memory is updated based on the changed term, and a target-language sentence is created based on the updated IC information.

[IC INPUT BY USER]

In this embodiment, the system accepts an IC input by the user. If it is determined that the input IC exists in the IC dictionary, the process is carried out using the input IC. An IC may be selected from a list displayed on a screen, the list having all or a part of IS included in the IC dictionary. An IC having head character "te" may be identified by a normalized representation, such as "te*". In this case, the user can flexibly select the IC. If the user selects a word "test" as the IC, the screen as shown in TABLE-10 is obtained.

TABLE 10

| I C : test | | | |
|---|---|---|---|
| | SLOT name | VALUE | DEFAULT_VALUE |
| Req. | AGENT | ///////////////// | <SOMEONE> |
| | OBJECT | ///////////////// | <SOMETHING> |
| Pref. | CONDITION OR_COND | | <CONDITION/STATE> <A OR B> |

Figure 85:
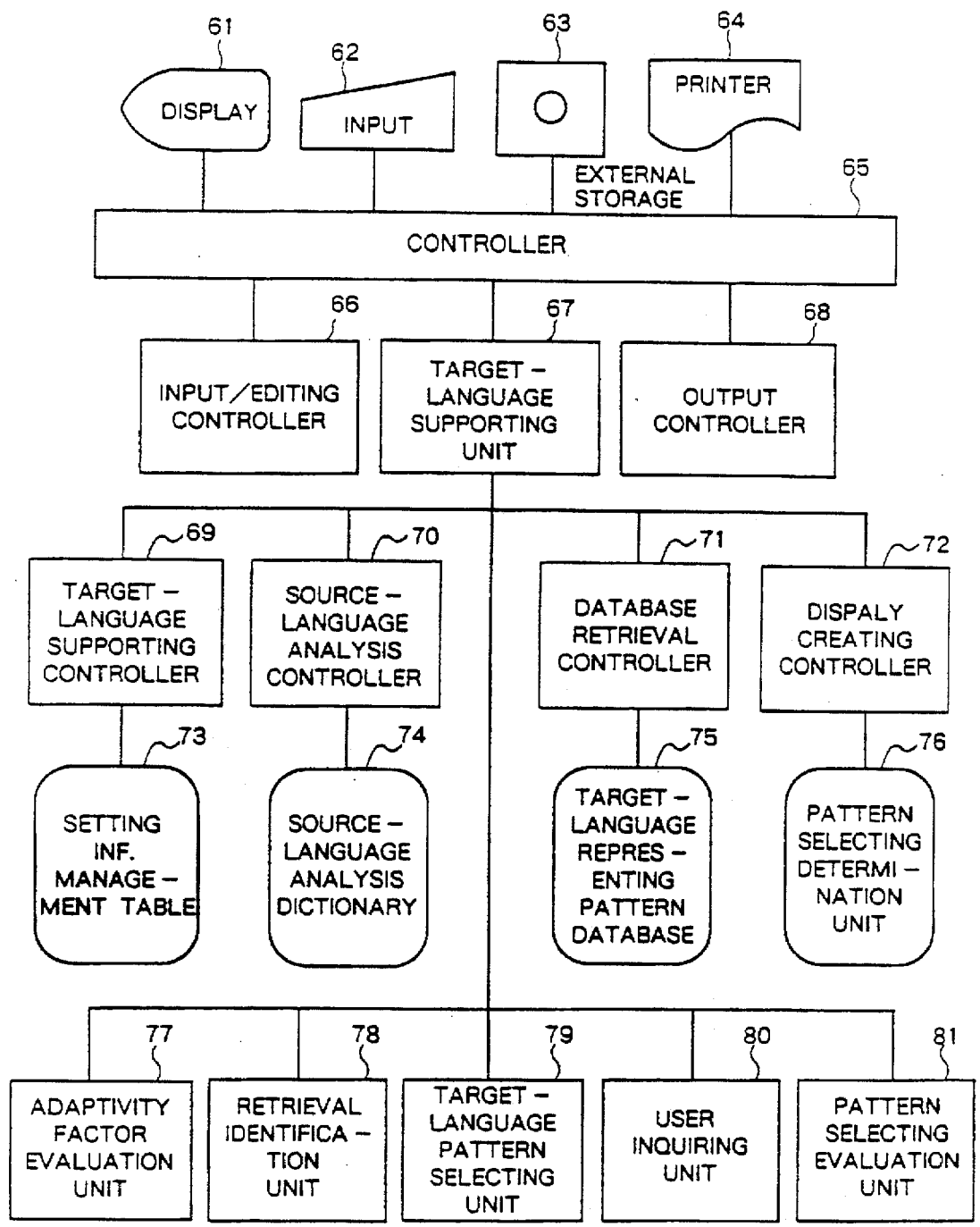
FIG. 85 is a block diagram illustrating a language conversion system according to another embodiment of the present invention.

FIG. 85 shows a system according to another embodiment of the present invention.

Referring to FIG. 85, the system has a display unit 61, an input unit 62, an external storage unit 63, a printer unit 64, a controller 65, an input/editing controller 66, a target-language supporting unit 67, an output controller 68, a target-language supporting controller 69, a source-language analysis controller 70, a database retrieval controller 71, a display creating controller 72, a setting information management table 73, a source-language analysis dictionary 74, a target-language representing pattern database 75, a pattern selecting determination unit 76, an adaptivity factor evaluation unit 77, a retrieval identification unit 78, a target-language pattern selecting unit 79, a user inquiring unit 80, and a pattern selecting evaluation unit 81.

The system has almost the same structure as personal computers, word processor and other OA equipments. The controller 65 is formed of a universal microcomputer or a dedicated LSI and controls the whole system. The controller 65 has a control portion for data input, data editing, data storage and printing thereunder, and a firmware and a dedicated LSI are practically used as this control portion.

The target-language representing pattern database 75 is controlled by the database retrieval controller 71. The adaptivity factor evaluation unit 77 evaluates an adaptivity factor of the target-language representing pattern to the source-language sentence. The retrieval identification unit 78 searches for information required by the target-language pattern in the source-language sentence and identifies it, to create a target-language sentence. The system obtains information required to create a target-language sentence by the interaction (inquiring and the response) with the user via the user inquiring unit 80. The target-language pattern selecting unit 79 selects, based on the result obtained by the adaptivity factor evaluation unit 77, a target-language pattern adapting to the source-language sentence input the system. A target-language sentence is created using the retrieval and identification result obtained by the retrieval identification unit 78 and the result of the interruption with the user via the user inquiring unit 80.

In a Japanese input mode, a Kana-Kanzi conversion is performed by the input/editing controller 66. The editing, storage and printing of data is performed by the input/editing controller 66 and the output controller 68.

The target-language pattern database 75 stores target-language representing patterns. The adaptivity evaluation unit 77 evaluates the adaptivity factor of each target-language pattern in the target-language pattern database 75 to the source-language sentence input to the system. Based on the evaluation result obtained by the adaptivity evaluation unit 77, target-language pattens having the highest adaptivity factors are selected from the target-language pattern database 75. The retrieval identification unit 78 searches for and identifies information required to create a target-language sentence using the selected target-language patterns in the source-language sentence input to the system. The user inquiring unit 80 inquires of the user what information is required to create a target-language sentence.

In a case where the system has a source-language analysis unit, a source-language sentence is supplied to the system and a target-language sentence is created based on the analysis result obtained by the source-language analysis unit. The system may have no source-language analysis unit. In this case, a analysis result obtained by an external source-language analysis unit is supplied to the system, and a target-language sentence is created based thereon. In a case where the system has a target-language sentence creation unit, the target-language sentence creation unit creates a target-language sentence from a target-language structure obtained based on the analysis result of the source-language sentence. The system may have no target-language sentence creation unit. In this case, the system outputs a target-language structure, and an external target-language sentence creation unit creates a target-language sentence from the target-language structure output by the system.

Figure 86:
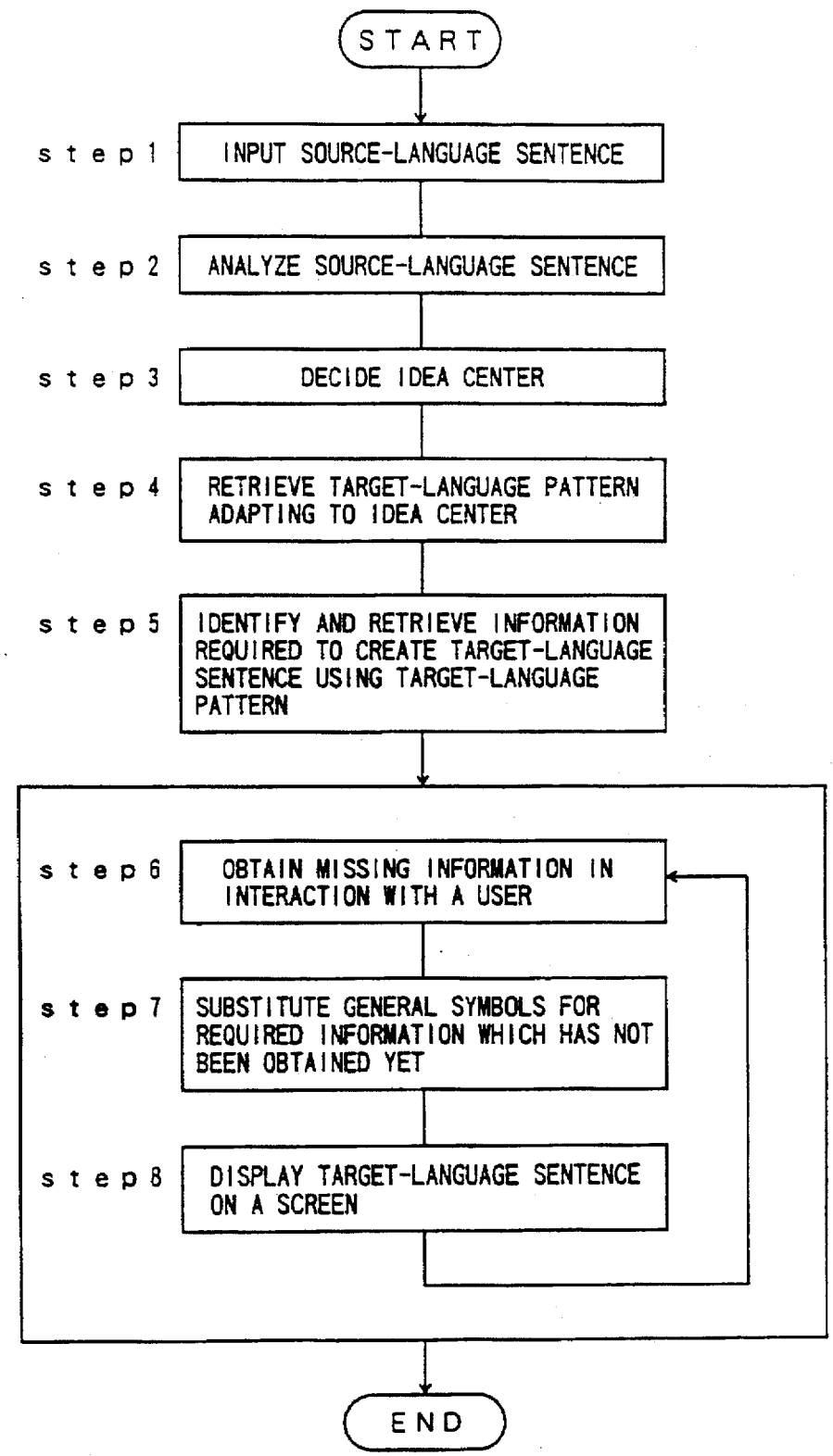
FIG. 86 is a flow chart illustrating an operation of the language conversion system.

The system operates in accordance with a flow chart as shown in FIG. 86.

In step 1, the system inputs a source-language sentence.

In step 2, the system analyses the source-language sentence.

In step 3, the system decides a central term in the source-language sentence, the central term being referred to an idea center (IC).

In step 4, the system searches the target-language pattern database 75 for a target-language pattern adapting to the idea center.

In step 5, the system searches for and identifies information required to create a target-language sentence in the source-language sentence input to the system using the target-language pattern.

In step 6, due to the interaction with the user, the system obtains missing information.

In step 7, if some of information items required to create a target-language are not obtained, general symbols in the pattern are substituted for them.

In step 8, a target-language sentence is displayed on the display unit 61.

In a case where the system has no source-language analysis unit and no target-language sentence creation unit, the system receives an analyzed structure of a source-language sentence supplied from an external unit, and extracts an idea center of the source-language sentence from the analyzed structure. A target-language pattern database 75 is searched for a target-language pattern adapting to the idea center. In formation required by the target-language pattern is searched for and identified in the analyzed structure of the source-language sentence, or the information is obtained by the interaction with the user via the user inquiring unit 80. A structure representing a target-language is created based on the information obtained above. If some of the information items required by the target-language pattern are not obtained, general symbols are substituted for them.

To decrease the number of times the system inquires of the user about required information, the process for searching for and identifying information required to create a target-language sentence must be preferentially carried out. Only if a required information item is not obtained by the process, the required information item is obtained by the interaction with the user.

Further, every time it is determined that a required information item is not obtained by the searching and identifying process, an item to be inquired of the user are stored in the system, and items stored in the system are then inquired together of the user. In this case, since the number of times the system inquires of the user about required information is further decreased, the interaction with the user can be effectively performed.

A process of the target-language pattern is shown in FIG. 87(a)–(e).

FIG. 87(a) shows examples of a source-language sentence and a target-language sentence obtained by a conventional translation system. FIG. 87(b) shows an example of a target pattern (which is a pattern capable of being understood by the user). FIG. 87(c) shows an example of sentences obtained in the middle of the process according to the present invention. FIG. 87(d) shows an example of an analyzed structure of a source-language sentence. FIG. 87(e) shows an example of the target-language pattern database. In this embodiment, the source-language is Japanese, and the target-language is English.

Due to the structure analysis of the source-language sentence: "hendensho wo taishonishite tesuto wo okonatta", the structure as shown in FIG. 87(d) is obtained. Although a word "okonau" is the structural center of the source-language sentence, words "tesuto wo okonau" represents the center of meaning of the source-language sentence. The word which representing the center of meaning of the source-language sentence is referred to as an idea center. The idea center is decided based on the analyzed structure.

The target-language pattern database shown in FIG. 87(e) is searched for a target-language pattern having the highest adaptivity factor to the idea center. In this case, the target pattern, shown in FIG. 87(b), is obtained:

[(Someone) conducts a test of (something) (for (some purpose)).]

In the above target pattern, a word in ( ), such as the (Someone) and the (something), is referred to as a general substitution symbol. The general substitution symbol is information required to create a target-language sentence based on this pattern. Even if words in ( ) are omitted, a correct target-language sentence can be created. However, if the words in ( ) are used, a completed natural target-language sentence can be obtained. Retrieval keys used to search for and identify required information in the analyzed structure of the source-language sentence are described in the target-language pattern database shown in FIG. 87(e). A target-language pattern corresponding to "tesuto wo okonau" is "conducts a test". One of the required information items is the direct object, [sem hendensho] is obtained using a retrieval key [surface-level word (taisho)—upper structure—function name (wo obj)], and [sem hendensho] is converted as the direct object into a structure of the target-language. The subject is also required information. However, information corresponding to the subject does not exist in the structure of the source-language sentence. Thus, the system inquires of the user what the subject is, the subject "the government agency" is obtained based on the result of inquiring of the user.

In this case, the system displays, for example, a comment "The system does not understand the subject part (Someone) of a translation-candidate "(Someone) conducts a test of (something) (for (some purpose)). Who did test [tesuto wo okonau?]". The system may display, for example, a comment "The system does not understand the subject part (Someone) of a translation candidate "(Someone) conducted a test of (a) transformer station (for (some purpose)). Who did test the transformer station [hendenshono tesuto wo okonau]?". Next, the system inquires of the user about an article of "transformer station", and obtains the last result. If required information items are not obtained or if the system does not inquire of the user about an information item, the general substitution symbols are used as they are. As a result, the system outputs a target-language sentence corresponding to the pattern [The government agency conducted a test of the transformer station (for (some purpose)).]

FIG. 88 shows examples comments displayed when the system inquires of the user about required information.

FIG. 89 shows another operation of the language conversion system (No. 23).

In step 1, the system inputs a source-language sentence.

In step 2, the system analyzes the source-language sentence.

In step 3, the system decides a idea center in the source-language sentence.

In step 4, the system searches the target-language pattern database 75 for a target-language pattern adapting to the idea center.

In step 5, the system searches for and identifies information required to create a target-language sentence in the source-language sentence input to the system using the target-language pattern.

In step 6, due to the interaction with the user, the system obtains missing information.

In step 7, if there are a plurality of target-language patters, the system displays judging information required to select a target-language pattern.

In step 8, if there are missing information items, the general substitution symbols in the pattern are substituted for the missing information.

In step 9, a target-language sentence is displayed on the display unit.

FIG. 90 shows example of the judging information in the pattern database.

In this example, the judging information of a source-language words gimu wo hatasu" is indicated in a easy format for the source-language. There are many kinds of representation corresponding to the source-language words in the target-language, such as "do one's duty", "perform one's duty", . . . , "do one's duties" and etc. A type-data item belonging to a [representation type] section and a reference number belonging to a [explanatory note number] section are assigned to each representation in the target-language. The reference number belonging to the [explanatory note number] section identifies a position at which explanation data is stored, the explanation data indicating, using the source-language, in what state and scene the corresponding description in the target-language is used. The sites and scenes in which the representations in the target language are used are roughly classified into types. The type-data items indicating the types belong, as attribute values, to the [representation type] section.

FIG. 91 shows another example of the judging information in the pattern database.

In this embodiment, a type-data item belonging to the [representation type] section and a reference number belonging to the [explanatory note number] are assigned to each representation in the target-language. An order number belonging to a [field selection order] section is also assigned to each representation in the target-language. The order number belonging to the [field selection order] is an attribute value indicating an order based on a frequency at which the representation in the target-language is used in each field. For example, an order number "11125" having five numerals is assigned to a representation "do one's duty". The first numeral "1" indicates an order in the first field, the second numeral "1" indicates an order in the second field, . . . , and the fifth numeral "5" is an order in the fifth field. The smaller the numeral becomes the greater a frequency becomes at which the representation in the target-language is used. The field may be "government", "diplomacy", "law", "industry", "machine", "electricity", "electronics", "communication", "society", "life", "culture" and the like.

FIG. 91 shows another embodiment of the judging information in the pattern database.

In this embodiment, a reference number belonging to a [cooperative representation 1] section and a reference number belonging to a [cooperative representation 2] section are further assigned to each representation in the target-language. The reference number belonging to the [cooperative representation 1] section is a position at which first cooperative representation data is stored, the first cooperative representation data indicating a representation apt to be used along with, for example, the representation "gimuwo hatasu" in the source-language, or a representation apt to be used in the field, the state and the scene in the source-language. The reference number belonging to the [cooperative representation 2] section is a position at which second cooperative representation data is stored, the second cooperative representation data indicating a representation apt to be used along with, for example, the representation "do one's duty (corresponding to "gimuwo hatasu")" in the target-language, or a representation apt to be used in the field, the state and the scene in the target-language.

The system evaluates, using some of items in the [representation type] section, the [field selection order] section, [cooperative representation 1] section, and [cooperative representation 2] section, which representation pattern is to be selected from among the target-language representation patterns recorded in the database. For example, in a case where a normal sentence is to be created, a representation having a type-data "general" belonging to the [representation type] section is selected. A representation having a order number including a small number in a field is preferentially selected in the field.

The representations identified by reference numbers belonging to the [cooperative representation 1] section and the [cooperative representation 2] section differ from each other in accordance with the types of documents, words (keywords) and representation used in fields of contents of the documents, the subject and the object in the representation pattern.

Figure 93:
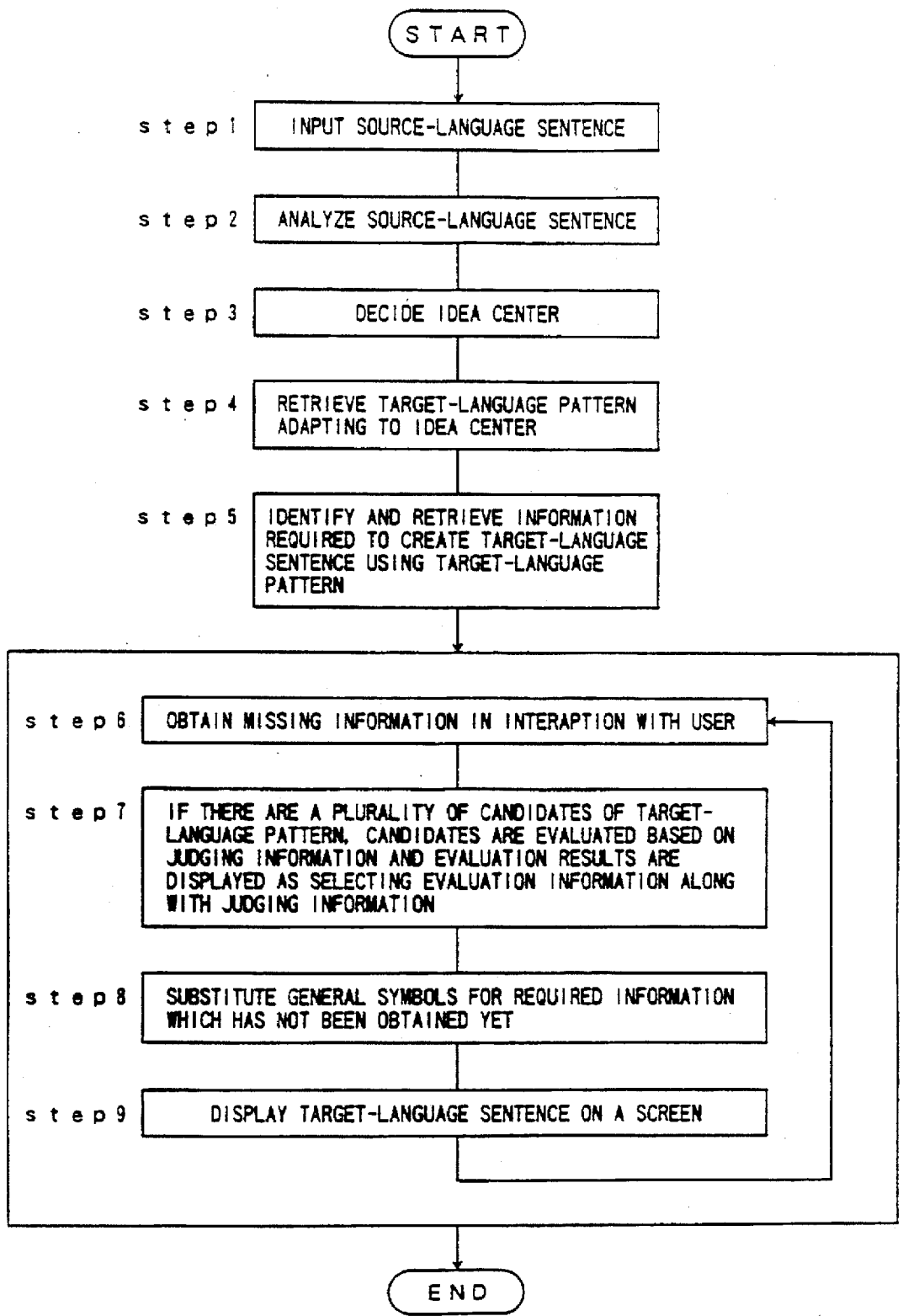
FIG. 93 is a flow chart illustrating another operation of the language conversion system.

FIG. 93 a process in another embodiment of the present invention.

In step 1, the system inputs a source-language sentence.

In step 2, the system analyzes the source-language sentence.

In step 3, the system decides a idea center in the source-language sentence.

In step 4, the system searches the target-language pattern database 75 for a target-language pattern adapting to the idea center.

In step 5, the system searches for and identifies information required to create a target-language sentence in the source-language sentence input to the system using the target-language pattern.

In step 6, due to the interaction with the user, the system obtains missing information.

In step 7, if there are a plurality of target-language patters, the system evaluates the target-language patterns using the judging information and creates selecting evaluation information for each target-language pattern. The system then displays the selecting evaluation information for each target-language pattern along with the judging information.

In step 8, if there are missing information items, the general substitution symbols in the pattern are substituted for the missing information.

In step 9, a target-language sentence is displayed on the display unit.

In a case where there are a plurality of candidates of target-language pattern in the interaction with the user, the system determines using the judging information what pattern is to be selected, the determination result and the judging information is displayed on the display unit (NO. 46).

Figure 94:
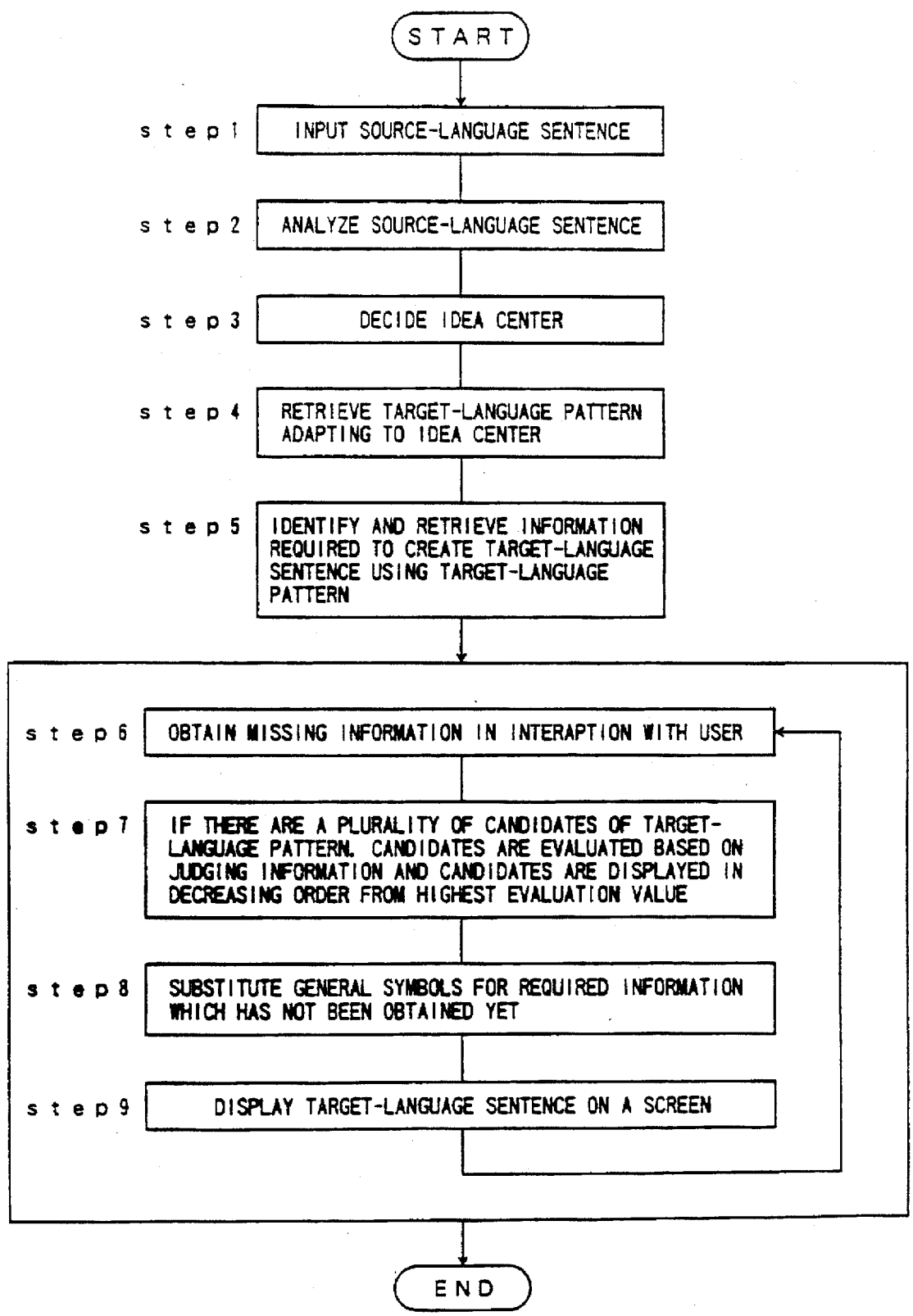
FIG. 94 is a flow chart illustrating another operation of the language conversion system.

FIG. 94 shows a modification of the process shown in FIG. 93. Step 7 indicated in FIG. 94 differs from that shown in FIG. 93.

In step 1, the system inputs a source-language sentence.

In step 2, the system analyzes the source-language sentence.

In step 3, the system decides a idea center in the source-language sentence.

In step 4, the system searches the target-language pattern database 75 for a target-language pattern adapting to the idea center.

In step 5, the system searches for and identifies information required to create a target-language sentence in the source-language sentence input to the system using the target-language pattern.

In step 6, due to the interaction with the user, the system obtains missing information.

In step 7, if there are a plurality of target-language patters, the system evaluates the target-language patterns using the judging information and creates selecting evaluation information for each target-language pattern. The system then displays the selecting evaluation information for each target-language pattern along with the judging information so that the selecting evaluation information items are arranged in an order from the highest selecting evaluation information item.

In step 8, if there are missing information items, the general substitution symbols in the pattern are substituted for the missing information.

In step 9, a target-language sentence is displayed on the display unit.

In step 7, only the target-language pattern having the highest selecting evaluation information item may be displayed on the display unit. The target-language pattern having the selecting evaluation information items falling within a predetermined range may also be displayed on the display unit.

Figure 95:
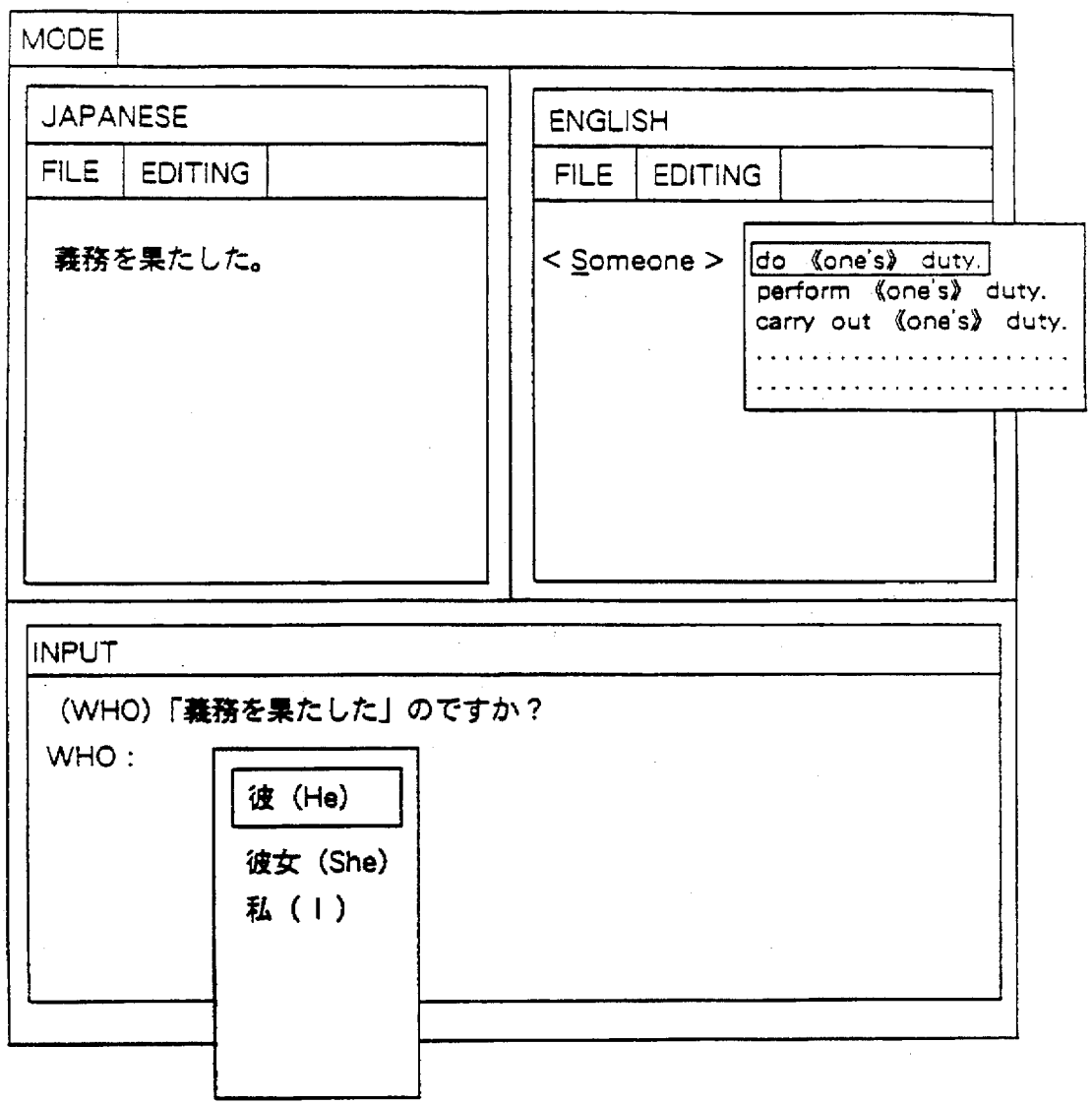

FIG. 95 shows an example in which the system inquires of user about required information in the process shown in FIG. 93. A plurality of target-language patterns are displayed so as to be arranged in an order in which they are extracted. In FIG. 95, items in the [representation type] section, [explanatory note number] section and the like are omitted.

FIG. 96 shows an example in which the system inquires of the user about required information in the process shown in FIG. 94. A plurality of target-language patterns are displayed so as to be arranged in an order from the largest order number (corresponding to the five fields) belonging to the [field selecting order] section. In FIG. 96, items in the [representation type] section, [explanatory note number] and the like are omitted.

FIG. 97 shows an example in which a plurality of target-language patterns are displayed with the judging information using times in the [representation type] section.

FIG. 98 shows a screen on which the judging information described in FIGS. 90–92 is selected (changed) by the user. On the interactive screen, a mode in which functions set in the system are changed is selected by a key operation or a mode selecting operation in a menu. The user directs the system to select an evaluation factor (the judging information) to be used from among evaluation factors of a plurality of patterns. The selection of each evaluation factor is performed by a toggle operation (ON or OFF). A reference number corresponding to the selected evaluation factor is turned over indication. A plurality of evaluation factors may be simultaneously selected. The item (2) of "FIELD" has an "AUTO" mode and a "MANUAL" mode. In the "AUTO"

mode, the system automatically determines the field based on the target-language representation. If the information required to automatically determine the field is lacked (there is no input target-language sentence), the system sets a default value. In the "MANUAL" mode, the operator directs the system to set a field of a text to be made by a key operation or a field selecting-operation in a menu.

FIG. 99 shows a screen on which the indication format of a plurality of candidates is changed. A mode in which functions set in the system are changed is selected in the same manner as that in the above example, and the user directs the system to select an indication format of a plurality of candidates. In the first item (1), only the first candidate is indicated, the first candidate being the representation pattern having the highest evaluation value. In the second item (2), three candidates, the first, second and third candidates are indicated so as to be arranged in an order from the highest evaluation value. In the third item (3), all the candidates are indicated. The number of candidates to be indicated can be set.

The technique of the language conversion system described above can be applied to a text creating system for creating a text in a target-language (e.g. English) using a text in a source-language (e.g. Japanese).

A description will now be given of a text creating system according to the present invention.

Figure 100:
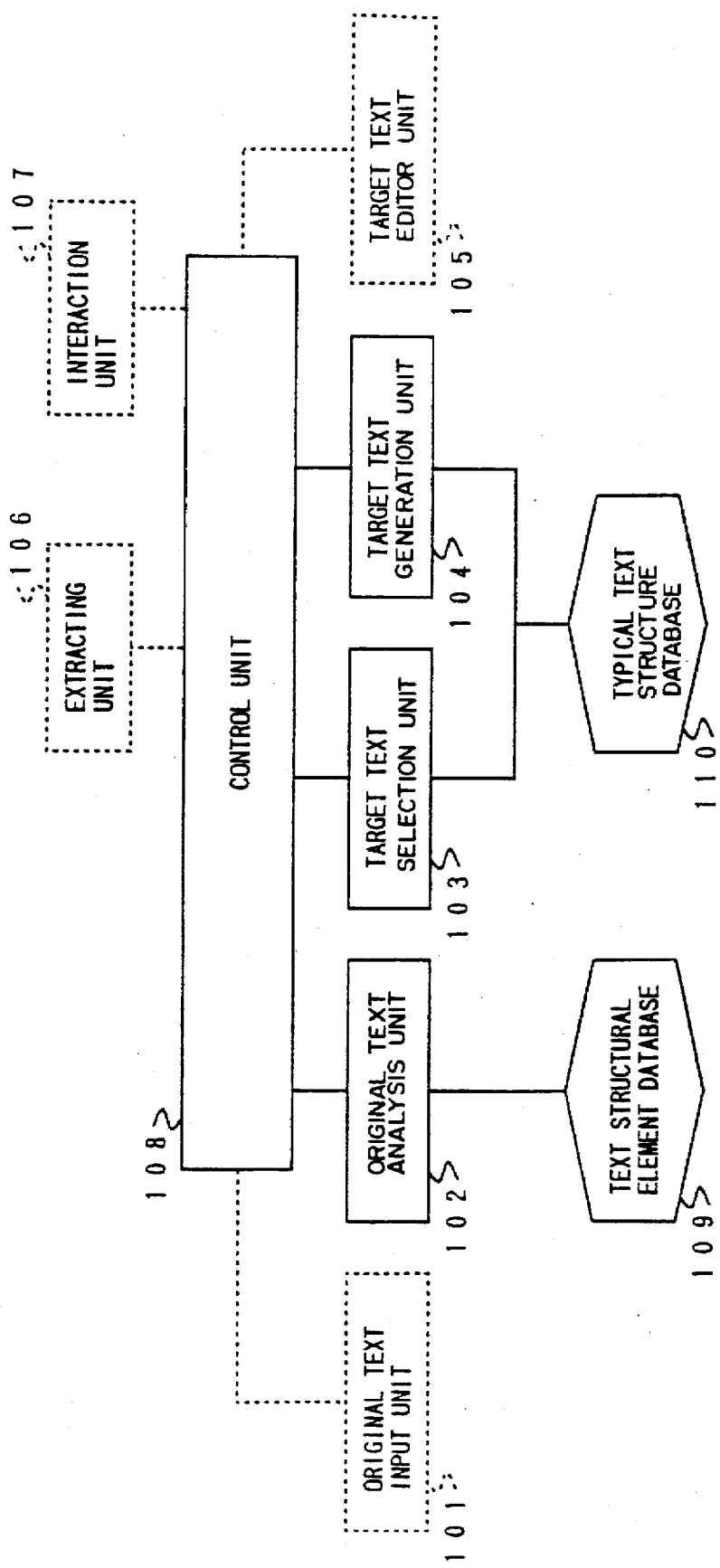
FIG. 100 is a block diagram illustrating a text creating system according to an embodiment of the present invention.

FIG. 100 is a block diagram of the structure of a text creating system according to another embodiment of the present invention. The system shown in FIG. 100 is made up of an original-text input unit an original-text analysis unit 102, a target-text selection unit 103, a target-text generating unit 104, a target-text editor unit 105, an extracting unit 6 for extracting information from the original text, interaction unit 107 for interacting with the user, a control unit 108, a text structural element database 109, a typical text data base 110. The system structure shown in FIG. 100 has, external units, the original-text input unit 100, the original-text editing unit 105 and the interaction unit 107.

The user inputs a text written in the original language to the system by means of the original-text input unit 101. The text structural element database 109 stores structural elements forming texts. The original-text analysis unit 102 analyzes the input text, and detects text elements stored in the text structural element database 109 from the text written in the original language, (original text). The typical text database 110 stores typical texts, the typical text structures, and sets of structural elements of the structures. By using the structural elements of the, original text detected by the original text analysis unit 102 and selecting, as necessary, typical texts from the typical text database 110, necessary information is acquired from the original text by means of the extracting unit 106 and the interaction unit 107. Then, the target-text selecting unit 103 selects the typical text (structure) similar to the original text from the typical text database 110. The target-text generating unit 104 generates the target text by using a typical text selected by the selected target text. The user edits the created text by means of the target-text editing unit 105.

In the above-mentioned embodiment of the present invention, the text elements written in the original language are used and the suitability factor is evaluated to select the typical text. Some variations of the abovementioned embodiment of the present invention can be made. In a variation of the above-mentioned embodiment, the correspondence between the text elements in the original language and the text elements in the target-language is made. Then using the target-language elements, the suitability factor is evaluated to thereby select the typical text. In another variation, the suitability factor is evaluated in the following manner. The text elements in the target-language are collected to form a set of text elements. Then, the degree of similarity between the above set and sets of text elements defined in the text structures stored in the typical text database 110. In yet another variation, the target text is generated by extracting necessary information from the original text.

Figure 101:
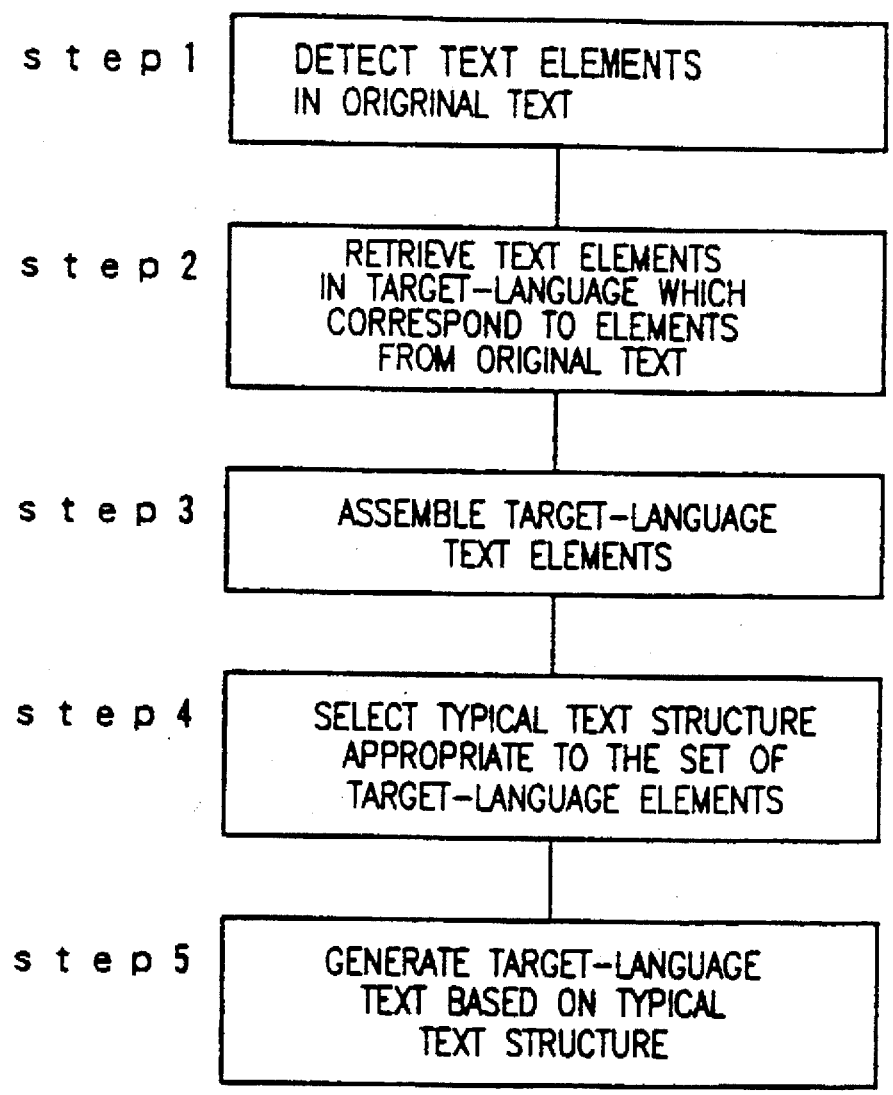
FIG. 101 is a flow chart illustrating an operation of the text creating system.

FIG. 101 is a flowchart of the operation of the text generating apparatus according to the embodiment being considered. In step 1, structural elements stored in the text structural element database 109 are extracted from the original text which was .input by the user. In step 2, the text structural element database 109 is searched to find elements in the target language corresponding to the detected elements in the original language. In step 3, the retrieved target language structural elements are assembled. In step 4, the typical text structure which matches the set of elements is selected from the typical text database, 110. In step 5, the target-language text is generated based on the selected text structure.

FIG. 108 shows an example of the typical text database used in the embodiment of the present invention. In other words, FIG. 108 shows an example of information stored in a database storing typical target language text structures. More particularly, FIG. 108 shows three typical texts, and the labels of these typical texts are "basic abstract" (part (a)), "extension of prior work (part (b), and "solution" (part (c)). The texts respectively have structures and elements forming these structures. For example, "this_paper", "prior_work" and "element" are structural elements of the target text. Further, a combination of investigation, prior_work, this_paper, advantages and implement is the structure of the text "extension of prior work".

FIG. 107 shows an example of information stored in the text structural element database 109 used in the embodiment being considered. Elements contained in typical text structures are stored in database 109. Examples of these elements are "this_paper", "prior_work", and "implement" shown in FIG. 108. Further, database 109 stores the text structural elements in the original language used for searching the structural elements in the target language, for example "this paper", "until now", and "realization". The text structural elements in the original language are detected from the original text.

A description will now be given, with reference to FIGS. 102 through 107, of the operation of the text creating apparatus according to the present embodiment.

FIG. 102 shows an example of the input text in the original language. First of all, the text structural elements in the original language are detected using the text structural elements database 109. Part (a) of FIG. 103 shows an example of the result of the above detection. Then, text structural element database 109 is searched for the elements in the target language which correspond to the text structural elements in the original text as found in the detection result. Part (b) of FIG. 103 shows the result from the above search. Thereafter, the text elements in the target language are assembled to create a set of text elements. Then, a text structure matching the above set of elements is selected from the typical text structure database 110. Part (c) of FIG. 103 shows the selected text structure. Thereafter, sentences are created using the typical text structure. Part (a) of FIG. 104 shows an example of the structural elements contained in the typical text structure, and part (b) thereof shows an example of sentences formed with the elements.

Words written with capital letters and clauses enclosed by parentheses represent information needed by the structure (items to be inserted into the structure). This needed information is extracted from the original text, and then inserted into the sentence after being translated into the target language. FIG. 105 shows the result of the above procedure. Information shown in part (b) of FIG. 104 and FIG. 105 are displayed so that the user can edit the information. The results after editing are shown in FIG. 106.

The above-mentioned text creating apparatus uses a text structure as defined by a collection of text elements, rather than a text template strictly defined by the logical structure of texts. That is, the above-mentioned text generation device is configured so that 1) the structural elements of the text are extracted by analyzing the original text, 2) the target language text structure most appropriate to the set of extracted text structural elements is searched for in the text structure database, 3) the target text is generated using the retrieved text structure, and 4) the use edits the target text generated in the above-mentioned manner.

However, the above-mentioned text generation device is premised on the existence of an original language text, and is not equipped with means for selecting a suitable target text structure if there is no original text. A description will now be given of another embodiment of the present invention equipped with means enabling an application to creating text without any original text.

The following description relates to a case where an English abstract is created according to the text creating apparatus equipped with the abovementioned means.

Figures 109A, 109B, 109C:
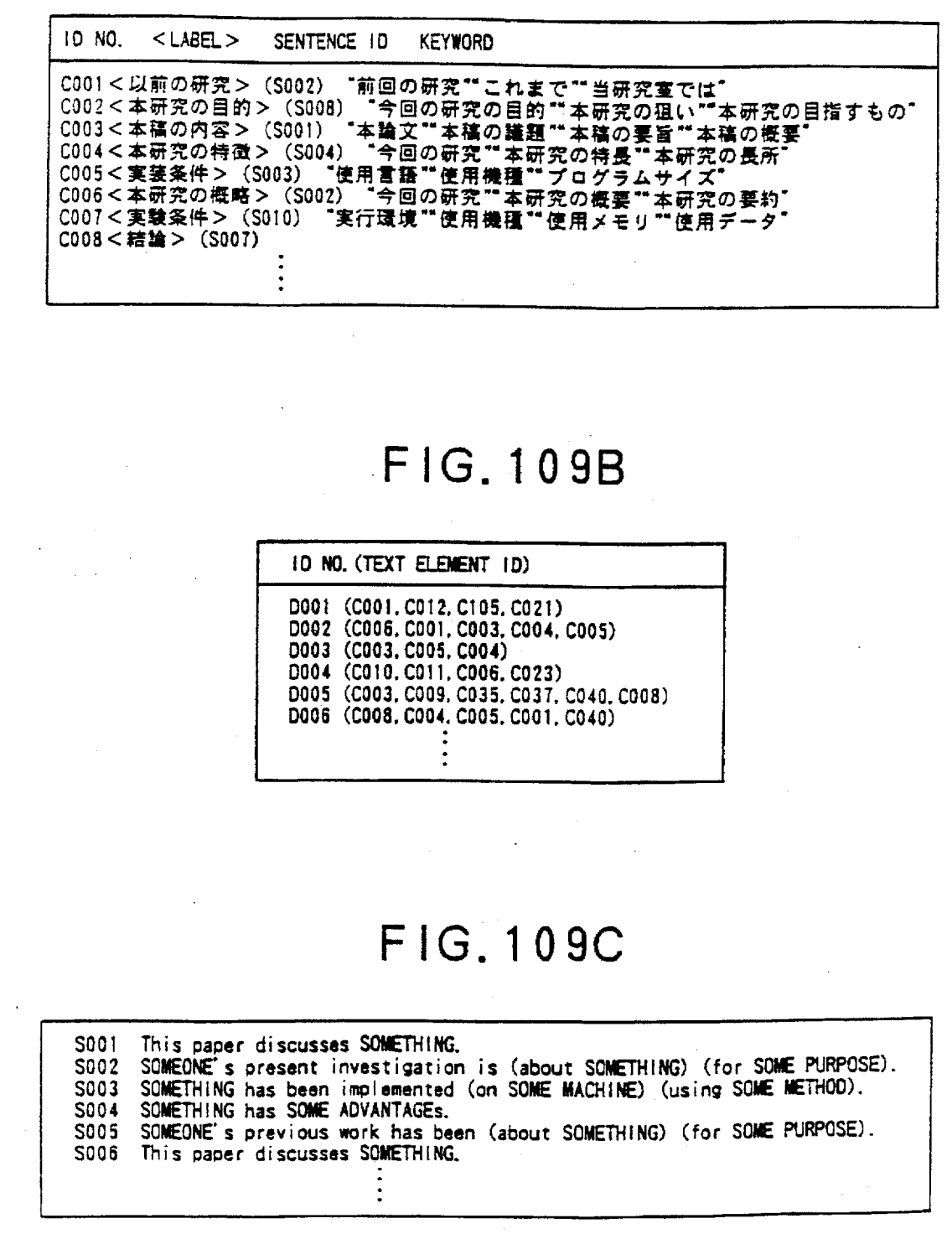

FIG. 109 shows an example of information stored in a database used in the embodiment being considered. FIG. 109A shows a text element database, which stores a set of elements forming a text. Each of the text elements corresponds to an item which the user wishes to describe in the target text, and has information concerning a label shown to the user, a pattern identifier for the corresponding sentence, and keywords for use in retrieval.

FIG. 109B shows a text structure database, which stores information concerning the typical text structures each being defined as an assembly of text elements.

FIG. 109C shows a sentence pattern database, which has the same structure as the sentence pattern database disclosed in Japanese Laid-Open Patent Application No. 3-351636. Essentially the sentence pattern database stores information concerning clause patterns which form sentence patterns, and information concerning alternate candidates for the clause patterns. FIG. 109C shows identification numbers and examples of sentences created from information stored in the sentence pattern database.

Figure 110:
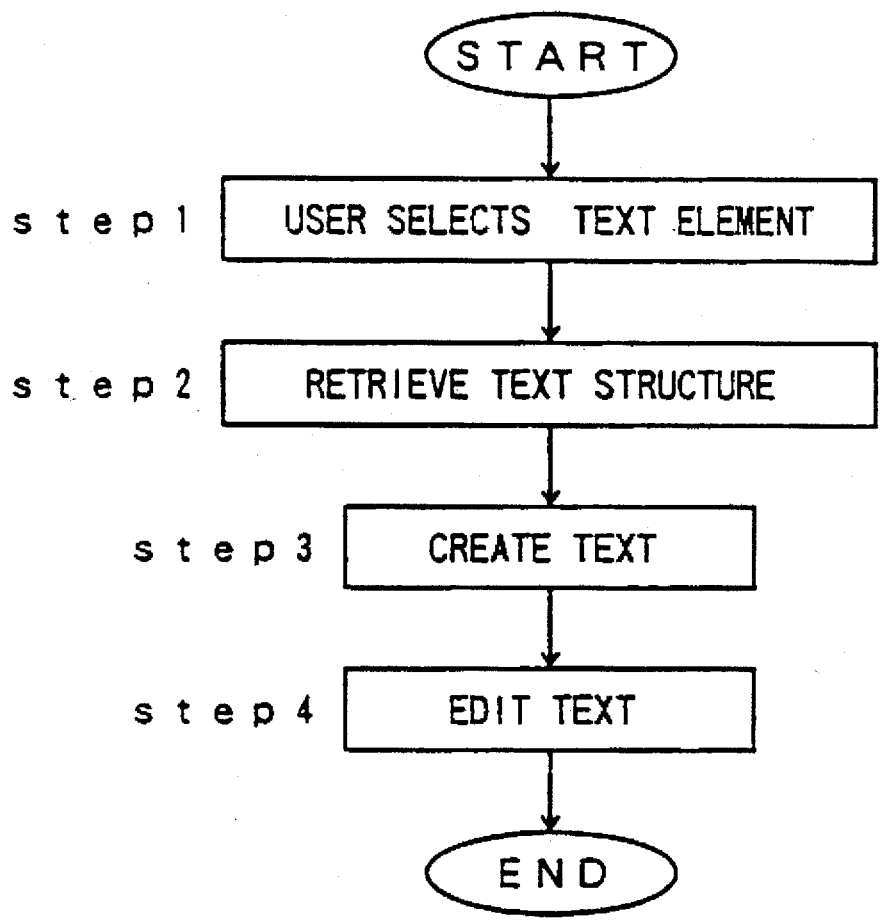
FIG. 110 is a flow chart illustrating an operation of the text creating system according to another embodiment of the present invention.
Figure 112A:
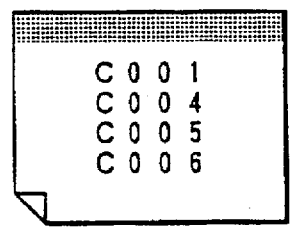
FIGS. 112A, 112B and 112C are diagrams illustrating examples of sets of selected elements.
Figure 112B:
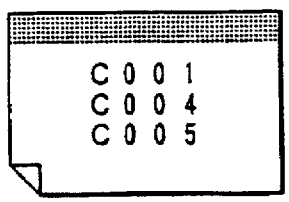
Figure 112C:
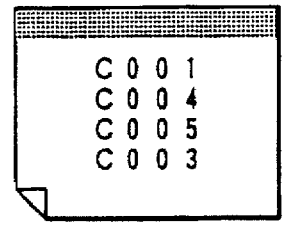

FIG. 110 is a flowchart of the operation of the embodiment of the present invention being considered. In step 1, text elements are selected. More particularly, the user selects, from the text element database, text elements related to an item that the user wishes to describe in a text to be created (an English abstract in the example being considered). The selected text elements are stored in the form of selected element sets as shown in FIGS. 112A through 112C.

In step 2, the text structure is retrieved. More particularly, the text structure matching the selected element set stored in step 1 is searched for in the text structure database.

In step 3, the text is generated. More particularly, based on the text structure obtained in step 2, sentences corresponding to the text elements in the text structure are generated from the information stored in the sentence pattern database.

In step 4, the sentence is edited. More particularly, the sentence created in step 3 is displayed and the user edits the displayed sentence.

A further description will now be given of the above-mentioned steps applied to an example.

Step 1 for selecting text elements will be described in a case where a menu is used as the user interface for selecting test elements and enables the user to select text elements stored in the text element database which are displayed to the user.

As shown in FIG. 111A, text elements which can be selected are displayed. The user selects items which the user wishes to describe in the target text. It will now be assumed that the user selects four items, "feature of present research", "mounting condition", "summary of present research" and "prior research".

Before presenting the text elements to the user, it may be possible to sort out text elements to be displayed by, for example, specifying the field and purpose of the text. The identification numbers of the text elements selected by the user are stored in the form of a set of selected elements as shown in FIG. 112A, and are used in step 2.

Another example will now be described in which the user inputs items which the user wishes to describe in the target language in the natural language. It will now be assumed that the user inputs the following four keys, that is, 1) previous research, 2) feature of the present research, 3) summary of the research and 4) condition for mounting. Each of the four keys is compared with retrieval keywords stored in the text element database, and corresponding text elements are searched for. Hence, C001, C004, C006 and C005 are identified with respect to "previous research", "feature of the present research", "summary of the research" and "condition for mounting", respectively. As has been described previously, the obtained text elements are stored the as a set of selected elements and are used in step 2.

In step 2, the text structure is searched for using the set of selected elements. This is a method evaluates the degree of similarity between the set of text elements extracted from the original text and text structures defined in the text structure database and identifies the text structure with the highest degree of similarity. By applying the above method, D002 is most suitable for the set of selected elements shown in FIG. 112 and is selected from among the text structures defined in the text structure database.

In step 3, the target text is generated based on text structure D002 selected in step 2. The generation of the text is carried out using the method disclosed in Japanese Laid-Open Patent Application No. 3-175944. A sentence corresponding to the first text element C006 is created from the information stored in the sentence pattern database. In the same manner, sentences corresponding to C001, C003, C004 and C005 are generated, so that the target text is generated. FIG. 114A shows an example of the created text.

In step 4, the text created in step 3 is displayed, and the user edits it. The editing procedure used in step $4 is, for example, an interaction method which has been proposed. FIG. 114B shows a text edited by the user.

A description will now be given of still another embodiment of the present invention. The overall procedure of the embodiment being considered is the same as that of the embodiment shown in FIG. 110 except for the following. If a plurality of text structures are searched for in step 2, step 1 is carried out again in order to cause the user to again select text elements. This procedure is repeatedly carried out until only one text structure is obtained. The other steps 3 and 4 used in the embodiment being considered are the same as those used in the embodiment shown in FIG. 110.

Figure 113A:
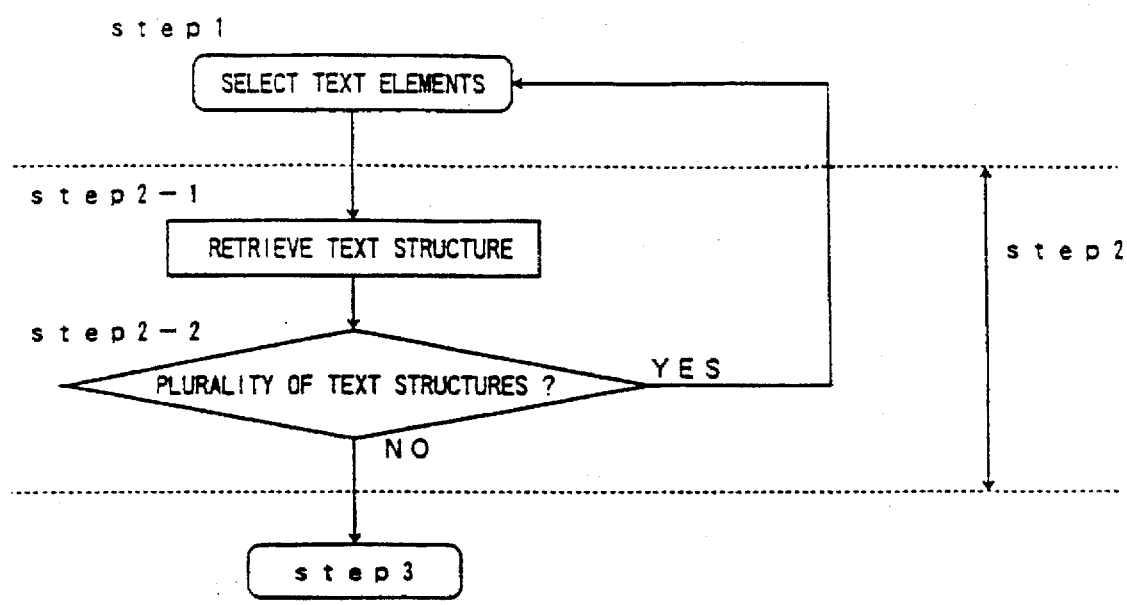
FIGS. 113A and 113B are flow charts in a process carried out by the system.

FIG. 113A is a flowchart of a sequence between step 1 and step 2. The following description relates to a case where the sequence is applied to the set of selected elements shown in FIG. 112B.

In step 1, the set of selected elements shown in FIG. 112B is stored. In step 2-1, one or more text structures containing the same text elements as those shown in FIG. 112B is searched for. In the example being considered, two text structures D002 and D006 are obtained. If it is determined, in step 2-2, that more than one text structure is obtained in step 2-1, step 1 is executed again. If it is determined, in step 2-2, that only one text structure is obtained in step 2-1, step 3 is executed.

In step 1, the user selects text elements again. The selected text elements are added to the set of selected elements, as shown in FIG. 112C, and step 21 is executed. In step 2-1, one or more text structures containing the same text elements as those shown in FIG. 112C are searched for. In the example being considered, only D002 is obtained. In step 2-2, it is determined that only one text structure is obtained in step 2-1, and hence step 3 is executed. Then, the steps 3 and 4 are executed in the same manner as has been described previously.

A description will now be given of the aforementioned re-selection of text elements carried out by the system.

Figure 113B:
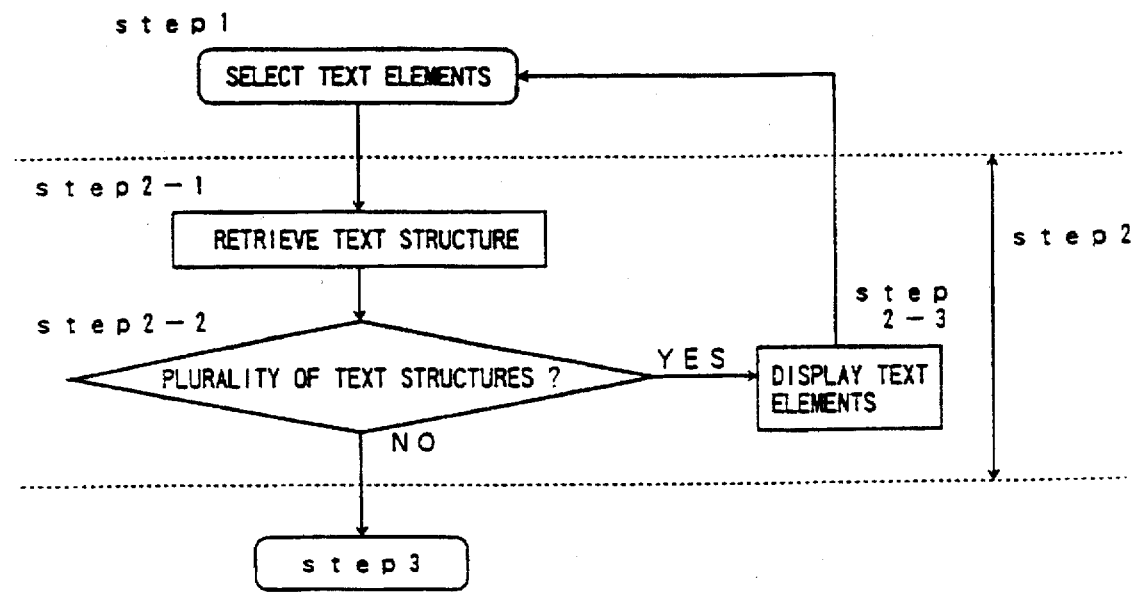

FIG. 113B is a flowchart of the sequence between step 1 and step 2 carried out by the system. Steps 1 through step 2-1 are executed in the same manner as has been described previously, so that text structures D002 and D006 are obtained from the set of selected elements shown in FIG. 112B. In step 2-2, it is determined whether or not a plurality of text structures have been obtained in step 2-1. When the result of step 2-2 is affirmative, step 2-3 is executed. When the result of step 2-2 is negative, step 3 is executed. In step 2-3, text elements are displayed which are included in the text structures but are not included in the set of selected elements. In the example being considered, C003, C006, C008 and C040 included in text structures D002 and D006 are displayed, as shown in FIG. 112B.

In step 1, the user selects items which the user wishes to describe in the target text from among the displayed text elements. The selected text elements are added to the set of selected elements as shown in FIG. 112C, and step 2-1 is executed. In step 2-1, a text structure having the same text elements as those of the set of selected elements is selected as shown in FIG. 112C. Hence, text structure D002 is obtained. In this case, the result of step 2-2 is negative, and step 3 is executed. Thereafter, steps 3 and 4 are executed in the same manner as has been described previously.

Another procedure carried out by the system will now be described. This procedure is the same as that shown in FIG. 113B. In step 1, only Cool is selected. In step 2-1, text structured D001, D002 and D006 are obtained. The result of step 2-2 is positive because three text structures have been obtained. In step 2-3, among the text elements which are included in the text structures obtained in step 2-1 but are not included in the set of selected elements, only text elements which have high text structure discriminating values are displayed. The following eight text elements are included in the text structures obtained in step 2-1 but are not included in the set of selected elements, (C004, C005, C006, C008, C012, C021, C040, C105). The text elements C004 and C005 are contained in both the text elements D002 and D006. Hence, the user cannot select one text structure by selecting the text elements. Taking into the account the above, only the six text elements (C006, C008, C012, C021, C040 and C105) except for C004 and C005 are displayed.

In step 1, the use selects the text elements displayed in step 2-3 again. In the example being considered, the user selects C006. In step 2-1, text structure D002 is obtained. The result of step 2-1 is affirmative and step 3 is executed. The steps 3 and 4 are executed in the same manner as has been described previously.

The above-mentioned text generating apparatus may be improved regarding the following three matters.

1) When a plurality of text structures stored in the text structure database have the same suitability factor as that of the set of text elements of the original sentence, it is impossible to select a single text structure.

2) Since relatively important text elements are handled in the same manner as text elements which are not relatively important, the user cannot know which sentences are important. Hence, the user cannot know which points are important in the editing procedure.

3) Only a single text is derived from a single text structure. Hence, there is no flexibility in translation.

A description will now be given of an embodiment of the present invention in which the above items 1) through 3) have been improved.

Figure 115:
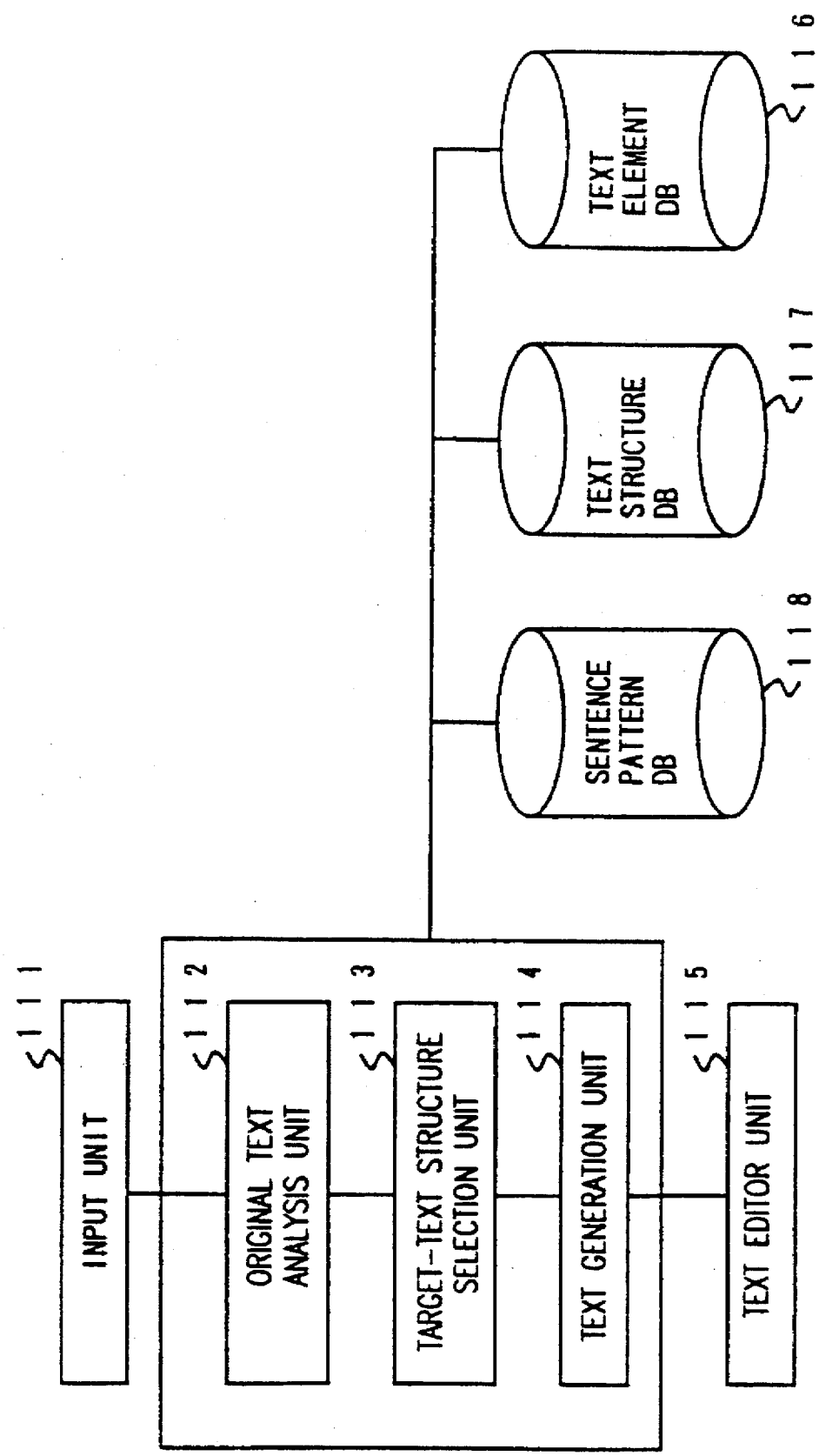
FIG. 115 is a block diagram illustrating a text creating system according to another embodiment of the present invention.

FIG. 115 shows a text creating apparatus made taking into account the above items 1) through 3). The apparatus shown in FIG. 115 includes input unit 111, original-text analysis unit 112, a target-text structure selection unit 113, a text generation unit 114, a text editor unit 115, a text element database (DB) 116, a text structure database (DB) 117, and a sentence pattern database (DB) 118.

The original-text analysis unit 112 detects text elements from the original text. The text element database 116 stores information concerning text elements contained in texts. The target-text structure database 117 stores information concerning a plurality of text structures for target texts, the text structures being sets of text elements. Further, the target-text structure database 117 stores information indicating the relative importance of the text elements stored therein. Sentence pattern database 118 stores information for creating sentences corresponding to each of the test elements. The target-text structure selection unit 113 determines a text structure suitable for a set of text elements of the original text. The generation unit 114 generates, by referring to the text structure determined by unit 113, the target text from the information stored in the sentence pattern database 118. The text editor unit 115 is used in such a manner that the user edits the target text generated by the text generation unit 114.

FIGS. 117 through 120 show examples of the contents of the databases. More particularly, FIG. 116 shows an example of the content of the text element database 116, and FIG. 117 shows an example of the content of the text structure database 117. FIG. 118 shows another example of the content of the text structure database 117, and FIG. 119 shows another example of the content of the sentence pattern database 118.

In FIG. 116, each text element has information concerning the identification number, the corresponding sentence pattern number, and the surface-levels of words included in the original text.

In FIG. 117, each text structure is defined by a set of a plurality of text elements, and is assigned one of three degrees of importance A, B and C in which the degree of importance A is higher than B, which is higher than C.

In FIG. 118, each text structure is defined by a set of text elements, and is assigned one of three degrees of importance A, B and C in which A is higher than B, which is higher than C.

In FIG. 119, originally, the sentence pattern database stores information concerning node patterns forming sentence patterns, and information concerning other candidates of node patterns. In the following description, a sentence derived from the identification (ID) number and the database (DB) information is additionally shown for the convenience' sake.

Figure 123:
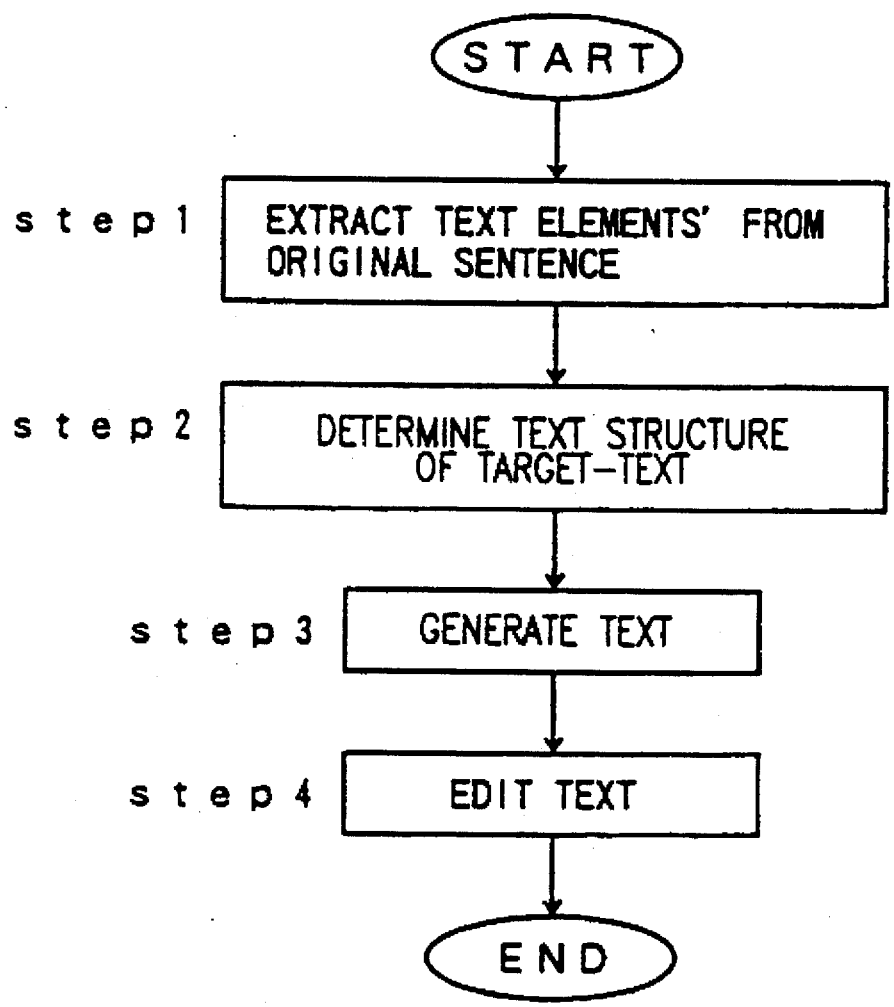
FIG. 123 is a flow chart illustrating an operation of the text creating system according to another embodiment of the present invention.

FIG. 123 is a flowchart of the operation of the text creating apparatus shown in FIG. 116. In step S1, an original text shown in FIG. 120 is input by the input unit 111. The original-text analyzing unit 112 extracts text elements from the original text, as shown in FIG. 121. In step 2, the target-text structure determining unit 113 access the text structure database 117 (the content of which is partially shown in FIG. 118), and selects a text structure most suitable for a set of text elements shown in FIG. 121. If text structures D002 and D007 are selected, as candidates suitable for the set of text elements shown in FIG. 123A, from the text structures stored in the text structure database 117, text element C001 assigned the degree C of importance is not included in text structure D002, while text element C008 assigned the degree A of importance is not included in text structure D007. Hence, text structure D002 is selected. Text structure D002 is selected from the text structure database 117 (the content of which is partially shown in FIG. 118).

In step 3, the text generation unit 114 generates the target text by using the text element information concerning the text structure D002 stored in the text structure database 117, and the corresponding information stored in the sentence pattern database 118. In this procedure, the method for displaying the generated sentence is changed on the basis of the degree-of-importance information concerning the text structural elements.

FIG. 123A shows an example of the generated text. The clauses corresponding to the text structural elements assigned the highest degree A of importance are displayed in the bold style, and the clauses corresponding to the text structural elements assigned the second highest degree B are displayed in a normal style. Further, the clauses corresponding to the text structural elements assigned the lowest degree C of importance are displayed in the Italic style.

The sentence, corresponding to the text element C001 which is assigned the degree C of importance and is not included in the text elements extracted from the original text, is not generated. Hence, a sentence as shown in FIG. 123B is generated. Hence, it becomes possible to create different typical texts from a single text structure.

In step 4, the user edits the generated text. In this editing procedure, the user can know which sentences are important.

As described above, it becomes possible to determine a single text structure in the case where a plurality of test structures stored in the text structure database have the same suitability level as that of the set of text elements of the original text. Further, it becomes possible for the user to know which sentences are important by assigning the degree of importance to each text element and flexibly edit the generated text by referring to the degree-of-importance information.

The present invention is not limited to the specifically disclosed embodiments, and variations and modifications may be made without departing from the scope of the present invention.

What is claimed is:

1. A language conversion system for converting an original sentence a source-language into a translated sentence in a target-language, said system comprising:

original analysis means for analyzing the original sentence so as to obtain an intermediate structure of the original;

idea center extraction means for extracting an idea center from the intermediate structure obtained by said original analysis means, said idea center being a central expression of an idea to be described by a sentence;

identification means for identifying a sentence pattern including the idea center extracted by said idea center extraction means, said identification means having a counting means for counting a number of structural elements of a target-language representation pattern, each structural element being filled with an information item in the intermediate structure of the original sentence;

information extraction means for extracting information required by the sentence pattern identified by said identification means from the intermediate structure of the original sentence;

decision means for deciding an intermediate structure of a translated sentence based on the sentence pattern and request information extracted by said information extraction means; and creation means for creating a translated sentence in a surface level from the intermediate structure decided by said decision means.

2. A language conversion system for converting an original sentence in a source-language into a translated sentence in a target-language, said system comprising:

original analysis means for analyzing the original sentence so as to obtain an intermediate structure of the original;

idea center extraction means for extracting an idea center from the intermediate structure obtained by said original analysis means, said idea center being a central expression of an idea to be described by a sentence;

identification means for identifying a sentence pattern including the idea center extracted by said idea center extraction means, wherein a degree of importance is assigned to each of structural elements of a target-language representation pattern in the sentence pattern, said identification means having calculation means for calculating a degree of importance of each of the structural elements of the target-language representation pattern, each structural element being filled with an information item in the intermediate structure of the original sentence, and means for deciding a priority order based on the degree of importance obtained by said calculation means;

information extraction means for extracting information required by the sentence pattern identified by said identification means from the intermediate structure of the original sentence;

decision means for deciding an intermediate structure of a translated sentence based on the sentence pattern and request information extracted by said information extraction means; and creation means for creating a translated sentence in a surface level from the intermediate structure decided by said decision means.

3. A language conversion system for converting an original sentence in a source-language into a translated sentence in a target-language, said system comprising:

original analysis means for analyzing the original sentence so as to obtain an intermediate structure of the original;

idea center extraction means for extracting an idea center from the intermediate structure obtained by said original analysis means, said idea center being a central expression of an idea to be described by a sentence;

identification means for identifying a sentence pattern including the idea center extracted by said idea center extraction means;

information extraction means for extracting information required by the sentence pattern identified by said identification means from the intermediate structure of the original sentence;

decision means for deciding an intermediate structure of a translated sentence based on the sentence pattern and request information extracted by said information extraction means;

creation means for creating a translated sentence in a surface level from the intermediate structure decided by said decision means;

first storage means for storing a thesaurus dictionary in the target-language; and second storage means for storing a translation thesaurus dictionary in which head note words of the thesaurus dictionary in said first storage means are translated in the source-language, wherein said target-language representation pattern in the sentence pattern has means for storing a surface level in the source-language corresponding to the structural elements and means for storing a meaning marker corresponding to the structural elements, and wherein said identification means has detecting means for detecting which of the surface level of the source-language information, the meaning marker and the thesaurus word fills the structural element of the target-language representation pattern, and evaluation means for evaluating a comparison score between the target-language representation pattern and the source-language information.

4. A language conversion system for converting an original sentence in a source-language into a translated sentence in a target-language, said system comprising:

original analysis means for analyzing the original sentence so as to obtain an intermediate structure of the original;

idea center extraction means for extracting an idea center from the intermediate structure obtained by said original analysis means, said idea center being a central expression of an idea to be described by a sentence;

identification means for identifying a sentence pattern including the idea center extracted by said idea center extraction means, a target-language representation pattern having a plurality of patterns different from each other, the patterns being created from the same information, said identification means further comprising storage means for storing an identification result for each sentence, comparison means for comparing an identification result obtained by said identification means with the identification result stored in said storage means, and switching means for switching a pattern to another pattern when said comparison means obtains a result that the identification results are equal to each other;

information extraction means for extracting information required by the sentence pattern identified by said identification means from the intermediate structure of the original sentence;

decision means for deciding an intermediate structure of a translated sentence based on the sentence pattern and request information extracted by said information extraction means; and creation means for creating a translated sentence in a surface level from the intermediate structure decided by said decision means.

5. A language conversion system for converting an original sentence in a source-language into a translated sentence in a target-language, said system comprising:

original analysis means for analyzing the original sentence so as to obtain an intermediate structure of the original;

idea center extraction means for extracting an idea center from the intermediate structure obtained by said original analysis means, said idea center being a central expression of an idea to be described by a sentence;

identification means for identifying a sentence pattern including the idea center extracted by said idea center extraction means;

information extraction means for extracting information required by the sentence pattern identified by said identification means from the intermediate structure of the original sentence;

decision means for deciding an intermediate structure of a translated sentence based on the sentence pattern and request information extracted by said information extraction means;

creation means for creating a translated sentence in a surface level from the intermediate structure decided by said decision means;

display means for displaying request information required by the sentence pattern; and input means for inputting a command indicating that missing information of the request information displayed by said display means must be supplemented or indicating that error information of the request information must be corrected.

6. A language conversion system for converting an original sentence in a source-language into a translated sentence in a target-language, said system comprising:

original analysis means for analyzing the original sentence so as to obtain an intermediate structure of the original;

idea center extraction means for extracting an idea center from the intermediate structure obtained by said original analysis means, said idea center being a central expression of an idea to be described by a sentence;

identification means for identifying a sentence pattern including the idea center extracted by said idea center extraction means;

information extraction means for extracting information required by the sentence pattern identified by said identification means from the intermediate structure of the original sentence;

decision means for deciding an intermediate structure of a translated sentence based on the sentence pattern and request information extracted by said information extraction means; and creation means for creating a translated sentence in a surface level from the intermediate structure decided by said decision means;

display means for displaying information which is not required by the sentence pattern; and input means for inputting an instruction whether or not the information displayed on the display means should reflect the translated sentence.

7. A language conversion system for converting an original sentence in a source-language into a translated sentence in a target-language, said system comprising:

original analysis means for analyzing the original sentence so as to obtain an intermediate structure of the original;

idea center extraction means for extracting an idea center from the intermediate structure obtained by said original analysis means, said idea center being a central expression of an idea to be described by a sentence;

identification means for identifying a sentence pattern including the idea center extracted by said idea center extraction means;

information extraction means for extracting information required by the sentence pattern identified by said identification means from the intermediate structure of the original sentence;

decision means for deciding an intermediate structure of a translated sentence based on the sentence pattern and request information extracted by said information extraction means; and creation means for creating a translated sentence in a surface level from the intermediate structure decided by said decision means;

sentence conversion means for obtaining an original sentence and an intermediate structure thereof from the intermediate structure of the translated sentence; and surface level sentence creation means for creating the original sentence and a surface level sentence in the source-language based on the intermediate structure obtained by said sentence conversion means.

8. A language conversion system for converting an original sentence in a source-language into a translated sentence in a target-language, said system comprising:

original analysis means for analyzing the original sentence so as to obtain an intermediate structure of the original;

idea center extraction means for extracting an idea center from the intermediate structure obtained by said original analysis means, said idea center being a central expression of an idea to be described by a sentence;

identification means for identifying a sentence pattern including the idea center extracted by said idea center extraction means;

information extraction means for extracting information required by the sentence pattern identified by said identification means from the intermediate structure of the original sentence;

decision means for deciding an intermediate structure of translated sentence based on the sentence pattern and request information extracted by said information extraction means; and creation means for creating a translated sentence in a surface level from the intermediate structure decided by said decision means; and display means for displaying, as a reference sentence, a literal translation sentence of the translated sentence in the source language on a screen on which the original sentence and the translated sentence is displayed.

9. A language conversion system for converting an original sentence in a source-language into a translated sentence in a target-language, said system comprising:

original analysis means for analyzing the original sentence so as to obtain an intermediate structure of the original;

idea center extraction means for extracting an idea center from the intermediate structure obtained by said original analysis means, said idea center being a central expression of an idea to be described by a sentence;

identification means for identifying a sentence pattern including the idea center extracted by said idea center extraction means;

information extraction means for extracting information required by the sentence pattern identified by said identification means from the intermediate structure of the original sentence;

decision means for deciding an intermediate structure of a translated sentence based on the sentence pattern and request information extracted by said information extraction means; and creation means for creating a translated sentence in a surface level from the intermediate structure decided by said decision means;

detecting means for detecting a difference between information of the original sentence and information of the translated sentence;

guidance creation means for creating guidance information in accordance with the difference detected by said detecting means; and display means for displaying the guidance information.

10. A language conversion system for converting an original sentence in a source-language into a translated sentence in a target-language, said system comprising:

original analysis means for analyzing the original sentence so as to obtain an intermediate structure of the original;

idea center extraction means for extracting an idea center from the intermediate structure obtained by said original analysis means, said idea center being a central expression of an idea to be described by a sentence;

identification means for identifying a sentence pattern including the idea center extracted by said idea center extraction means;

information extraction means for extracting information required by the sentence pattern identified by said identification means from the intermediate structure of the original sentence;

decision means for deciding an intermediate structure of a translated sentence based on the sentence pattern and request information extracted by said information extraction means; and creation means for creating a translated sentence in s surface level from the intermediate structure decided by said decision means;

detecting means for detecting a difference between information of the original sentence and information of the translated sentence;

retrieval means for searching for guidance information based on the information having the difference detected by said detecting means; and display means for displaying the guidance information, wherein additional information which can not be extracted from the intermediate structure of the original sentence required by the sentence pattern in the target-language or remainder information which is not extracted in a retrieval process of the intermediate structure of the original sentence in accordance with the request from the sentence pattern in the target-language is used as the difference detected by said detecting means.

11. A language conversion system for converting an original sentence in a source-language into a translated sentence in a target-language, said system comprising:

original analysis means for analyzing the original sentence so as to obtain an intermediate structure of the original;

idea center extraction means for extracting an idea center from the intermediate structure obtained by said original analysis means, said idea center being a central expression of an idea to be described by a sentence;

identification means for identifying a sentence pattern including the idea center extracted by said idea center extraction means;

information extraction means for extracting information required by the sentence pattern identified by said identification means from the intermediate structure of the original sentence;

decision means for deciding an intermediate structure of a translated sentence based on the sentence pattern and request information extracted by said information extraction means; and creation means for creating a translated sentence in a surface level from the intermediate structure decided by said decision means; and storage means for storing the intermediate structure of one or a plurality of original sentences which has been previously translated into the target-language, wherein said storage means are treated as an object from which the idea center is to be extracted.

12. A language conversion system for converting an original sentence in a source-language into a translated sentence in a target-language,-said system comprising:

original analysis means for analyzing the original sentence so as to obtain a first intermediate structure of the original sentence;

first conversion means for converting the first intermediate structure obtained by said original analysis means into an intermediate structure of an translated sentence;

translation creation means for creating the translated sentence in the surface level from the intermediate structure of the translated sentence;

second conversion means for converting the intermediate structure of the translated sentence into a second intermediate structure in the source-language; and surface level sentence creation means for creating a surface level sentence in the source-language from the second intermediate structure.

13. A language conversion system for converting an original sentence in a source-language into a translated sentence in a target-language, said system comprising:

original analysis means for analyzing the original sentence so as to obtain an intermediate structure of the original;

idea center extraction means for extracting an idea center from the intermediate structure obtained by said original analysis means, said idea center being a central expression of an idea to be described by a sentence;

identification means for identifying a sentence pattern including the idea center extracted by said idea center extraction means;

information extraction means for extracting information required by the sentence pattern identified by said identification means from the intermediate structure of the original sentence;

decision means for deciding an intermediate structure of a translated sentence based on the sentence pattern and request information extracted by said information extraction means; and creation means for creating a translated sentence in a surface level from the intermediate structure decided by said decision means;

detecting means for detecting a difference between information of the original sentence and information of the translation;

retrieval means for searching for guidance information based on the information having the difference detected by said detecting means; and display means for displaying the guidance information.

14. A language conversion system for converting an original sentence in a source-language into a translated sentence in a target-language, said system comprising:

original analysis means for analyzing the original sentence so as to obtain an intermediate structure of the original;

idea center extraction means for extracting an idea center from the intermediate structure obtained by said original analysis means, said idea center being a central expression of an idea to be described by a sentence;

identification means for identifying a sentence pattern including the idea center extracted by said idea center extraction means;

information extraction means for extracting information required by the sentence pattern identified by said identification means from the intermediate structure of the original sentence;

decision means for deciding an intermediate structure of a translated sentence based on the sentence pattern and request information extracted by said information extraction means;

creation means for creating a translated sentence in a surface level from the intermediate structure decided by said decision means; and means for selecting a target-language phrase pattern without relation to the idea center and for creating the translated sentence in the target-language using the target-language phrase pattern in a case where a structural element corresponding to an optional element in the target-language phrase pattern driven by the idea center does not exist in the intermediate structure in the source-language.

15. A language converting system applied to a machine translation apparatus having input means for inputting an original sentence, translation means for translating the original sentence into a target-language, storage means for storing information required in said translation means, and output means for outputting a result obtained by said translation means, said translation means comprising:

original analysis means for analyzing the original sentence so as to obtain an intermediate structure of the original sentence;

idea center extraction means for extracting an idea center from the intermediate structure obtained by said original analysis means, said idea center being central expression of an idea to be described by a sentence;

identification means for identifying a sentence pattern including the idea center extracted by said idea center extraction means;

information extraction means for extracting information required by the sentence pattern identified by said identification means from the intermediate structure of the original sentence;

decision means for deciding an intermediate structure of a translated sentence based on the sentence pattern and request information extracted by said information extraction means; and creation means for creating a translated sentence in a surface level from the intermediate structure of the translated sentence, and said language converting means further comprising:

confirmation means for confirming the result obtained by said translation means.

16. A language conversion system for converting an original sentence in a source-language into a translated sentence in a target-language, said system comprising:

idea center extraction means for extracting an idea center from the original sentence, said idea center being a central expression of an idea to be described by a sentence;

identification means for identifying a representation pattern including the idea center extracted by said idea center extraction means;

information extraction means for extracting information required by the representation pattern identified by said identification means from the intermediate structure of the original sentence; and display means for displaying the information extracted by said information extraction means, said display means displaying the information required by the representation pattern in a table format, values displayed in the table format being able to edit.

17. The system as claimed in claim 16, further comprising:

output means for outputting a target-language sentence based on the representing pattern in the target-language and an original sentence based on a representation pattern in the source language corresponding to the representing pattern in the target-language.

18. The system as claimed in claim 16, further comprising:

output means for outputting a target-language sentence created based on the representation pattern with reference to the information obtained by said information extraction means and the editing result of the values displayed in the table format; and editing means for editing the target-language sentence output by said output means, wherein if a value changed by said editing means is a word in the source-language, the changed valued is converted into an expression in the target-language.

19. A language conversion system for converting an original sentence in a source-language into a translated sentence in a target-language, said system comprising:

idea center input means for inputting an idea center directed to input to said system by a user, said idea center being a central expression of an idea to be described by a sentence;

identification means for identifying a representation pattern including the idea center input by said idea center input means;

information extraction means for extracting information required by the representation pattern identified by said identification means from the intermediate structure of the original sentence;

display means for displaying the information extracted by said information extraction means.

* * * * *

UNITED STATES PATENT AND TRADEMARK OFFICE
CERTIFICATE OF CORRECTION

PATENT NO. : 5,675,815

DATED : October 7, 1997

INVENTOR(S) : Satoshi Yamauchi et al.

It is certified that error appears in the above-identified patent and that said Letters Patent is hereby corrected as shown below:

Col. 4, line 20, "obtained" should be --obtain--
Col. 12, line 3, "nay" should be --may--
Col. 15, line 2, "ukekuchiis" should be two words --ukekuchi is--
Col. 31, line 65, after "system" the period --.-- is missing
Col. 39, line 50, "by ." should be --"Y"--.
Col. 40, line 52, "patter" should be --pattern--
Col. 45, line 37, "Condition" should be --condition--
Col. 49, line 49, after "Fig." insert --84.--.
Col. 53, line 50, "pattens" should be --patterns--
Col. 56, line 15, "patters" should be --patterns--
Col. 57, line 51, "patters" should be --patterns--
Col. 58, line 18, "patters" should be --patterns--
Col. 62, line 55, "$4" should be --S4--
Col. 71, line 30, after "language ," delete the hyphen-- - --.

Signed and Sealed this

Twenty-fifth Day of May, 1999

Attest:

Attesting Officer

Q. TODD DICKINSON

Acting Commissioner of Patents and Trademarks